United States Patent
Lee et al.

(10) Patent No.: US 12,448,436 B2
(45) Date of Patent: Oct. 21, 2025

(54) ANTIBODY SPECIFICALLY BINDING TO GRP94 OR ANTIGEN-BINDING FRAGMENT THEREOF, AND USES THEREOF

(71) Applicant: KOOKMIN UNIVERSITY INDUSTRY ACADEMY COOPERATION FOUNDATION, Seoul (KR)

(72) Inventors: Sukmook Lee, Seoul (KR); Ji Woong Kim, Seoul (KR); Yeabin Cho, Gyeonggi-do (KR); Kyun Heo, Seoul (KR)

(73) Assignee: KOOKMIN UNIVERSITY INDUSTRY ACADEMY COOPERATION FOUNDATION, Seoul (KR)

(*) Notice: Subject to any disclaimer, the term of this patent is extended or adjusted under 35 U.S.C. 154(b) by 546 days.

(21) Appl. No.: 18/009,419

(22) PCT Filed: Oct. 30, 2020

(86) PCT No.: PCT/KR2020/015037
§ 371 (c)(1),
(2) Date: Dec. 9, 2022

(87) PCT Pub. No.: WO2021/251564
PCT Pub. Date: Dec. 16, 2021

(65) Prior Publication Data
US 2023/0220056 A1    Jul. 13, 2023

(30) Foreign Application Priority Data

Jun. 9, 2020 (KR) .......... 10-2020-0069859
Jun. 9, 2020 (KR) .......... 10-2020-0069868

(51) Int. Cl.
*C07K 16/18* (2006.01)
*A61K 39/00* (2006.01)
*A61P 35/00* (2006.01)
*C12N 15/63* (2006.01)

(52) U.S. Cl.
CPC .............. *C07K 16/18* (2013.01); *A61K 39/00* (2013.01); *A61P 35/00* (2018.01); *C12N 15/63* (2013.01); *C07K 2317/565* (2013.01); *C07K 2317/92* (2013.01)

(58) Field of Classification Search
None
See application file for complete search history.

(56) References Cited

U.S. PATENT DOCUMENTS 9,340,608 B2    5/2016    Ferrone et al.
2012/0148598 A1    6/2012    Ferrone et al.

FOREIGN PATENT DOCUMENTS

KR    2016-0043534 A    4/2016
WO    WO-01/81423 A1    11/2001
WO    WO-2016/201337 A1    12/2016

OTHER PUBLICATIONS

International Search Report from corresponding PCT Application No. PCT/KR2020/015037, dated Mar. 8, 2021.
Jeoung, M. H., et al.; "Antibody-Based Targeting of Cell Surface GRP94 Specifically Inhibits Cetuximab-Resistant Colorectal Cancer Growth", Biomolecules, Nov. 1, 2019, vol. 9, thesis No. 681, pp. 1-12.
Heinemann, V., et al.; "FOLFIRI plus cetuximab versus FOLFIRI plus bevacizumab as first-line treatment for patients with metastatic colorectal cancer (FIRE-3): a randomised, open-label, phase 3 trial", Lancet Oncology, 2014, pp. 1-11.
Sabbatino F et al: "Grp94-specific monoclonal antibody to counteract BRAF inhibitor resistance in BRAFV600E melanoma", Journal of Translational Medicine, Biomed Central, vol. 13, No. Suppl 1, Jan. 15, 2015 (Jan. 15, 2015), p. K12, XP021208133.
Li Xin et al: "Cell membrane gp96 facilitates HER2 dimerization and serves as a novel target in breast cancer : Cell membrane gp96 Facilitates HER2 dimerization", International Journal of Cancer, vol. 137, No. 3, Jan. 8, 2015 (Jan. 8, 2015), pp. 512-524, XP055824397.
Zhang Yu-Dan et al: "A strategy to produce monoclonal antibodies against gp96 by prime-boost regimen using endogenous protein and *E. coli* heterologously-expressed fragment", Journal of Central South University of Technology, vol. 18, No. 6, Dec. 1, 2011 (Dec. 1, 2011), pp. 1857-1864, XP093129509.
Lee Jae Seok et al: "Prognostic significance of glucose-related protein 94 in colorectal cancer", Pathology—Research and Practice, Elsevier, Amsterdam, NL, vol. 216, No. 7, May 16, 2020 (May 16, 2020), XP086180051.
Partial Supplementary European Search Report from corresponding European Application No. 20939575.5, dated Feb. 19, 2024.

*Primary Examiner* — Daniel E Kolker
*Assistant Examiner* — James Ryland Melchior
(74) *Attorney, Agent, or Firm* — Harness, Dickey & Pierce, P.L.C.

(57) ABSTRACT

The present disclosure relates to an antibody or an antigen-binding fragment thereof specifically binding to GRP94, and uses thereof. A GRP94 antibody or antigen-binding fragment thereof according to the present disclosure has very high specificity and affinity to GRP94, and excellent growth-inhibiting, infiltration-inhibiting, and angiogenesis-inhibiting effects on colorectal cancer cell lines, and thus can be useful as a composition for treating cancer, inhibiting cancer metastasis, and inhibiting angiogenesis.

14 Claims, 32 Drawing Sheets

Specification includes a Sequence Listing.

```
SEQUENCE LISTING

<160> NUMBER OF SEQ ID NOS: 67

<210> SEQ ID NO 1
<211> LENGTH: 10
<212> TYPE: PRT
<213> ORGANISM: Artificial Sequence
<220> FEATURE:
<223> OTHER INFORMATION: Amino acid sequence of HCDR1 of GRP94 B5

<400> SEQUENCE: 1

Gly Phe Thr Phe Ser Asn Tyr Tyr Met Ser
1               5                   10

<210> SEQ ID NO 2
<211> LENGTH: 17
<212> TYPE: PRT
<213> ORGANISM: Artificial Sequence
<220> FEATURE:
<223> OTHER INFORMATION: Amino acid sequence of HCDR2 of GRP94 B5

<400> SEQUENCE: 2

Gly Ile Tyr Pro Asn Ser Gly Ser Thr Tyr Tyr Ala Asp Ser Val Lys
1               5                   10                  15
```

Gly

<210> SEQ ID NO 3
<211> LENGTH: 12
<212> TYPE: PRT
<213> ORGANISM: Artificial Sequence
<220> FEATURE:
<223> OTHER INFORMATION: Amino acid sequence of HCDR3 of GRP94 B5

<400> SEQUENCE: 3

Asp Pro Leu His Pro Ala Arg Phe Pro Phe Asp Tyr
1               5                  10

<210> SEQ ID NO 4
<211> LENGTH: 13
<212> TYPE: PRT
<213> ORGANISM: Artificial Sequence
<220> FEATURE:
<223> OTHER INFORMATION: Amino acid sequence of LCDR1 of GRP94 B5

<400> SEQUENCE: 4

Thr Gly Ser Ser Ser Asn Ile Gly Asn Asn Ala Val Ser
1               5                  10

<210> SEQ ID NO 5
<211> LENGTH: 7
<212> TYPE: PRT
<213> ORGANISM: Artificial Sequence
<220> FEATURE:
<223> OTHER INFORMATION: Amino acid sequence of LCDR2 of GRP94 B5

<400> SEQUENCE: 5

Ala Asp Ser His Arg Pro Ser
1               5

<210> SEQ ID NO 6
<211> LENGTH: 9
<212> TYPE: PRT
<213> ORGANISM: Artificial Sequence
<220> FEATURE:
<223> OTHER INFORMATION: Amino acid sequence of LCDR3 of GRP94 B5

<400> SEQUENCE: 6

Gly Ala Trp Asp Ala Ser Leu Asn Ala
1               5

<210> SEQ ID NO 7
<211> LENGTH: 121
<212> TYPE: PRT
<213> ORGANISM: Artificial Sequence
<220> FEATURE:
<223> OTHER INFORMATION: Amino acid sequence of heavy chain variable of
      GRP94 B5

<400> SEQUENCE: 7

Glu Val Gln Leu Leu Glu Ser Gly Gly Gly Leu Val Gln Pro Gly Gly
1               5                  10                  15

Ser Leu Arg Leu Ser Cys Ala Ala Ser Gly Phe Thr Phe Ser Asn Tyr
            20                  25                  30

Tyr Met Ser Trp Val Arg Gln Ala Pro Gly Lys Gly Leu Glu Trp Val
        35                  40                  45

Ser Gly Ile Tyr Pro Asn Ser Gly Ser Thr Tyr Tyr Ala Asp Ser Val
    50                  55                  60

Lys Gly Arg Phe Thr Ile Ser Arg Asp Asn Ser Lys Asn Thr Leu Tyr

```
                65                  70                  75                  80
Leu Gln Met Asn Ser Leu Arg Ala Glu Asp Thr Ala Val Tyr Tyr Cys
                    85                  90                  95

Ala Arg Asp Pro Leu His Pro Ala Arg Phe Pro Phe Asp Tyr Trp Gly
                100                 105                 110

Gln Gly Thr Leu Val Thr Val Ser Ser
            115                 120
```

<210> SEQ ID NO 8
<211> LENGTH: 110
<212> TYPE: PRT
<213> ORGANISM: Artificial Sequence
<220> FEATURE:
<223> OTHER INFORMATION: Amino acid sequence of light chain variable of
      GRP94 B5

<400> SEQUENCE: 8

```
Gln Ser Val Leu Thr Gln Pro Pro Ser Ala Ser Gly Thr Pro Gly Gln
1               5                   10                  15

Arg Val Thr Ile Ser Cys Thr Gly Ser Ser Ser Asn Ile Gly Asn Asn
                20                  25                  30

Ala Val Ser Trp Tyr Gln Gln Leu Pro Gly Thr Ala Pro Lys Leu Leu
            35                  40                  45

Ile Tyr Ala Asp Ser His Arg Pro Ser Gly Val Pro Asp Arg Phe Ser
        50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Gly Ala Trp Asp Ala Ser Leu
                85                  90                  95

Asn Ala Tyr Val Phe Gly Gly Gly Thr Lys Leu Thr Val Leu
            100                 105                 110
```

<210> SEQ ID NO 9
<211> LENGTH: 10
<212> TYPE: PRT
<213> ORGANISM: Artificial Sequence
<220> FEATURE:
<223> OTHER INFORMATION: Amino acid sequence of HCDR1 of GRP94 E5

<400> SEQUENCE: 9

```
Gly Phe Thr Phe Ser Asn Tyr Ala Met Ser
1               5                   10
```

<210> SEQ ID NO 10
<211> LENGTH: 17
<212> TYPE: PRT
<213> ORGANISM: Artificial Sequence
<220> FEATURE:
<223> OTHER INFORMATION: Amino acid sequence of HCDR2 of GRP94 E5

<400> SEQUENCE: 10

```
Gly Ile Ser Ser Ser Ser Gly Ser Thr Tyr Tyr Ala Asp Ser Val Lys
1               5                   10                  15

Gly
```

<210> SEQ ID NO 11
<211> LENGTH: 12
<212> TYPE: PRT
<213> ORGANISM: Artificial Sequence
<220> FEATURE:
<223> OTHER INFORMATION: Amino acid sequence of HCDR3 of GRP94 E5

```
<400> SEQUENCE: 11

Asp Arg His Pro Phe Ser Pro Asn Trp Phe Asp Tyr
1               5                   10

<210> SEQ ID NO 12
<211> LENGTH: 13
<212> TYPE: PRT
<213> ORGANISM: Artificial Sequence
<220> FEATURE:
<223> OTHER INFORMATION: Amino acid sequence of LCDR1 of GRP94 E5

<400> SEQUENCE: 12

Ser Gly Ser Pro Ser Asn Ile Gly Ser Asn Thr Val Thr
1               5                   10

<210> SEQ ID NO 13
<211> LENGTH: 7
<212> TYPE: PRT
<213> ORGANISM: Artificial Sequence
<220> FEATURE:
<223> OTHER INFORMATION: Amino acid sequence of LCDR2 of GRP94 E5

<400> SEQUENCE: 13

Ala Asp Ser His Arg Pro Ser
1               5

<210> SEQ ID NO 14
<211> LENGTH: 9
<212> TYPE: PRT
<213> ORGANISM: Artificial Sequence
<220> FEATURE:
<223> OTHER INFORMATION: Amino acid sequence of LCDR3 of GRP94 E5

<400> SEQUENCE: 14

Ala Ser Trp Asp Asp Ser Leu Asn Gly
1               5

<210> SEQ ID NO 15
<211> LENGTH: 121
<212> TYPE: PRT
<213> ORGANISM: Artificial Sequence
<220> FEATURE:
<223> OTHER INFORMATION: Amino acid sequence of heavy chain variable of
      GRP94 E5

<400> SEQUENCE: 15

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ala Met Ser Trp Val Arg Gln Ala Pro Gly Lys Gly Leu Glu Trp Val
        35                  40                  45

Ser Gly Ile Ser Ser Ser Gly Ser Thr Tyr Tyr Ala Asp Ser Val
    50                  55                  60

Lys Gly Arg Phe Thr Thr Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Arg Asp Arg His Pro Phe Ser Pro Asn Trp Phe Asp Tyr Trp Gly
            100                 105                 110

Gln Gly Thr Leu Val Thr Val Ser Ser
        115                 120
```

<210> SEQ ID NO 16
<211> LENGTH: 110
<212> TYPE: PRT
<213> ORGANISM: Artificial Sequence
<220> FEATURE:
<223> OTHER INFORMATION: Amino acid sequence of light chain variable of
      GRP94 E5

<400> SEQUENCE: 16

Gln Ser Val Leu Thr Gln Pro Pro Ser Ala Ser Gly Thr Pro Gly Gln
1               5                   10                  15

Arg Val Thr Ile Ser Cys Ser Gly Ser Pro Ser Asn Ile Gly Ser Asn
            20                  25                  30

Thr Val Thr Trp Tyr Gln Gln Leu Pro Gly Thr Ala Pro Lys Leu Leu
        35                  40                  45

Ile Tyr Ala Asp Ser His Arg Pro Ser Gly Val Pro Asp Arg Phe Ser
    50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ala Ser Trp Asp Asp Ser Leu
                85                  90                  95

Asn Gly Tyr Val Phe Gly Gly Gly Thr Lys Leu Thr Val Leu
            100                 105                 110

<210> SEQ ID NO 17
<211> LENGTH: 10
<212> TYPE: PRT
<213> ORGANISM: Artificial Sequence
<220> FEATURE:
<223> OTHER INFORMATION: Amino acid sequence of HCDR1 of GRP94 2H5

<400> SEQUENCE: 17

Gly Phe Thr Phe Ser Gly Tyr Ala Met Ser
1               5                   10

<210> SEQ ID NO 18
<211> LENGTH: 17
<212> TYPE: PRT
<213> ORGANISM: Artificial Sequence
<220> FEATURE:
<223> OTHER INFORMATION: Amino acid sequence of HCDR2 of GRP94 2H5

<400> SEQUENCE: 18

Ala Ile Ser His Gly Gly Ser Ser Lys Tyr Tyr Ala Asp Ser Val Lys
1               5                   10                  15

Gly

<210> SEQ ID NO 19
<211> LENGTH: 18
<212> TYPE: PRT
<213> ORGANISM: Artificial Sequence
<220> FEATURE:
<223> OTHER INFORMATION: Amino acid sequence of HCDR3 of GRP94 2H5

<400> SEQUENCE: 19

Asp Leu Leu Ser Pro Leu Gln Ser Ile Gly Ser Tyr Asp Asp Ala Met
1               5                   10                  15

Asp Val

<210> SEQ ID NO 20
<211> LENGTH: 13
<212> TYPE: PRT

```
<213> ORGANISM: Artificial Sequence
<220> FEATURE:
<223> OTHER INFORMATION: Amino acid sequence of LCDR1 of GRP94 2H5

<400> SEQUENCE: 20

Ser Gly Ser Ser Ser Asn Ile Gly Ser Asn Thr Val Ser
1               5                   10

<210> SEQ ID NO 21
<211> LENGTH: 7
<212> TYPE: PRT
<213> ORGANISM: Artificial Sequence
<220> FEATURE:
<223> OTHER INFORMATION: Amino acid sequence of LCDR2 of GRP94 2H5

<400> SEQUENCE: 21

Ala Asp Asn Asn Arg Pro Ser
1               5

<210> SEQ ID NO 22
<211> LENGTH: 9
<212> TYPE: PRT
<213> ORGANISM: Artificial Sequence
<220> FEATURE:
<223> OTHER INFORMATION: Amino acid sequence of LCDR3 of GRP94 2H5

<400> SEQUENCE: 22

Ala Ser Trp Asp Asp Ser Leu Asn Ala
1               5

<210> SEQ ID NO 23
<211> LENGTH: 127
<212> TYPE: PRT
<213> ORGANISM: Artificial Sequence
<220> FEATURE:
<223> OTHER INFORMATION: Amino acid sequence of heavy chain variable of
      GRP94 2H5

<400> SEQUENCE: 23

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Gly Tyr
            20                  25                  30

Ala Met Ser Trp Val Arg Gln Ala Pro Gly Lys Gly Leu Glu Trp Val
        35                  40                  45

Ser Ala Ile Ser His Gly Gly Ser Ser Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asp Leu Leu Ser Pro Leu Gln Ser Ile Gly Ser Tyr Asp Asp
            100                 105                 110

Ala Met Asp Val Trp Gly Gln Gly Thr Leu Val Thr Val Ser Ser
        115                 120                 125

<210> SEQ ID NO 24
<211> LENGTH: 110
<212> TYPE: PRT
<213> ORGANISM: Artificial Sequence
<220> FEATURE:
<223> OTHER INFORMATION: Amino acid sequence of light chain variable of
      GRP94 2H5
```

```
<400> SEQUENCE: 24

Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Ser Asn
            20                  25                  30

Thr Val Ser Trp Tyr Gln Gln Leu Pro Gly Thr Ala Pro Lys Leu Leu
        35                  40                  45

Ile Tyr Ala Asp Asn Asn Arg Pro Ser Gly Val Pro Asp Arg Phe Ser
50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Ala Ser Trp Asp Asp Ser Leu
                85                  90                  95

Asn Ala Tyr Val Phe Gly Gly Gly Thr Lys Leu Thr Val Leu
            100                 105                 110

<210> SEQ ID NO 25
<211> LENGTH: 10
<212> TYPE: PRT
<213> ORGANISM: Artificial Sequence
<220> FEATURE:
<223> OTHER INFORMATION: Amino acid sequence of HCDR1 of GRP94 3G7

<400> SEQUENCE: 25

Gly Phe Thr Phe Ser Asn Tyr Ser Met Ser
1               5                   10

<210> SEQ ID NO 26
<211> LENGTH: 17
<212> TYPE: PRT
<213> ORGANISM: Artificial Sequence
<220> FEATURE:
<223> OTHER INFORMATION: Amino acid sequence of HCDR2 of GRP94 3G7

<400> SEQUENCE: 26

Gly Ile Tyr Tyr Gly Ser Gly Asn Lys Tyr Tyr Ala Asp Ser Val Lys
1               5                   10                  15

Gly

<210> SEQ ID NO 27
<211> LENGTH: 7
<212> TYPE: PRT
<213> ORGANISM: Artificial Sequence
<220> FEATURE:
<223> OTHER INFORMATION: Amino acid sequence of HCDR3 of GRP94 3G7

<400> SEQUENCE: 27

Asn Leu Ala Ser Phe Asp Tyr
1               5

<210> SEQ ID NO 28
<211> LENGTH: 13
<212> TYPE: PRT
<213> ORGANISM: Artificial Sequence
<220> FEATURE:
<223> OTHER INFORMATION: Amino acid sequence of LCDR1 of GRP94 3G7

<400> SEQUENCE: 28

Ser Gly Ser Ser Ser Asn Ile Gly Ser Asn Ser Val Asn
1               5                   10

<210> SEQ ID NO 29
```

```
<211> LENGTH: 7
<212> TYPE: PRT
<213> ORGANISM: Artificial Sequence
<220> FEATURE:
<223> OTHER INFORMATION: Amino acid sequence of LCDR2 of GRP94 3G7

<400> SEQUENCE: 29

Ser Asn Ser His Arg Pro Ser
1               5

<210> SEQ ID NO 30
<211> LENGTH: 9
<212> TYPE: PRT
<213> ORGANISM: Artificial Sequence
<220> FEATURE:
<223> OTHER INFORMATION: Amino acid sequence of LCDR3 of GRP94 3G7

<400> SEQUENCE: 30

Gly Thr Trp Asp Ser Ser Leu Ser Gly
1               5

<210> SEQ ID NO 31
<211> LENGTH: 116
<212> TYPE: PRT
<213> ORGANISM: Artificial Sequence
<220> FEATURE:
<223> OTHER INFORMATION: Amino acid sequence of heavy chain variable of
      GRP94 3G7

<400> SEQUENCE: 31

Glu Val Gln Leu Leu Glu Ser Gly Gly Gly Leu Val Gln Pro Gly Gly
1               5                   10                  15

Ser Leu Arg Leu Ser Cys Ala Ala Ser Gly Phe Thr Phe Ser Asn Tyr
            20                  25                  30

Ser Met Ser Trp Val Arg Gln Ala Pro Gly Lys Gly Leu Glu Trp Val
        35                  40                  45

Ser Gly Ile Tyr Tyr Gly Ser Gly Asn Lys Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Lys Asn Leu Ala Ser Phe Asp Tyr Trp Gly Gln Gly Thr Leu Val
            100                 105                 110

Thr Val Ser Ser
        115

<210> SEQ ID NO 32
<211> LENGTH: 110
<212> TYPE: PRT
<213> ORGANISM: Artificial Sequence
<220> FEATURE:
<223> OTHER INFORMATION: Amino acid sequence of light chain variable of
      GRP94 3G7

<400> SEQUENCE: 32

Gln Ser Val Leu Thr Gln Pro Pro Ser Ala Ser Gly Thr Pro Gly Gln
1               5                   10                  15

Arg Val Thr Ile Ser Cys Ser Gly Ser Ser Asn Ile Gly Ser Asn
            20                  25                  30

Ser Val Asn Trp Tyr Gln Gln Leu Pro Gly Thr Ala Pro Lys Leu Leu
        35                  40                  45
```

Ile Tyr Ser Asn Ser His Arg Pro Ser Gly Val Pro Asp Arg Phe Ser
                50                  55                  60

Gly Ser Lys Ser Gly Thr Ser Ala Ser Leu Ala Ile Ser Gly Leu Arg
65                  70                  75                  80

Ser Glu Asp Glu Ala Asp Tyr Tyr Cys Gly Thr Trp Asp Ser Ser Leu
                85                  90                  95

Ser Gly Tyr Val Phe Gly Gly Gly Thr Lys Leu Thr Val Leu
                100                 105                 110

<210> SEQ ID NO 33
<211> LENGTH: 30
<212> TYPE: DNA
<213> ORGANISM: Artificial Sequence
<220> FEATURE:
<223> OTHER INFORMATION: Nucleic acid sequence of HCDR1 of GRP94 B5

<400> SEQUENCE: 33
ggattcacct ttagcaatta ttatatgagc                                    30

<210> SEQ ID NO 34
<211> LENGTH: 51
<212> TYPE: DNA
<213> ORGANISM: Artificial Sequence
<220> FEATURE:
<223> OTHER INFORMATION: Nucleic acid sequence of HCDR2 of GRP94 B5

<400> SEQUENCE: 34
gggatctatc ctaatagtgg tagtacatat tacgctgatt ctgtaaaagg t             51

<210> SEQ ID NO 35
<211> LENGTH: 36
<212> TYPE: DNA
<213> ORGANISM: Artificial Sequence
<220> FEATURE:
<223> OTHER INFORMATION: Nucleic acid sequence of HCDR3 of GRP94 B5

<400> SEQUENCE: 35
gatcctcttc atccggcgcg ttttccgttc gactac                             36

<210> SEQ ID NO 36
<211> LENGTH: 39
<212> TYPE: DNA
<213> ORGANISM: Artificial Sequence
<220> FEATURE:
<223> OTHER INFORMATION: Nucleic acid sequence of LCDR1 of GRP94 B5

<400> SEQUENCE: 36
actggctctt catctaatat tggcaataat gctgtctcc                          39

<210> SEQ ID NO 37
<211> LENGTH: 21
<212> TYPE: DNA
<213> ORGANISM: Artificial Sequence
<220> FEATURE:
<223> OTHER INFORMATION: Nucleic acid sequence of LCDR2 of GRP94 B5

<400> SEQUENCE: 37
gctgatagtc atcggccaag c                                             21

<210> SEQ ID NO 38
<211> LENGTH: 27
<212> TYPE: DNA
<213> ORGANISM: Artificial Sequence
<220> FEATURE:
<223> OTHER INFORMATION: Nucleic acid sequence of LCDR3 of GRP94 B5

-continued

<400> SEQUENCE: 38
ggtgcttggg atgctagcct gaatgct 27

<210> SEQ ID NO 39
<211> LENGTH: 363
<212> TYPE: DNA
<213> ORGANISM: Artificial Sequence
<220> FEATURE:
<223> OTHER INFORMATION: Nucleic acid sequence of heavy chain variable
    of GRP94 B5

<400> SEQUENCE: 39
gaggtgcagc tgttggagtc tgggggaggc ttggtacagc ctggggggtc cctgagactc     60
tcctgtgcag cctctggatt cacctttagc aattattata tgagctgggt ccgccaggct    120
ccagggaagg ggctggagtg ggtctcaggg atctatccta atagtggtag tacatattac    180
gctgattctg taaaaggtcg gttcaccatc tccagagaca attccaagaa cacgctgtat    240
ctgcaaatga acagcctgag agccgaggac acggccgtgt attactgtgc gagagatcct    300
cttcatccgg cgcgttttcc gttcgactac tggggccagg gtacactggt caccgtgagc    360
tca                                                                  363

<210> SEQ ID NO 40
<211> LENGTH: 330
<212> TYPE: DNA
<213> ORGANISM: Artificial Sequence
<220> FEATURE:
<223> OTHER INFORMATION: Nucleic acid sequence of light chain variable
    of GRP94 B5

<400> SEQUENCE: 40
cagtctgtgc tgactcagcc accctcagcg tctgggaccc ccgggcagag ggtcaccatc     60
tcttgtactg gctcttcatc taatattggc aataatgctg tctcctggta ccagcagctc    120
ccaggaacgg cccccaaact cctcatctat gctgatagta tcggccaag cggggtccct    180 gaccgattct ctggctccaa gtctggcacc tcagcctccc tggccatcag tgggctccgg    240
tccgaggatg aggctgatta ttactgtggt gcttgggatg ctagcctgaa tgcttatgtc    300
ttcggcggag gcaccaagct gacggtccta                                     330

<210> SEQ ID NO 41
<211> LENGTH: 30
<212> TYPE: DNA
<213> ORGANISM: Artificial Sequence
<220> FEATURE:
<223> OTHER INFORMATION: Nucleic acid sequence of HCDR1 of GRP94 E5

<400> SEQUENCE: 41
ggattcacct ttagcaatta tgctatgagc                                      30

<210> SEQ ID NO 42
<211> LENGTH: 51
<212> TYPE: DNA
<213> ORGANISM: Artificial Sequence
<220> FEATURE:
<223> OTHER INFORMATION: Nucleic acid sequence of HCDR2 of GRP94 E5

<400> SEQUENCE: 42
gggatctctt ctagtagtgg tagtacatat tacgctgatt ctgtaaaagg t              51

<210> SEQ ID NO 43

<210> SEQ ID NO 43
<211> LENGTH: 36
<212> TYPE: DNA
<213> ORGANISM: Artificial Sequence
<220> FEATURE:
<223> OTHER INFORMATION: Nucleic acid sequence of HCDR3 of GRP94 E5

<400> SEQUENCE: 43
gatcgtcatc cgttttcgcc taattggttc gactac   36

<210> SEQ ID NO 44
<211> LENGTH: 39
<212> TYPE: DNA
<213> ORGANISM: Artificial Sequence
<220> FEATURE:
<223> OTHER INFORMATION: Nucleic acid sequence of LCDR1 of GRP94 E5

<400> SEQUENCE: 44
agtggctctc catctaatat tggcagtaat actgtcacc   39

<210> SEQ ID NO 45
<211> LENGTH: 21
<212> TYPE: DNA
<213> ORGANISM: Artificial Sequence
<220> FEATURE:
<223> OTHER INFORMATION: Nucleic acid sequence of LCDR2 of GRP94 E5

<400> SEQUENCE: 45
gctgatagtc atcggccaag c   21

<210> SEQ ID NO 46
<211> LENGTH: 27
<212> TYPE: DNA
<213> ORGANISM: Artificial Sequence
<220> FEATURE:
<223> OTHER INFORMATION: Nucleic acid sequence of LCDR3 of GRP94 E5

<400> SEQUENCE: 46
gcttcttggg atgatagcct gaatggt   27

<210> SEQ ID NO 47
<211> LENGTH: 363
<212> TYPE: DNA
<213> ORGANISM: Artificial Sequence
<220> FEATURE:
<223> OTHER INFORMATION: Nucleic acid sequence of heavy chain variable
of GRP94 E5

<400> SEQUENCE: 47
gaggtgcagc tgttggagtc tgggggaggc ttggtacagc ctggggggtc cctgagactc   60
tcctgtgcgg cctctggatt caccttagc aattatgcta tgagctgggt ccgccaggct   120
ccagggaagg ggctggagtg gtctcaggg atctcttcta gtagtggtag tacatattac   180
gctgattctg taaaaggtcg gttcaccacc tccagagaca attccaagaa cacgctgtat   240
ctgcaaatga acagcctgag agccgaggac acggccgtgt attactgtgc gagagatcgt   300
catccgtttt cgcctaattg gttcgactac tggggccagg gtacactggt caccgtgagc   360
tca   363

<210> SEQ ID NO 48
<211> LENGTH: 330
<212> TYPE: DNA
<213> ORGANISM: Artificial Sequence
<220> FEATURE:
<223> OTHER INFORMATION: Nucleic acid sequence of light chain variable
of GRP94 E5

<400> SEQUENCE: 48

```
cagtctgtgc tgactcagcc accctcagcg tctgggaccc ccgggcagag ggtcaccatc      60
tcttgtagtg ctctccatc taatattggc agtaatactg tcacctggta ccagcagctc     120
ccaggaacgg cccccaaact cctcatctat gctgatagtc atcggccaag cggggtccct     180
gaccgattct ctggctccaa gtctggcacc tcagcctccc tggccatcag tgggctccgg     240
tccgaggatg aggctgatta ttactgtgct tcttgggatg atagcctgaa tggttatgtc     300
ttcggcggag gcaccaagct gacggtccta                                      330
```

<210> SEQ ID NO 49
<211> LENGTH: 30
<212> TYPE: DNA
<213> ORGANISM: Artificial Sequence
<220> FEATURE:
<223> OTHER INFORMATION: Nucleic acid sequence of HCDR1 of GRP94 2H5

<400> SEQUENCE: 49

```
ggattcacct ttagcggtta tgctatgagc                                       30
```

<210> SEQ ID NO 50
<211> LENGTH: 51
<212> TYPE: DNA
<213> ORGANISM: Artificial Sequence
<220> FEATURE:
<223> OTHER INFORMATION: Nucleic acid sequence of HCDR2 of GRP94 2H5

<400> SEQUENCE: 50

```
gcgatctctc atggtggtag tagtaaatat tacgctgatt ctgtaaaagg t              51
```

<210> SEQ ID NO 51
<211> LENGTH: 54
<212> TYPE: DNA
<213> ORGANISM: Artificial Sequence
<220> FEATURE:
<223> OTHER INFORMATION: Nucleic acid sequence of HCDR3 of GRP94 2H5

<400> SEQUENCE: 51

```
gatcttctta gtcctctgca gagtattggg tcttatgatg atgctatgga cgtc            54
```

<210> SEQ ID NO 52
<211> LENGTH: 39
<212> TYPE: DNA
<213> ORGANISM: Artificial Sequence
<220> FEATURE:
<223> OTHER INFORMATION: Nucleic acid sequence of LCDR1 of GRP94 2H5

<400> SEQUENCE: 52

```
agtggctctt catctaatat tggcagtaat actgtctcc                             39
```

<210> SEQ ID NO 53
<211> LENGTH: 21
<212> TYPE: DNA
<213> ORGANISM: Artificial Sequence
<220> FEATURE:
<223> OTHER INFORMATION: Nucleic acid sequence of LCDR2 of GRP94 2H5

<400> SEQUENCE: 53

```
gctgataata atcggccaag c                                                21
```

<210> SEQ ID NO 54
<211> LENGTH: 27
<212> TYPE: DNA

```
<213> ORGANISM: Artificial Sequence
<220> FEATURE:
<223> OTHER INFORMATION: Nucleic acid sequence of LCDR3 of GRP94 2H5

<400> SEQUENCE: 54
gcttcttggg atgatagcct gaatgct                                          27

<210> SEQ ID NO 55
<211> LENGTH: 381
<212> TYPE: DNA
<213> ORGANISM: Artificial Sequence
<220> FEATURE:
<223> OTHER INFORMATION: Nucleic acid sequence of heavy chain variable
      of GRP94 2H5

<400> SEQUENCE: 55
gaggtgcagc tgttggagtc tgggggaggc ttggtacagc ctgggggtc cctgagactc        60 tcctgtgcag cctctggatt cacctttagc ggttatgcta tgagctgggt ccgccaggct      120
ccagggaagg gctggagtg gtctcagcg atctctcatg gtggtagtag taaatattac        180
gctgattctg taaaaggtcg gttcaccatc tccagagaca attccaagaa cacgctgtat      240
ctgcaaatga acagcctgag agccgaggac acggccgtgt attactgtgc gaaagatctt      300
cttagtcctc tgcagagtat tgggtcttat gatgatgcta tggacgtctg gggccagggt      360
acactggtca ccgtgagctc a                                                381

<210> SEQ ID NO 56
<211> LENGTH: 330
<212> TYPE: DNA
<213> ORGANISM: Artificial Sequence
<220> FEATURE:
<223> OTHER INFORMATION: Nucleic acid sequence of light chain variable
      of GRP94 2H5

<400> SEQUENCE: 56
cagtctgtgc tgactcagcc accctcagcg tctgggaccc ccgggcagag ggtcaccatc       60
tcttgtagtg ctctttcatc taatattggc agtaatactg tctcctggta ccagcagctc     120
ccaggaacgg cccccaaact cctcatctat gctgataata tcggccaag cggggtccct      180 gaccgattct ctggctccaa gtctggcacc tcagcctccc tggccatcag tgggctccgg     240
tccgaggatg aggctgatta ttactgtgct cttgggatg atagcctgaa tgcttatgtc      300
ttcggcgggg gcaccaagct gacggtccta                                      330

<210> SEQ ID NO 57
<211> LENGTH: 30
<212> TYPE: DNA
<213> ORGANISM: Artificial Sequence
<220> FEATURE:
<223> OTHER INFORMATION: Nucleic acid sequence of HCDR1 of GRP94 3G7

<400> SEQUENCE: 57
ggattcaccc ttagcaatta ttctatgagc                                        30

<210> SEQ ID NO 58
<211> LENGTH: 51
<212> TYPE: DNA
<213> ORGANISM: Artificial Sequence
<220> FEATURE:
<223> OTHER INFORMATION: Nucleic acid sequence of HCDR2 of GRP94 3G7

<400> SEQUENCE: 58
gggatctatt atggtagtgg taataaatat tacgctgatt ctgtaaaagg t                51
```

<210> SEQ ID NO 59
<211> LENGTH: 21
<212> TYPE: DNA
<213> ORGANISM: Artificial Sequence
<220> FEATURE:
<223> OTHER INFORMATION: Nucleic acid sequence of HCDR3 of GRP94 3G7

<400> SEQUENCE: 59
aatctggctt cgttcgacta c                                         21

<210> SEQ ID NO 60
<211> LENGTH: 39
<212> TYPE: DNA
<213> ORGANISM: Artificial Sequence
<220> FEATURE:
<223> OTHER INFORMATION: Nucleic acid sequence of LCDR1 of GRP94 3G7

<400> SEQUENCE: 60
agtggctctt catctaatat tggcagtaat tctgtcaac                      39

<210> SEQ ID NO 61
<211> LENGTH: 21
<212> TYPE: DNA
<213> ORGANISM: Artificial Sequence
<220> FEATURE:
<223> OTHER INFORMATION: Nucleic acid sequence of LCDR2 of GRP94 3G7

<400> SEQUENCE: 61
tctaatagtc atcggccaag c                                         21

<210> SEQ ID NO 62
<211> LENGTH: 27
<212> TYPE: DNA
<213> ORGANISM: Artificial Sequence
<220> FEATURE:
<223> OTHER INFORMATION: Nucleic acid sequence of LCDR3 of GRP94 3G7

<400> SEQUENCE: 62
ggtacttggg attctagcct gagtggt                                   27

<210> SEQ ID NO 63
<211> LENGTH: 348
<212> TYPE: DNA
<213> ORGANISM: Artificial Sequence
<220> FEATURE:
<223> OTHER INFORMATION: Nucleic acid sequence of heavy chain variable
      of GRP94 3G7

<400> SEQUENCE: 63
gaggtgcagc tgttggagtc tgggggaggc ttggtacagc ctggggggtc cctgagactc      60
tcctgtgcag cctctggatt cacctttagc aattattcta tgagctgggt ccgccaggct     120
ccagggaagg ggctgagtg gtctcaggg atctattatg gtagtggtaa taaatattac      180
gctgattctg taaaaggtcg gttcaccatc tccagagaca attccaagaa cacgctgtat     240
ctgcaaatga acagcctgag agccgaggac acggccgtgt attactgtgc gaaaaatctg     300
gcttcgttcg actactgggg ccagggtaca ctggtcaccg tgagctca              348

<210> SEQ ID NO 64
<211> LENGTH: 330
<212> TYPE: DNA
<213> ORGANISM: Artificial Sequence
<220> FEATURE:
<223> OTHER INFORMATION: Nucleic acid sequence of light chain variable -continued of GRP94 3G7

<400> SEQUENCE: 64

```
cagtctgtgc tgactcagcc accctcagcg tctgggaccc ccgggcagag ggtcaccatc      60
tcttgtagtg gctcttcatc taatattggc agtaattctg tcaactggta ccagcagctc     120
ccaggaacgg cccccaaact cctcatctat tctaatagtc atcggccaag cggggtccct     180
gaccgattct ctggctccaa gtctggcacc tcagcctccc tggccatcag tgggctccgg     240
tccgaggacg aggctgatta ttactgtggt acttgggatt ctagcctgag tggttatgtc     300
ttcggcggag gcaccaagct gacggtccta                                      330
```

<210> SEQ ID NO 65
<211> LENGTH: 803
<212> TYPE: PRT
<213> ORGANISM: Artificial Sequence
<220> FEATURE:
<223> OTHER INFORMATION: Wilt-type rhGRP94

<400> SEQUENCE: 65

```
Met Arg Ala Leu Trp Val Leu Gly Leu Cys Cys Val Leu Leu Thr Phe
1               5                   10                  15

Gly Ser Val Arg Ala Asp Asp Glu Val Asp Val Gly Thr Val Glu
            20                  25                  30

Glu Asp Leu Gly Lys Ser Arg Glu Gly Ser Arg Thr Asp Asp Glu Val
        35                  40                  45

Val Gln Arg Glu Glu Glu Ala Ile Gln Leu Asp Gly Leu Asn Ala Ser
    50                  55                  60

Gln Ile Arg Glu Leu Arg Glu Lys Ser Glu Lys Phe Ala Phe Gln Ala
65                  70                  75                  80

Glu Val Asn Arg Met Met Lys Leu Ile Ile Asn Ser Leu Tyr Lys Asn
                85                  90                  95

Lys Glu Ile Phe Leu Arg Glu Leu Ile Ser Asn Ala Ser Asp Ala Leu
            100                 105                 110

Asp Lys Ile Arg Leu Ile Ser Leu Thr Asp Glu Asn Ala Leu Ser Gly
        115                 120                 125

Asn Glu Glu Leu Thr Val Lys Ile Lys Cys Asp Lys Glu Lys Asn Leu
    130                 135                 140

Leu His Val Thr Asp Thr Gly Val Gly Met Thr Arg Glu Glu Leu Val
145                 150                 155                 160

Lys Asn Leu Gly Thr Ile Ala Lys Ser Gly Thr Ser Glu Phe Leu Asn
                165                 170                 175

Lys Met Thr Glu Ala Gln Glu Asp Gly Gln Ser Thr Ser Glu Leu Ile
            180                 185                 190

Gly Gln Phe Gly Val Gly Phe Tyr Ser Ala Phe Leu Val Ala Asp Lys
        195                 200                 205

Val Ile Val Thr Ser Lys His Asn Asp Thr Gln His Ile Trp Glu
    210                 215                 220

Ser Asp Ser Asn Glu Phe Ser Val Ile Ala Asp Pro Arg Gly Asn Thr
225                 230                 235                 240

Leu Gly Arg Gly Thr Thr Ile Thr Leu Val Leu Lys Glu Glu Ala Ser
                245                 250                 255

Asp Tyr Leu Glu Leu Asp Thr Ile Lys Asn Leu Val Lys Lys Tyr Ser
            260                 265                 270

Gln Phe Ile Asn Phe Pro Ile Tyr Val Trp Ser Ser Lys Thr Glu Thr
        275                 280                 285
```

```
Val Glu Glu Pro Met Glu Glu Glu Ala Lys Glu Glu Lys Glu
    290             295             300
Glu Ser Asp Asp Glu Ala Ala Val Glu Glu Glu Glu Lys Lys
305             310             315             320
Pro Lys Thr Lys Lys Val Glu Lys Thr Val Trp Asp Trp Glu Leu Met
                325             330             335
Asn Asp Ile Lys Pro Ile Trp Gln Arg Pro Ser Lys Glu Val Glu Glu
            340             345             350
Asp Glu Tyr Lys Ala Phe Tyr Lys Ser Phe Ser Lys Glu Ser Asp Asp
        355             360             365
Pro Met Ala Tyr Ile His Phe Thr Ala Glu Gly Glu Val Thr Phe Lys
    370             375             380
Ser Ile Leu Phe Val Pro Thr Ser Ala Pro Arg Gly Leu Phe Asp Glu
385             390             395             400
Tyr Gly Ser Lys Lys Ser Asp Tyr Ile Lys Leu Tyr Val Arg Arg Val
                405             410             415
Phe Ile Thr Asp Asp Phe His Asp Met Met Pro Lys Tyr Leu Asn Phe
            420             425             430
Val Lys Gly Val Val Asp Ser Asp Asp Leu Pro Leu Asn Val Ser Arg
        435             440             445
Glu Thr Leu Gln Gln His Lys Leu Leu Lys Val Ile Arg Lys Lys Leu
    450             455             460
Val Arg Lys Thr Leu Asp Met Ile Lys Lys Ile Ala Asp Asp Lys Tyr
465             470             475             480
Asn Asp Thr Phe Trp Lys Glu Phe Gly Thr Asn Ile Lys Leu Gly Val
                485             490             495
Ile Glu Asp His Ser Asn Arg Thr Arg Leu Ala Lys Leu Leu Arg Phe
            500             505             510
Gln Ser Ser His His Pro Thr Asp Ile Thr Ser Leu Asp Gln Tyr Val
        515             520             525
Glu Arg Met Lys Glu Lys Gln Asp Lys Ile Tyr Phe Met Ala Gly Ser
    530             535             540
Ser Arg Lys Glu Ala Glu Ser Ser Pro Phe Val Glu Arg Leu Leu Lys
545             550             555             560
Lys Gly Tyr Glu Val Ile Tyr Leu Thr Glu Pro Val Asp Glu Tyr Cys
                565             570             575
Ile Gln Ala Leu Pro Glu Phe Asp Gly Lys Arg Phe Gln Asn Val Ala
            580             585             590
Lys Glu Gly Val Lys Phe Asp Glu Ser Glu Lys Thr Lys Glu Ser Arg
        595             600             605
Glu Ala Val Glu Lys Glu Phe Glu Pro Leu Leu Asn Trp Met Lys Asp
    610             615             620
Lys Ala Leu Lys Asp Lys Ile Glu Lys Ala Val Val Ser Gln Arg Leu
625             630             635             640
Thr Glu Ser Pro Cys Ala Leu Val Ala Ser Gln Tyr Gly Trp Ser Gly
                645             650             655
Asn Met Glu Arg Ile Met Lys Ala Gln Ala Tyr Gln Thr Gly Lys Asp
            660             665             670
Ile Ser Thr Asn Tyr Tyr Ala Ser Gln Lys Lys Thr Phe Glu Ile Asn
        675             680             685
Pro Arg His Pro Leu Ile Arg Asp Met Leu Arg Arg Ile Lys Glu Asp
    690             695             700
```

-continued

```
Glu Asp Asp Lys Thr Val Leu Asp Leu Ala Val Val Leu Phe Glu Thr
705                 710                 715                 720

Ala Thr Leu Arg Ser Gly Tyr Leu Leu Pro Asp Thr Lys Ala Tyr Gly
            725                 730                 735

Asp Arg Ile Glu Arg Met Leu Arg Leu Ser Leu Asn Ile Asp Pro Asp
            740                 745                 750

Ala Lys Val Glu Glu Pro Glu Glu Pro Glu Glu Thr Ala Glu
            755                 760                 765

Asp Thr Thr Glu Asp Thr Glu Gln Asp Glu Asp Glu Met Asp Val
            770                 775                 780

Gly Thr Asp Glu Glu Glu Thr Ala Lys Glu Ser Thr Ala Glu Lys
785                 790                 795                 800

Asp Glu Leu
```

<210> SEQ ID NO 66
<211> LENGTH: 777
<212> TYPE: PRT
<213> ORGANISM: Artificial Sequence
<220> FEATURE:
<223> OTHER INFORMATION: rhGRP94 Part. 1 (Asp 22- Glu 799)

<400> SEQUENCE: 66

```
Asp Asp Glu Val Asp Val Asp Gly Thr Val Glu Glu Asp Leu Gly Lys
1               5                   10                  15

Ser Arg Glu Gly Ser Arg Thr Asp Asp Glu Val Val Gln Arg Glu Glu
            20                  25                  30

Glu Ala Ile Gln Leu Asp Gly Leu Asn Ala Ser Gln Ile Arg Glu Leu
        35                  40                  45

Arg Glu Lys Ser Glu Lys Phe Ala Phe Gln Ala Glu Val Asn Arg Met
    50                  55                  60

Met Lys Leu Ile Ile Asn Ser Leu Tyr Lys Asn Lys Glu Ile Phe Leu
65                  70                  75                  80

Arg Glu Leu Ile Ser Asn Ala Ser Asp Ala Leu Asp Lys Ile Arg Leu
                85                  90                  95

Ile Ser Leu Thr Asp Glu Asn Ala Leu Ser Gly Asn Glu Glu Leu Thr
            100                 105                 110

Val Lys Ile Lys Cys Asp Lys Glu Lys Asn Leu Leu His Val Thr Asp
        115                 120                 125

Thr Gly Val Gly Met Thr Arg Glu Glu Leu Val Lys Asn Leu Gly Thr
    130                 135                 140

Ile Ala Lys Ser Gly Thr Ser Glu Phe Leu Asn Lys Met Thr Glu Ala
145                 150                 155                 160

Gln Glu Asp Gly Gln Ser Thr Ser Glu Leu Ile Gly Gln Phe Gly Val
                165                 170                 175

Gly Phe Tyr Ser Ala Phe Leu Val Ala Asp Lys Val Ile Val Thr Ser
            180                 185                 190

Lys His Asn Asn Asp Thr Gln His Ile Trp Glu Ser Asp Ser Asn Glu
        195                 200                 205

Phe Ser Val Ile Ala Asp Pro Arg Gly Asn Thr Leu Gly Arg Gly Thr
    210                 215                 220

Thr Ile Thr Leu Val Leu Lys Glu Glu Ala Ser Asp Tyr Leu Glu Leu
225                 230                 235                 240

Asp Thr Ile Lys Asn Leu Val Lys Lys Tyr Ser Gln Phe Ile Asn Phe
                245                 250                 255

Pro Ile Tyr Val Trp Ser Ser Lys Thr Glu Thr Val Glu Glu Pro Met
```

```
              260                 265                 270
Glu Glu Glu Glu Ala Ala Lys Glu Lys Glu Glu Ser Asp Asp Glu
            275                 280                 285
Ala Ala Val Glu Glu Glu Glu Lys Lys Pro Lys Thr Lys Lys
        290                 295                 300
Val Glu Lys Thr Val Trp Asp Trp Glu Leu Met Asn Asp Ile Lys Pro
305                 310                 315                 320
Ile Trp Gln Arg Pro Ser Lys Glu Val Glu Asp Glu Tyr Lys Ala
                325                 330                 335
Phe Tyr Lys Ser Phe Ser Lys Glu Ser Asp Asp Pro Met Ala Tyr Ile
                340                 345                 350
His Phe Thr Ala Glu Gly Glu Val Thr Phe Lys Ser Ile Leu Phe Val
            355                 360                 365
Pro Thr Ser Ala Pro Arg Gly Leu Phe Asp Glu Tyr Gly Ser Lys Lys
        370                 375                 380
Ser Asp Tyr Ile Lys Leu Tyr Val Arg Arg Val Phe Ile Thr Asp Asp
385                 390                 395                 400
Phe His Asp Met Met Pro Lys Tyr Leu Asn Phe Val Lys Gly Val Val
                405                 410                 415
Asp Ser Asp Asp Leu Pro Leu Asn Val Ser Arg Glu Thr Leu Gln Gln
                420                 425                 430
His Lys Leu Leu Lys Val Ile Arg Lys Lys Leu Val Arg Lys Thr Leu
            435                 440                 445
Asp Met Ile Lys Lys Ile Ala Asp Asp Lys Tyr Asn Asp Thr Phe Trp
        450                 455                 460
Lys Glu Phe Gly Thr Asn Ile Lys Leu Gly Val Ile Glu Asp His Ser
465                 470                 475                 480
Asn Arg Thr Arg Leu Ala Lys Leu Leu Arg Phe Gln Ser Ser His His
                485                 490                 495
Pro Thr Asp Ile Thr Ser Leu Asp Gln Tyr Val Glu Arg Met Lys Glu
            500                 505                 510
Lys Gln Asp Lys Ile Tyr Phe Met Ala Gly Ser Ser Arg Lys Glu Ala
        515                 520                 525
Glu Ser Ser Pro Phe Val Glu Arg Leu Leu Lys Lys Gly Tyr Glu Val
    530                 535                 540
Ile Tyr Leu Thr Glu Pro Val Asp Glu Tyr Cys Ile Gln Ala Leu Pro
545                 550                 555                 560
Glu Phe Asp Gly Lys Arg Phe Gln Asn Val Ala Lys Glu Gly Val Lys
                565                 570                 575
Phe Asp Glu Ser Glu Lys Thr Lys Glu Ser Arg Glu Ala Val Glu Lys
            580                 585                 590
Glu Phe Glu Pro Leu Leu Asn Trp Met Lys Asp Lys Ala Leu Lys Asp
        595                 600                 605
Lys Ile Glu Lys Ala Val Val Ser Gln Arg Leu Thr Glu Ser Pro Cys
    610                 615                 620
Ala Leu Val Ala Ser Gln Tyr Gly Trp Ser Gly Asn Met Glu Arg Ile
625                 630                 635                 640
Met Lys Ala Gln Ala Tyr Gln Thr Gly Lys Asp Ile Ser Thr Asn Tyr
                645                 650                 655
Tyr Ala Ser Gln Lys Lys Thr Phe Glu Ile Asn Pro Arg His Pro Leu
            660                 665                 670
Ile Arg Asp Met Leu Arg Arg Ile Lys Glu Asp Glu Asp Asp Lys Thr
        675                 680                 685
```

```
Val Leu Asp Leu Ala Val Val Leu Phe Glu Thr Ala Thr Leu Arg Ser
        690             695             700

Gly Tyr Leu Leu Pro Asp Thr Lys Ala Tyr Gly Asp Arg Ile Glu Arg
705             710             715             720

Met Leu Arg Leu Ser Leu Asn Ile Asp Pro Asp Ala Lys Val Glu Glu
        725             730             735

Glu Pro Glu Glu Glu Pro Glu Glu Thr Ala Glu Asp Thr Thr Glu Asp
        740             745             750

Thr Glu Gln Asp Glu Asp Glu Glu Met Asp Val Gly Thr Asp Glu Glu
        755             760             765

Glu Thr Ala Lys Glu Ser Thr Ala Glu
        770             775

<210> SEQ ID NO 67
<211> LENGTH: 198
<212> TYPE: PRT
<213> ORGANISM: Artificial Sequence
<220> FEATURE:
<223> OTHER INFORMATION: rhGRP94 part. 4 (Glu 602 - Glu 799)

<400> SEQUENCE: 67

Glu Lys Thr Lys Glu Ser Arg Glu Ala Val Glu Lys Glu Phe Glu Pro
1               5                   10                  15

Leu Leu Asn Trp Met Lys Asp Lys Ala Leu Lys Asp Lys Ile Glu Lys
            20                  25                  30

Ala Val Val Ser Gln Arg Leu Thr Glu Ser Pro Cys Ala Leu Val Ala
        35                  40                  45

Ser Gln Tyr Gly Trp Ser Gly Asn Met Glu Arg Ile Met Lys Ala Gln
50                  55                  60

Ala Tyr Gln Thr Gly Lys Asp Ile Ser Thr Asn Tyr Tyr Ala Ser Gln
65                  70                  75                  80

Lys Lys Thr Phe Glu Ile Asn Pro Arg His Pro Leu Ile Arg Asp Met
                85                  90                  95

Leu Arg Arg Ile Lys Glu Asp Glu Asp Asp Lys Thr Val Leu Asp Leu
            100                 105                 110

Ala Val Val Leu Phe Glu Thr Ala Thr Leu Arg Ser Gly Tyr Leu Leu
        115                 120                 125

Pro Asp Thr Lys Ala Tyr Gly Asp Arg Ile Glu Arg Met Leu Arg Leu
    130                 135                 140

Ser Leu Asn Ile Asp Pro Asp Ala Lys Val Glu Glu Glu Pro Glu Glu
145                 150                 155                 160

Glu Pro Glu Glu Thr Ala Glu Asp Thr Thr Glu Asp Thr Glu Gln Asp
                165                 170                 175

Glu Asp Glu Glu Met Asp Val Gly Thr Asp Glu Glu Glu Thr Ala
            180                 185                 190

Lys Glu Ser Thr Ala Glu
        195
```

ANTIBODY SPECIFICALLY BINDING TO GRP94 OR ANTIGEN-BINDING FRAGMENT THEREOF, AND USES THEREOF

CROSS-REFERENCE TO RELATED APPLICATIONS

This application is a national phase application of PCT Application No. PCT/KR2020/015037 filed on Oct. 30, 2020, which claims priority to Korean Patent Application Nos. 10-2020-0069868 filed on Jun. 9, 2020 and 10-2020-0069859 filed on Jun. 9, 2020. The entire disclosures of the applications identified in this paragraph are incorporated herein by reference.

TECHNICAL FIELD

The present disclosure has been made with the support of the Ministry of Science and ICT of the Republic of Korea under Project ID. No. 1711094522, Project No. 2019M3E5D5065844, which was conducted by Kookmin University Industry Academy Cooperation Foundation in the research program named "Development of next-generation antibody for therapy of colorectal cancer in cetuximab-resistant patient" as a branch of the research project titled "Project for Development of Innovative New Drug Pipeline", under the research management of the National Research Foundation of Korea, from Jun. 1, 2019 to Dec. 31, 2020.

The present disclosure relates to an antibody binding specifically to GRP94 or an antigen-binding fragment thereof and a use thereof.

BACKGROUND

Colorectal cancer (CRC) is the third most common cancer and the fourth leading cause of cancer-related deaths worldwide. A number of chemotherapeutic agents including 5-fluorouracil (5-FU), irinotecan, oxaliplatin, FOLFOX (leucovorin, 5-FU, and oxaliplatin), FOLFIRI (leucovorin, 5-FU, and irinotecan) and there combinations regimens, have been used as standard therapies for colorectal cancer. However, despite their clinical efficacy, these chemotherapeutic agents inhibit DNA synthesis and/or disrupt the structure of microtubules. With such mechanisms, the chemotherapeutic agents are known to cause various adverse effects such as hair loss, diarrhea, thrombocytopenia, and sensory alterations.

Therapeutic antibodies are the most effective targeted cancer therapy. Since the approval of the mouse anti-CD3 monoclonal antibody (OKT3) by the U.S. FDA, remarkable advances in DNA recombination technology have led to the production of various humanized and human antibodies.

Recently, Imclone Systems Inc. first developed cetuximab, a recombinant mouse/human chimeric monoclonal antibody that targets the epidermal growth factor receptor (EGFR), to treat patients with EGFR- and wild-type ki-ras2 kirsten rat sarcoma viral oncogene homolog (KRAS)-expressing colorectal cancer. However, cetuximab, although widely used in clinics, is not effective as a single agent and is recommended in combination with FOLFIRI or FOLFOX regimens.

Heinemann et al. reported that FOLFIRI plus cetuximab could be the preferred first-line regimen for patients with metastatic colorectal cancer. In addition, another unmet medical need of cetuximab cancer therapy is effective only in a limited number of colorectal patients. It is effective in approximately 10-20% of colorectal cancer patients and the other patients show cetuximab resistance due to gene mutations in downstream EGFR effectors, including KRAS, phosphoinositide-3-kinase catalytic subunit alpha (PI3KCA), phosphatase and tensin homolog (PTEN), and BRAF. Therefore, it is critical to identify novel potential therapeutic targets in colorectal cancer and develop novel therapeutics for improving the clinical outcomes of colorectal cancer therapy.

DISCLOSURE OF INVENTION

Technical Problem

Using phage display technology, the present inventors tried to isolate an antibody strongly binding to rhGRP94 from the human synthetic antibody library and succeeded in identifying, producing, and purifying four antibodies targeting GRP94. Leading to the present disclosure, the anti-GRP94 antibodies were demonstrated to specifically target cell surface GRP94 antigen and reduce the tumor growth, tumor invasion, and angiogenesis of cetuximab-resistant colorectal cancer.

Therefore, an aspect of the present disclosure is to provide an antibody or an antigen-binding fragment thereof binding specifically to GRP94.

Another aspect of the present disclosure is to provide a nucleic acid encoding the antibody or the antigen-binding fragment thereof.

A further aspect of the present disclosure is to provide a recombinant vector carrying the nucleic acid.

A yet further aspect of the present disclosure is to provide a host cell anchoring the recombinant vector.

Yet another aspect of the present disclosure is to provide a pharmaceutical composition including an antibody or an antigen-binding fragment thereof binding specifically to GRP94 and a pharmaceutically acceptable carrier.

Still another aspect of the present disclosure is to provide a GRP94 detecting composition or kit including an antibody or an antigen-binding fragment thereof binding specifically to GRP94.

Solution to Problem

According to an aspect thereof, the present disclosure provides an antibody or an antigen-binding fragment thereof binding specifically to GRP94.

In an embodiment of the present disclosure, the antibody or the antigen-binding fragment thereof includes: a heavy chain variable region including heavy chain CDR1 (HCDR1) having an amino acid sequence represented by general formula 1, HCDR2 having an amino acid sequence represented by general formula 2, and HCDR3; and a light chain variable region including light chain CDR1 (LCDR1) having an amino acid sequence represented by general formula 3, LCDR2 having an amino acid sequence represented by general formula 4, and LCDR3 having an amino acid sequence represented by general formula 5:

General Formula 1
GFTFSX$_6$YX$_8$MS

General Formula 2
X$_1$IX$_3$X$_4$X$_5$X$_6$X$_7$X$_8$X$_9$YYADSVKG

-continued

General Formula 3
$X_1GSX_4SNIGX_9NX_{11}VX_{13}$

General Formula 4
$X_1X_2X_3X_4RPS$

General Formula 5
$X_1X_2WDX_5SLX_8X_9$

General formulas 1 and 2 represent amino acid sequences of HCDR1 and HCDR2, respectively, in the heavy chain variable region of the antibody according to the present disclosure.

General formulas 3, 4, and 5 represent amino acid sequences of LCDR1, LCDR2, and LCDR3, respectively, in the light chain variable region of the antibody according to the present disclosure.

i) $X_6X_8$ in general formula 1 stand for NY, respectively, $X_1X_3X_4X_5X_6X_7X_8X_9$ in general formula 2 stand for GYPNSGST, respectively, and HCDR3 includes the amino acid sequence of SEQ ID NO: 3, $X_1X_4X_9X_{11}R_{13}$ in general formula 3 stand for TSNAS, respectively, $X_1X_2X_3X_4$ in general formula 4 stand for ADSH, respectively, and $X_1X_2X_5X_8X_9$ in general formula 5 stands for GAANA;

ii) X6X8 in general formula 1 stand for NA, respectively, X1X3X4X5X6X7X8X9 in general formula 2 stand for GSSSSGST, respectively, and HCDR3 includes the amino acid sequence of SEQ ID NO: 11, X1X4X9X11X13 in general formula 3 stand for SPSTT, respectively, X1X2X3X4 in general formula 4 stand for ADSH, respectively, and X1X2X5X8X9 in in general formula 5 stand for ASDNG, respectively;

iii) $X_6X_8$ in general formula 1 stand for GA, respectively, $X_1X_3X_4X_5X_6X_7X_8X_9$ in general formula 2 stand for ASHGGSSK, respectively, and HCDR3 includes the amino acid sequence of SEQ ID NO: 19, $X_1X_4X_9X_{11}R_{13}$ in general formula 3 stand for SSSTS, respectively, $X_1X_2X_3X_4$ in general formula 4 stand for ADNN, respectively, $X_1X_2X_5X_8X_9$ in general formula 5 stand for ASDNA, respectively; or iv) $X_6X_8$ in general formula 1 stand for NS, respectively, $X_1X_3X_4X_5X_6X_7X_8X_9$ in general formula 2 stand for GYYGSGNK, respectively, and HCDR3 includes the amino acid sequence of SEQ ID NO: 27, $X_1X_4X_9X_{11}R_{13}$ in general formula 3 stand for SSSSN, respectively, $X_1X_2X_3X_4$ in general formula 4 stand for SNSH, respectively, and $X_1X_2X_5X_8X_9$ in general formula 5 stand for GTSSG, respectively.

As used herein, the symbols represented by those such as "$X_n$", "$X_m$", etc. refer to amino acids at positions n, m, etc. in the sequences i) to viii) given above. In the symbols, n and m are integers indicating positions of amino acids from the N-terminus on the sequence. For example, $X_3$ and $X_7$ represent amino acids at positions 3 and 7 from the n-terminus of the sequence, respectively.

In one embodiment according to an aspect of the present disclosure, $X_n$ in sequence i) is independently selected from the group of interchangeable amino acids given thereto. It should be understood to a person skilled in the art that $X_n$ is selected from the amino acid residues as interchangeable residues given thereto and that the selection is independent of that for the amino acid of $X_m$ wherein n and m are different from each other. Therefore, an independent combination may be made between any of the residues given for $X_n$ position and any of the residues given for other various positions.

The term "GRP94" (glucose-regulated protein 94), as used herein, refers to a chaperone protein encoded by the HSP90B1 gene, also known as GP96, ERp99, or endoplasmin. GRP94 is reported to play an important in protein folding in the secretion pathway such as in Toll-like receptor and integrin and serve as an immune chaperone essential for controlling innate immunity and acquired immunity. Also, GRP94 is known as a therapeutic target for glaucoma, multiple myeloma, and metastatic cancer.

As used herein, the term "antibody" refers to an antibody specific for GRP94 and is intended to encompass an antigen-binding fragment of the antibody molecule as well as an intact antibody form.

An intact antibody consists of two full-length light chains and two full-length heavy chain, with disulfide linkages therebetween. Heavy chain constant domains are classified into gamma (γ), mu (μ), alpha (α), delta (δ), and epsilon (ε) types, with the subclassification of the gamma type into gamma 1 (γ1), gamma 2 (γ2), gamma 3 (γ3), and gamma 4 (γ4), and the alpha type into alpha 1 (α1) and alpha 2 (α2). Antibodies can be further classified by kappa (κ) and lambda (λ) types for light chain constant domains (Cellular and Molecular Immunology, Wonsiewicz, M. J., Ed., Chapter 45, pp. 41-50, W. B. Saunders Co. Philadelphia, PA (1991); Nisonoff, A., Introduction to Molecular Immunology, 2nd Ed., Chapter 4, pp. 45-65, sinauer Associates, Inc., Sunderland, MA (1984)).

As used herein, the term "antigen-binding fragment" means a fragment retaining the function of binding to an antigen and is intended to encompass Fab, F(ab'), F(ab')$_2$, chemically linked F(ab')$_2$, Fv, and so on. Of the antibody fragments, Fab has one antigen-binding site which takes on the structure composed of light chain and heavy chain variable domains, a light chain constant domain, and the first constant domain (CH1 domain) of the heavy chain. Fab' is different from Fab in that the former has a hinge region containing at least one cysteine residue at the C terminus of the heavy chain CH1 domain. An F(ab')$_2$ antibody is produced in such a way that a cysteine residue of the hinge region of Fab' forms disulfide bonding. Fv is a minimum antibody fragment having only a heavy chain variable domain and a light chain variable domain. A recombination technology for producing an Fv fragment is disclosed in the International Patent Publication filed under the patent cooperation treaty (PCT) WO 88/10649, WO 88/106630, WO 88/07085, WO 88/07086, and WO 88/09344. In case of two-chain Fv, a heavy chain variable domain and a light chain variable domain are linked to each other by means of non-covalent bonding while single-chain Fv consists of a heavy chain variable domain and a single chain variable domain which are linked to each other by means of covalent bonding generally via a peptide linker, or directly linked to each other at C-terminus, and thus may form a structure like a dimer, as shown in the two-chain Fv. Such antibody fragments may be obtained by using protease (for example, Fab may be obtained by performing restriction digestion of a whole antibody with papain, while F(ab')$_2$ fragment may be obtained by doing so with pepsin), and may be prepared by means of a gene recombination technology.

The antibody in the present disclosure is preferably in the form of scFv or in an intact form. In addition, the heavy chain constant domain may be any one isotype selected from gamma (γ), mu (μ), alpha (α), delta (δ), and epsilon (ε). Preferably, the constant domain may be a gamma 1 (IgG1), gamma 3 (IgG3), or gamma 4 (IgG4) isotype, with most preference for gamma 1 (IgG1) isotype. The light chain constant domain may be a kappa or lambda isotype, with preference for kappa isotype. Therefore, a preferred antibody of the present disclosure is in the form of scFv or IgG1 including a kappa (κ) light chain and a gamma 1 (γ1) heavy chain.

The term "heavy chain", as used herein, refers to a full-length heavy chain including: a variable domain $V_H$, which comprises amino acid sequences having enough variable domain sequences to allow the specificity to an antigen; and the three constant domains, $C_H1$, $C_H2$, and $C_H3$, and to any fragment thereof. As used herein, the term "light chain" refers to a full-length light chain including: a variable domain $V_L$ (Vk), which comprises amino acid sequences having enough variable domain sequences to allow the specificity to an antigen; and a constant domain, $C_L$ (Ck) and to any fragment thereof.

The term "CDR" (complementarity determining region), as used herein, refers to an amino acid sequence in a hypervariable region of an immunoglobulin heavy chain or light chain (Kabat et al., Sequences of Proteins of Immunological Interest, 4th Ed., U.S. Department of Health and Human Services, National Institutes of Health (1987)). Three CDRs exist in each of the heavy chain (CDRH1, CDRH2, and CDRH3) and the light chain (CDRL1, CDRL2, and CDRL3). CDRs provide contact residues which play an important role in binding the antibody to an antigen or an epitope.

Examples of the antibody of the present disclosure include, but are not limited to, monoclonal antibodies, multispecific antibodies (e.g., bispecific antibodies), human antibodies, humanized antibodies, chimeric antibodies, single-chain Fvs (scFvs), single-chain antibodies, Fab fragments, F(ab') fragments, disulfide-linked Fvs (sdFvs), anti-idiotypic (anti-Id) antibodies, and epitope-binding fragments of the antibodies.

The term "framework" or "FR", as used herein, refers to variable domain residues other than hypervariable region (HVR) residues. The FR of a variable domain generally consists of four FR domains: FR1, FR2, FR3, and FR4. Accordingly, the HVR and FR sequences generally appear in the following sequence in $V_H$ (or VL/Vk):
 (a) FRH1 (Framework region 1 of Heavy chain)-CDRH1 (complementarity determining region 1 of Heavy chain)-FRH2-CDRH2-FRH3-CDRH3-FRH4; and
 (b) FRL1 (Framework region 1 of Light chain)-CDRL1 (complementarity determining region 1 of Light chain)-FRL2-CDRL2-FRL3-CDRL3-FRL4.

The term "variable region" or "variable domain" refers to the domain of an antibody heavy or light chain responsible for binding the antibody to antigen. The variable domains of the heavy chain and light chain (VH and VL, respectively) of a native antibody generally have similar structures, with each domain comprising four conserved framework regions (FRs) and three hypervariable regions (HVRs). (Kindt et al. Kuby Immunology, 6$^{th}$ ed., W. H. Freeman and Co., page 91 (2007)). A single VH or VL domain may be sufficient to confer antigen-binding specificity. Furthermore, antibodies that bind a particular antigen may be isolated using a VH or VL domain from an antibody that binds the antigen to screen a library of complementary VL or VH domains, respectively.

The term "specifically binds" or similar expressions mean that an antibody or an antigen-binding fragment thereof, or another construct such as an scFv, forms a complex with an antigen that is relatively stable under physiologic conditions. Specific binding can be characterized by an equilibrium dissociation constant of at least about $1\times10^{-6}$ M or less (e.g., $9\times10^{-7}$ M, $8\times10^{-7}$ M, $7\times10^{-7}$ M, $6\times10^{-7}$ M, $5\times10^{-7}$ M, $4\times10^{-7}$ M, $3\times10^{-7}$ M, $2\times10^{-7}$ M, or $1\times10^{-7}$ M), preferably $1\times10^{-7}$ M or less (e.g., $9\times10^{-8}$ M, $8\times10^{-8}$ M, $7\times10^{-8}$ M, $6\times10^{-8}$ M, $5\times10^{-8}$ M, $4\times10^{-8}$ M, $3\times10^{-8}$ M, $2\times10^{-8}$ M, or $1\times10^{-8}$ M), more preferably $1\times10^{-8}$ M or less (e.g., $9\times10^{-9}$ M, $8\times10^{-9}$ M, $7\times10^{-9}$ M, $6\times10^{-9}$ M, $5\times10^{-9}$ M, $4\times10^{-9}$ M, $3\times10^{-9}$ M, $2\times10^{-9}$ M, or $1\times10^{-9}$ M) (e.g., a smaller $K_D$ denotes a tighter binding). Methods for determining whether two molecules specifically bind are well known in the art and include, for example, equilibrium dialysis, surface plasmon resonance, and the like. An isolated antibody that specifically binds human GRP94 may, however, exhibit cross-reactivity to other antigens such as GRP94 molecules from other species.

As used herein, the term "affinity" refers to total strength of noncovalent interactions between a single binding site of a molecule (e.g., an antibody) and its binding partner (e.g., an antigen). Unless specified otherwise, "binding affinity", as used herein, refers to intrinsic binding affinity which reflects a 1:1 interaction between members of a binding pair (e.g., antibody and antigen). The affinity of a molecule Y for its partner Y can generally be represented by the dissociation constant (Kd). Affinity can be measured by common methods known in the art.

A "human antibody" is one which possesses an amino acid sequence which corresponds to that of an antibody produced by a human or a human cell or derived from a non-human source that utilizes human antibody repertoires or other human antibody-encoding sequences. This definition of a human antibody excludes a humanized antibody, which comprises non-human antigen-binding residues.

The term "chimeric" antibody, as used herein, refers to an antibody in which a portion of the heavy and/or light chain is derived from a particular source or species, while the remainder of the heavy and/or light chain is derived from a different source or species.

As used herein, the term "humanized antibody" refers to a chimeric immunoglobulin which includes the minimal sequence derived from non-human immunoglobulin of non-human (e.g., mouse) antibodies, an immunoglobulin chain or fragment thereof (e.g., Fv, Fab, Fab', F(ab')$_2$ or other antigen-binding subsequences of the antibody). In most cases, humanized antibodies are human immunoglobulins (recipient antibodies) in which residues from a complementarity-determining region (CDR) of the recipient are replaced by residues from a CDR of a non-human species (donor antibody), such as mouse, rat or rabbit having desired specificity, affinity, and capacity. In some instances, Fv framework region (FR) residues of the human immunoglobulin are replaced by corresponding non-human residues. In addition, humanized antibodies may include residues which are found neither in the recipient antibody nor in the imported CDR or framework sequences. These modifications are made to further improve and optimize antibody performance. In general, the humanized antibody will include substantially all of at least one, and typically two, variable domains, in which all or substantially all of the CDR regions correspond to CDR regions of a non-human immunoglobulin and all or substantially all of the FR regions have sequences of FR regions of a human immunoglobulin sequence. The humanized antibody includes at least a portion of an immunoglobulin constant region (Fc region), typically a constant region (Fc region) of a human immunoglobulin.

In an embodiment of the present disclosure, the antibody or the antigen-binding fragment thereof includes any one of i) to iv):
 i) HCDR1, HCDR2, and HCDR3 having amino acid sequences of SEQ ID NOS: 1 to 3, respectively, and LCDR1, LCDR2, and LCDR3 having amino acid sequences of SEQ ID NOS: 4 to 6, respectively;

ii) HCDR1, HCDR2, and HCDR3 having amino acid sequences of SEQ ID NOS: 9 to 11, respectively, and LCDR1, LCDR2, and LCDR3 having amino acid sequences of SEQ ID NOS: 12 to 14, respectively;

iii) HCDR1, HCDR2, and HCDR3 having amino acid sequences of SEQ ID NOS: 17 to 19, respectively, and LCDR1, LCDR2, and LCDR3 having amino acid sequences of SEQ ID NOS: 20 to 22, respectively; and iv) HCDR1, HCDR2, and HCDR3 having amino acid sequences of SEQ ID NOS: 25 to 27, respectively, and LCDR1, LCDR2, and LCDR3 having amino acid sequences of SEQ ID NOS: 28 to 30, respectively.

In an embodiment of the present disclosure, the antibody or the antigen-binding fragment thereof includes any one of i) to iv):

i) a heavy chain variable region including the amino acid sequence of SEQ ID NO: 7 and a light chain variable region including the amino acid sequence of SEQ ID NO: 8;

ii) a heavy chain variable region including the amino acid sequence of SEQ ID NO: 15 and a light chain variable region including the amino acid sequence of SEQ ID NO: 16;

iii) a heavy chain variable region including the amino acid sequence of SEQ ID NO: 23 and a light chain variable region including the amino acid sequence of SEQ ID NO: 24; and iv) a heavy chain variable region including the amino acid sequence of SEQ ID NO: 31 and a light chain variable region including the amino acid sequence of SEQ ID NO: 32.

The anti-GRP94 antibody or the antigen-binding fragment thereof according to the present disclosure includes variants of amino acid sequences accepted by a person skilled in the art so long as they are capable of specifically recognizing GRP94. For example, amino acid sequences of antibodies may be altered to improve binding affinity and/or the other biological characteristics of antibodies. For example, such alterations include deletion, insertion and/or substitution of amino acid residues of antibodies.

The term "substantial identity" or "substantially identical," as used herein in the context of the variants, indicates that two peptide sequences, when optimally aligned, such as by the programs GAP or BESTFIT using default gap weights, share at least about 90% sequence identity and more preferably about 95%, 98%, or 99% sequence identity. Preferably, residue positions which are not identical differ by conservative amino acid substitutions. A "conservative amino acid substitution" is one in which an amino acid residue is substituted by another amino acid residue having a side chain (R group) with similar chemical properties (e.g., charge or hydrophobicity). In general, a conservative amino acid substitution will not substantially change the functional properties of a protein. In cases where two or more amino acid sequences differ from each other by conservative substitutions, the percent sequence identity or degree of similarity may be adjusted upwards to correct for the conservative nature of the substitution.

Such amino acid variations may be provided on the basis of a relative similarity of amino acid side chains, e.g., hydrophobicity, hydrophilicity, charge, and size. By the analysis for size, shape, and type of the amino acid side chains, it could be clear that all of arginine, lysine, and histidine residues are those having positive charge; alanine, glycine, and serine have a similar size; phenylalanine, tryptophan, and tyrosine have a similar shape. Accordingly, based on these considerable factors, arginine, lysine and histidine; alanine, glycine and serine; and phenylalanine, tryptophan and tyrosine may be considered to be functional equivalents biologically.

In the introduction of variations, the hydropathic index of amino acids may be considered. Each amino acid has been assigned a hydropathic index on the basis of hydrophobicity and charge characteristics thereof: isoleucine (+4.5); valine (+4.2): leucine (+3.8); phenylalanine (+2.8); cysteine/cysteine (+2.5); methionine (+1.9); alanine (+1.8); glycine (−0.4); threonine (−0.7); serine (−0.8); tryptophan (−0.9); tyrosine (−1.3); proline (−1.6); histidine (−3.2); glutamate (−3.5); glutamine (−3.5): aspartate (−3.5); asparagine (−3.5); lysine (−3.9); and arginine (−4.5).

The hydrophobic amino acid indexes are very important in assigning interactive biological functions of proteins. It is known in the art that certain amino acids may be substituted by other amino acids having a similar hydropathic index and still result in similar biological activity. In cases where a variation is introduced with reference to the hydrophobic indexes, the substitution is made between amino acids having a difference in the hydrophobic index within preferably ±2, more preferably ±1, and still more preferably ±0.5.

Meanwhile, it is also well known that substitutions between amino acids having similar hydrophilicity values result in proteins with equivalent biological activity. As disclosed in U.S. Pat. No. 4,554,101, each amino acid residue has been assigned the following hydrophilicity values: arginine (+3.0); lysine (+3.0); aspartate (+3.0±1); glutamate (+3.0±1); serine (+0.3); asparagine (+0.2); glutamine (+0.2); glycine (0); threonine (−0.4); proline (−0.5±1); alanine (−0.5); histidine (−0.5); cysteine (−1.0); methionine (−1.3); valine (−1.5); leucine (−1.8); isoleucine (−1.8); tyrosine (−2.3); phenylalanine (−2.5); tryptophan (−3.4).

In cases where variations are introduced with reference to the hydrophilicity values, substitutions may be made between amino acids that exhibit a hydrophilicity value difference of preferably within ±2, more preferably within ±1, and even more preferably within ±0.5.

Amino acid exchanges in proteins which do not entirely alter activity of a molecule are known in the art (H. Neurath, R. L. Hill, The Proteins, Academic Press, New York, 1979). The most common occurring exchanges are exchanges between amino acid residues Ala/Ser, Val/Ile, Asp/Glu, Thr/Ser, Ala/Gly, Ala/Thr, Ser/Asn, Ala/Val, Ser/Gly, Thy/Phe, Ala/Pro, Lys/Arg, Asp/Asn, Leu/Ile, Leu/Val, Ala/Glu, and Asp/Gly.

In an embodiment of the present disclosure, the antibodies binding specifically to GRP94 or the antigen-binding fragments thereof according to the present disclosure are expressed as B5, E5, 2H5, and 3G7, respectively.

In an embodiment of the present disclosure, the antibody or the antigen-binding fragment thereof has a dissociation constant $K_D$ of $10^{-8}$ M or less.

In another embodiment of the present disclosure, the antibodies or the antigen-binding fragments thereof according to the present disclosure have the activity of inhibiting the growth of at least one tumor cell line selected from the group consisting of HCT-8, HT-29, LoVo, HCT-116, and Caco-2, in vitro and in vivo.

In one embodiment of the present disclosure, the antibodies or antigen-binding fragments thereof according to the present disclosure bind to GRP94 at its constituent domains including the N-terminal domain (NTD), the $Ca^{2+}$ binding domain (charger linker domain), or the middle domain (MD), but not at the C-terminal domain (CTD). When binding to different domains of the target antigen, the antibodies or antigen-binding fragments thereof can exhibit different influences on the activity of target antigen (e.g., GRP94).

In an embodiment of the present disclosure, the antibody or the antigen-binding fragment thereof does neither have influence on the viability of vascular endothelial cells, nor induce the activation of vascular endothelial cells (i.e., cell adhesion molecule expression of vascular endothelial cells), thus exhibiting no toxicity against vascular endothelial cells.

In an embodiment of the present disclosure, the antibody or the antigen-binding fragment thereof according to the present disclosure binds to cell surface GRP94 antigen of colorectal cancer cells and penetrates into the cells. Once entering cells, the antibody or the antigen-binding fragment thereof according to the present disclosure downregulates the expression level of cell surface GRP94.

In an embodiment of the present disclosure, the antibody or the antigen-binding fragment thereof according to the present disclosure does neither exhibit hepatoxicity nor nephrotoxicity in vivo.

In an embodiment of the present disclosure, the antibody or the antigen-binding fragment thereof according to the present disclosure may be prepared into an antibody drug conjugate (ADC) in which the antibody or the antigen-binding fragment thereof is conjugated with a drug. Here, the drug is a cytotoxic agent or a chemotherapeutic agent.

In an exemplary embodiment of the present disclosure, the cytotoxic agent or chemotherapeutic agent may be selected from 5-fluorouracil, 6-mercaptopurine, 6-thioguanine, 9-aminocamptothecin, actinomycin D, amanitine, aminopterin, anthracycline, anthramycin (AMC), auristatin (monomethyl auristatin F or monomethyl auristatin F), bleomycin, busulfan, butyric acid, calicheamicin, camptothecin, cisplatin, cyclophosphamide, cytarabine, daunorubicin, doxorubicin, irinotecan, mitoxantrone, taxol, topotecans, vinblastine, vincristine, and derivatives thereof, but with no limitations thereto.

When the antibody or the antigen-binding fragment thereof according to the present disclosure is prepared in the form of an antibody-drug conjugate, the drug (payload) may be conjugated with the anti-GRP94 antibody or the antigen-binding fragment thereof by a covalent bond via a chemical linker. As used herein, the term "linker" refers to any moiety that links, connects, or bonds a binder (e.g., an antibody or an antigen-binding fragment thereof) with the drug described herein. Binding agent linkers suitable for the antibody conjugate described herein are those that are sufficiently stable to exploit the circulating half-life of the antibody and, at the same time, capable of releasing its payload after antigen-mediated internalization of the conjugate. The linkers can be cleavable or non-cleavable. Cleavable linkers include linkers that are cleaved by intracellular metabolism following internalization, e.g., cleavage via hydrolysis, reduction, or enzymatic reaction. Non-cleavable linkers include linkers that release an attached payload via lysosomal degradation of the antibody following internalization. Suitable linkers include, but are not limited to, acid-labile linkers, enzymatically cleavable linkers, reduction labile linkers, self-immolative linkers, and non-cleavable linkers. Suitable linkers also include, but are not limited to, those that are or comprise peptides, glucuronides, succinimide-thioethers, polyethylene glycol (PEG) units, hydrazones, mal-caproyl units, dipeptide units, valine-citruline units, and para-aminobenzyl (PAB) units.

In another embodiment of the present disclosure, the antibody or the antigen-binding fragment thereof according to the present disclosure may be provided as a complex in which the antibody binding specifically to GRP94 or the antigen-binding fragment thereof and a polypeptide are linked to each other. No particular limitations are imparted to the polypeptide. For example, the polypeptide may be a different antibody or an antigen-binding fragment thereof, or a target binding polypeptide. In the complex, the constituents may be linked through a covalent bond. According to an embodiment, the complex may be embodied in the form of a fusion protein or a conjugate. The antibody or the antigen-binding fragment thereof may be connected to the polypeptide directly or via a linker (e.g., amino acid linker).

In another embodiment, the antibody or the antigen-binding fragment thereof according to the present disclosure may function as an extracellular domain in a chimeric antigen receptor (CAR). When the antibody binding specifically to GRP94 or the antigen-binding fragment thereof according to the present disclosure is used as an extracellular domain in a chimeric antigen receptor, the chimeric antigen receptor includes: (a) the anti-GRP94 antibody or the antigen-binding fragment thereof; (b) a transmembrane domain; and an intracellular signaling domain.

In an exemplary embodiment of the present disclosure, the transmembrane domain includes a transmembrane domain of a protein selected from the group consisting of the alpha, beta, or zeta chain of a T-cell receptor, CD27, CD28, CD3 epsilon, CD45, CD4, CD5, CD8 (CD8a), CD9, CD16, CD22, CD33, CD37, CD64, CD80, CD86, CD134, CD137, and CD154.

In an exemplary embodiment of the present disclosure, the intracellular signaling domain is a domain derived from the CD3 (CD3 zeta) chain and may further include a costimulatory molecule selected from the group consisting of OX40 (CD134), CD2, CD27, CD28, CDS, ICAM-1, LFA-1 (CD11a/CD18), and 4-1BB (CD137).

The chimeric antigen receptor of the present disclosure may be expressed in an effector cell selected from the group consisting of a dendritic cell, a killer dendritic cell, a mast cell, a natural killer cell, a B lymphocyte, a T lymphocyte, a macrophage, and a precursor cell thereof.

Provided according to another aspect of the present disclosure is a nucleic acid molecule encoding the antibody binding specifically to GRP94 or the antigen-binding fragment of the present disclosure.

As used herein, the term "nucleic acid molecule" is intended to comprehensively encompass RNA molecules as well as DNA (gDNA and cDNA), and nucleotides, which account for a basic unit of nucleic acid molecules, include not only natural nucleotides but also analogues having modified sugar or base moieties (Scheit, Nucleotide Analogs, John Wiley, New York (1980); Uhlman and Peyman, Chemical Reviews, 90:543-584(1990))

Considering biologically equivalent variations described in the foregoing, the nucleic acid molecule coding for the amino acid sequence accounting for the antibody or antigen-binding fragment of the present disclosure is construed to encompass sequences having substantial identity to them. Sequences having the substantial identity show at least 60% (e.g., 61%, 62%, 63%, 64%, 65%, 66%, 67%, 68%, or 69%), particularly at least 70% (e.g., 71%, 72%, 73%, 74%, 75%, 76%, 77%, 78%, or 79%), more particularly at least 80% (e.g., 81%, 82%, 83%, 84%, 85%, 86%, 87%, 88%, or 89%), even more particularly at least 90% (e.g., 91%, 92%, 93%, 94%, 95%, 96%, 97%, 98%, or 99%), most particularly at least 95 (e.g., 95%, 96%, 97%, 98%, or 99%) similarity to the nucleic acid molecule of this disclosure, as measured by using one of the sequence comparison algorithms for the sequences of the present disclosure aligned to any sequence, with maximum correspondence therebetween.

Methods of alignment of sequences for comparison are well-known in the art. Various programs and alignment algorithms are disclosed in: Smith and Waterman, Adv. Appl. Math. 2:482(1981); Needleman and Wunsch, J. Mol. Bio. 48:443(1970); Pearson and Lipman, Methods in Mol. Biol. 24: 307-31(1988); Higgins and Sharp, Gene 73:237-44(1988); Higgins and Sharp, CABIOS 5:151-3(1989); Corpet et al., Nuc. Acids Res. 16:10881-90(1988); Huang et al., Comp. Appl. BioSci. 8:155-65(1992) and Pearson et al., Meth. Mol. Biol. 24:307-31(1994), but without limitations thereto.

In an exemplary embodiment of the present disclosure, the nucleic acid molecule of the present disclosure includes the nucleotide sequences of SEQ ID NOS: 33 to 64, fragments thereof, or a combination thereof.

Provided according to an aspect of the present disclosure is a recombinant vector carrying the nucleic acid molecule of the present disclosure described above.

As used herein, the term "vector" refers to a means for expressing a target gene in a host cell and is intended to encompass a variety of vectors including: plasmid vectors; cosmid vectors; and viral vectors such as bacteriophage vectors, adenovirus vectors, retrovirus vectors, and adeno-associated virus vectors.

According to a preferable embodiment of the present disclosure, the nucleic acid molecule coding for the light chain variable domain and the nucleic acid molecule coding for the heavy chain variable domain are operatively linked to a promoter in the vector of the present disclosure.

As used herein, the term "operatively linked" refers to a functional linkage between a nucleic acid expression control sequence (e.g., a promoter, a signal sequence, or an array of transcription regulation factor binding sites) and a nucleic acid sequence of interest, by which the transcription and/or translation of the nucleic acid sequence of interest can be governed.

The recombinant vector system of the present disclosure can be constructed by various methods known in the art. For concrete methods, reference may be made to Sambrook et al., Molecular Cloning, A Laboratory Manual, Cold Spring Harbor Laboratory Press (2001), which is incorporated in its entirety herein by reference.

The vector of the present disclosure may be constructed as a vector for gene cloning, a vector for gene expression, or a vector for gene delivery. In addition, the vector of the present disclosure may be constructed by using a prokaryotic or eukaryotic cell as a host.

For example, when the vector of the present disclosure is an expression vector, with a eukaryotic cell serving as a host, advantage is taken of a promoter derived from the genome of a mammalian cell (e.g., metallothionein promoter, β-actin promoter, human hemoglobin promoter, and human muscle creatine promoter) or a promoter derived from mammalian viruses (e.g., adenovirus late promoter, vaccinia virus 7.5K promoter, SV40 promoter, cytomegalovirus promoter, tk promoter of HSV, mouse mammary tumor virus (MMTV) promoter, LTR promoter of HIV, promoter of Moloney virus, promoter of Epstein-Barr virus (EBV), and promoter of Rous sarcoma virus (RSV)), with a polyadenylated sequence commonly employed as a transcription termination sequence in the vector.

The vector of the present disclosure may be fused with a different sequence to facilitate the purification of the antibody expressed therefrom. Examples of the fusion sequence include glutathione S-transferase (Pharmacia, USA), maltose binding protein (NEB, USA), FLAG (IBI, USA), and 6×His (hexahistidine; Quiagen, USA).

Since the protein expressed by the vector of the present disclosure is an antibody, the expressed antibodies can be easily purified through protein A column or the like even without additional sequences for purification.

The expression vector of the present disclosure includes, as a selective marker, an antibiotic agent-resistant gene that is ordinarily used in the art, examples of which include resistant genes against ampicillin, gentamycin, carbenicillin, chloramphenicol, streptomycin, kanamycin, geneticin, neomycin, and tetracycline.

According to another aspect thereof, the present disclosure provides a host cell transformed with the recombinant vector.

So long as it is capable of performing continuous cloning and expression while stabilizing the vector of the present disclosure, any host cell known in the art may be used. Examples of the eukaryotic host cells suitable for the vector include monkey kidney cells 7 (COS7), NSO cells, SP2/0, Chinese hamster ovary (CHO) cells, W138, baby hamster kidney (BHK) cells, MDCK, myeloma cell lines, HuT 78 cells, and HEK-293, but are not limited thereto.

As used herein, the term "transformed", "transduced", or "transfected" refers to pertaining to the delivery or introduction of a foreign nucleic acid into a host cell. The "transformed", "transduced", or "transfected" cells are cells into which a foreign nucleic acid is transformed, transduced, or transfected. Within the scope of the transformed, transduced, or transfected cells, the cells themselves and progeny cells thereof obtained through passages fall.

Provided in accordance with still another aspect of the present disclosure is a pharmaceutical composition comprising: (a) the antibody or antigen-binding fragment binding specifically to GRP94; and (b) a pharmaceutically acceptable carrier.

According to an embodiment of the present disclosure, the pharmaceutical composition is adapted for treating cancer, for inhibiting cancer metastasis, or for suppressing angiogenesis.

As used herein, the term "angiogenesis" refers to a process wherein new capillary vessels are formed from the existing microvessels, and angiogenesis normally occurs during embryonic development, tissue regeneration and wound healing, corpus lutem development which is periodic change in female reproductive system, and even in this case, angiogenesis is stringently controlled and progressed (Folkman J et al., Int. Rev. Exp. Pathol., 16, pp 207-248, 1976). In the adult, vascular endothelial cells grow very slowly, and relatively do not divide well compared to other kinds of cells. The process of angiogenesis generally consists of decomposition of vascular basement membrane due to protease by stimulation of angiogenesis promoter, migration of vascular endothelial cells, proliferation, and tube formation by differentiation of vascular endothelial cells to reconstitute blood vessels to produce new capillary vessels. However, there are diseases caused by failure of self-regulation of angiogenesis and abnormal growth.

The diseases related to angiogenesis occurring at pathological states include hemangioma, vascular fibroma, vascular malformation, and cardiovascular disease such as atherosclerosis, vascular adhesion, and scleroderma, and ophthalmic diseases caused by angiogenesis include angiogenesis due to corneal transplantation, neovascular glaucoma, diabetic retinopathy, corneal disease caused by angiogenesis, macular degeneration, pterygium, retinal degeneration, retrolental fibroplasias, granular conjunctivitis, and the like.

Chronic inflammatory diseases such as arthritis, dermatological diseases such as psoriasis, capillarectasia, pyogenic granuloma, seborrheic dermatitis, acne, Alzheimer's diseases and obesity are also related to angiogenesis, and cancer growth and metastasis are necessarily dependent upon angiogenesis (D'Amato R J et al., Ophthalmology, 102(9), pp 1261-1262, 1995; Arbiser J L, J. Am. Acad. Dermatol., 34(3), pp 486-497, 1996; O'Brien K D et al. Circulation, 93(4), pp 672-682, 1996; Hanahan D et al., Cell, 86, pp 353-364, 1996).

Particularly, in cancer, angiogenesis plays an important function for cancer cell growth and metastasis. Tumor is supplied with nutrient and oxygen required for growth through angiogenesis, and angiogenetic blood vessels penetrated into tumor provide a pathway for cancer cells to enter into blood circulation system thereby allowing metastasis of cancer cells (Folkman and Tyler, Cancer Invasion and metastasis, Biologic mechanisms and Therapy (S. B. Day ed.) Raven press, New York, pp 94-103, 1977; Polverini P J, Crit. Rev. Oral. Biol. Med., 6(3), pp 230-247, 1995). The main cause of death in cancer patients is metastasis, and metastasis is the reason why chemotherapy and immunotherapy that are currently used in clinical trials fail to contribute to increasing the survival rates of cancer patients.

Arthritis, which is a representative inflammatory disease, is caused by autoimmune abnormalities, but due to pathological progression, chronic inflammation in a synovial cavity between joints may induce angiogenesis, thereby destroying cartilage. That is, by means of cytokines inducing inflammation, synovial and vascular endothelial cells are proliferated in the synovial cavity, leading to angiogenesis, and accordingly, the pannus junction, which is the connective tissue layer formed in the cartilage, thereby destroying the cartilage acting as a cushion (refer to Koch A E et al., Arthritis. Rheum., 29, pp 471-479, 1986; Stupack D G et al., Braz J. Med. Biol. Rcs., 32(5), pp 578-581, 1999; Koch A E, Arthritis. Rheum., 41(6), pp 951-962, 1998).

Many ophthalmologic diseases including blindness occurring in millions of worldwide people year after year are caused by angiogenesis (refer to Jeffrey M I et al., J. Clin. Invest., 103, pp 1231-1236, 1999). Representative examples of diseases that are caused by angiogenesis include macular degeneration in the old, diabetic retinopathy, retinopathy of prematurity, neovascular glaucoma, and corneal diseases associated with angiogenesis (Adamis A P et al., Angiogenesis, 3, pp 9-14, 1999). Among others, diabetic retinopathy is a complication of diabetes, eventually leading to blindness due to invasion of the capillaries in the retina into the vitreous cavity.

Psoriasis characterized by redness and scaling skin is also a chronic proliferative disease occurring on the skin, but if not cured, psoriasis is accompanied by pain and deformity. Keratinocytes normally proliferate once a month, whereas keratinocytes in patients with psoriasis proliferate at least once a week. Since such rapid proliferation requires the supply of much blood, angiogenesis is actively bound to happen (Folkman J, J. Invest. Dermatol., 59, pp 40-48, 1972).

As used herein, the term "cancer metastasis" refers to the migration of tumor cells from one organ or part to another separated by a distance. Cancer metastasis proceeds through multiple stages: in-situ tumor invades the basement membrane (invasion); cancer cells passing through the basement membrane enter the circulatory system through the blood or lymphatic vessels (intravasation); and after blood circulation, the cancer cells captured by another organ undergo entry into latency as single cells or as indolent micrometastases and then ultimately form metastatic colonization along with vascularization.

In an exemplary embodiment of the present disclosure, the cancer includes solid cancer or blood cancer.

The term "solid cancer", as used herein, refers to a malignant tumorous lump caused by abnormal cellular growth in various solid organs such as the bladder, breast, intestine, kidney, lung, liver, brain, esophagus, gallbladder, ovary, pancreas, stomach, cervical uterus, thyroid, prostate, and skin, with a difference in trait from blood cancer.

In an embodiment of the present disclosure, the solid cancer is at least one selected from the group consisting of gastric cancer, rectal cancer, colon cancer, colorectal cancer, inflammation-related colon cancer, liver cancer, lung cancer (non-small cell lung cancer, lung adenocarcinoma), ovarian cancer, melanoma, pancreatic cancer, uterine cancer, testicular cancer, and breast cancer, but is not limited thereto (Wu et al., Adv Cancer Res. 2016; 129:165-90; Ansa-Addo et al., Curr Top Med Chem. 2016; 16(25): 2765-2778).

As used herein, the term "blood cancer" refers to cancer occurring in a blood constituent, for example, a malignant tumor in blood, hematopoietic organs, lymph nodes, lymphoid organs, etc.

In an embodiment of the present disclosure, the blood cancer is at least one selected from the group consisting of acute myelogenous leukemia, acute lymphocytic leukemia, chronic myelogenous leukemia, chronic lymphocytic leukemia, acute monocytic leukemia, multiple myeloma, Hodgkin's lymphoma, and non-Hodgkin's lymphoma, but is not limited thereto.

So long as it is typically used for formulation, any pharmaceutically acceptable carrier may be contained in the pharmaceutical composition of the present disclosure. Examples of the pharmaceutically acceptable carrier include lactose, dextrose, sucrose, sorbitol, mannitol, starch, acacia gum, calcium phosphate, alginate, gelatin, calcium silicate, microcrystalline cellulose, polyvinylpyrrolidone, cellulose, water, syrup, methyl cellulose, methyl hydroxybenzoate, propyl hydroxybenzoate, talc, magnesium stearate, and mineral oil, but are not limited thereto. The pharmaceutical composition of the present disclosure may further include a lubricant, a wetting agent, a sweetener, a flavorant, an emulsifier, a suspending agent, a preservative, and the like in addition to the above ingredients. With regard to suitable pharmaceutically acceptable carriers and preparations, reference may be made to Remington's Pharmaceutical Sciences (19th ed., 1995).

The pharmaceutical composition of the present disclosure may be administered orally or parentally, for example, by intravenous injection, subcutaneous injection, intramuscular injection, intraperitoneal injection, topical administration, intranasal administration, intrapulmonary administration, rectal administration, or the like.

According to an embodiment of the present disclosure, the administration may be conducted intravenously, intravitreally, intrathecally, parenterally, subcutaneously, transdermally, or by infusion.

The appropriate dose of the pharmaceutical composition of the present disclosure varies depending on factors, such as a formulating method, a mode of administration, patient's age, body weight, sex, morbidity, food, a time of administration, a route of administration, an excretion rate, and response sensitivity. An ordinarily skilled practitioner can easily determine and prescribe the dose that is effective for the desired treatment or prevention. According to a preferable embodiment of the present disclosure, the daily dose of the pharmaceutical composition of the present disclosure is 0.0001-100 mg/kg. As used herein, the term "pharmaceutically effective amount" refers to an amount sufficient to treat cancer, cancer metastasis, or angiogenesis-related diseases.

The pharmaceutical composition of the present disclosure may be formulated into a unit dosage form or may be prepared in a multi-dose container by using a pharmaceutically acceptable carrier and/or excipient according to a method that is easily conducted by a person having an ordinary skill in the art to which the present disclosure pertains. Here, the dosage form may be a solution in an oily or aqueous medium, a suspension, an emulsion, an extract, a pulvis, a suppository, a powder, granules, a tablet, or a capsule, and may further include a dispersant or a stabilizer.

The pharmaceutical composition of the present disclosure may also be used in combination with other pharmaceutically active drugs and therapies in addition to the above-described active ingredient. The term "combination" may be expressed as simultaneous or co-administration. The antibody or antigen-binding fragment described herein and at least one additional therapeutic agent may be administered simultaneously, in the same composition or in separate compositions, or sequentially. For sequential administration, the antibody or antigen-binding fragment described herein may be administered first, followed by the additional agent, or the order of administration can be reversed.

In an embodiment of the present disclosure, the additional pharmaceutically active drugs include any drug (payload) that can be conjugated with the antibody in the antibody-drug conjugate as described above. In an embodiment of the present disclosure, the drug includes an anticancer agent.

In an embodiment of the present disclosure, the anti-GRP94 antibody or the antigen-binding fragment thereof according to the present disclosure may be co-administered along with the conventional anticancer agents 5-FU, cetuximab, or a combination thereof, but with no limitations thereto. The co-administration exhibits a synergistically inhibitory effect on tumor growth.

Since the pharmaceutical composition of the present disclosure employs the antibody binding specifically to GRP94 or antigen binding fragment thereof according to the present disclosure, the common contents therebetween are omitted to avoid undue complexity of the specification due to repetitive descriptions thereof.

According to another aspect thereof, the present disclosure provides a method for treating a cancer, the method including a step of administering a pharmaceutical composition including the anti-GRP94 antibody or the antigen-binding fragment thereof as an active ingredient into a subject in need thereof.

According to a further aspect thereof, the present disclosure provides a method for inhibiting cancer metastasis, the method including a step of administering a pharmaceutical composition including the anti-GRP94 antibody or the antigen-binding fragment thereof as an active ingredient into a subject in need thereof.

According to yet another aspect thereof, the present disclosure provides a method for inhibiting angiogenesis, the method including a step of administering a pharmaceutical composition including the anti-GRP94 antibody or the antigen-binding fragment thereof as an active ingredient into a subject in need thereof.

The cancer and angiogenesis that are the targets of the cancer treatment method, cancer metastasis inhibition method, and angiogenesis inhibition method of the present disclosure are the same as those defined in relation to the disease to be treated by the pharmaceutical composition described above.

In an embodiment of the present disclosure, the subject is a mammal or a human. Examples of the mammal include dogs, cats, cattle, horses, pigs, mice, rats, chimpanzees, orangutans, and baboons, but are not limited thereto.

Since the cancer treatment method, cancer metastasis inhibition method, and angiogenesis inhibition method of the present disclosure are commonly designed to employ the anti-GRP94 antibody and the antigen-binding fragment thereof as an active ingredient, the common contents therebetween are omitted to avoid undue complexity of the specification.

According to a yet further aspect thereof, the present disclosure provides a GRP94-detecting composition or kit including the antibody or the antigen-binding fragment thereof binding specifically to GRP94 according to the present disclosure.

Since the diagnostic kit of the present disclosure includes the antibody binding specifically to GRP94 or antigen binding fragment thereof of the present disclosure and is used to diagnose the same disease as for the pharmaceutical composition of the present disclosure, the common contents therebetween are omitted to avoid undue complexity of the specification due to repetitive descriptions thereof.

The aforementioned kit includes antibodies and thus can be manufactured suitably for various immunoassay or immunostaining methods. The immunoassay or immunostaining methods include, but are not limited to, radioactive immunoassay, radioactive immunoprecipitation, immunoprecipitation, enzyme-linked immunosorbent assay (ELISA), capture-ELISA, inhibition or competition analysis, sandwich assay, flow cytometry, immunofluorescence, and immunoaffinity purification. The immunoassay or immunostaining methods are disclosed in Enzyme Immunoassay, E. T. Maggio, ed., CRC Press, Boca Raton, Fla., 1980; Gaastra, W., Enzyme-linked immunosorbent assay (ELISA), in Methods in Molecular Biology, Vol. 1, Walker, J. M. ed., Humana Press, N J, 1984; and Ed Harlow and David Lane, Using Antibodies: A Laboratory Manual, Cold Spring Harbor Laboratory Press, 1999, the contents of which are incorporated herein by reference.

For example, when the method of the present disclosure is performed according to the radioimmunoassay method, an antibody labeled with a radioactive isotope (e.g., $C^{14}$, $I^{125}$, $P^{32}$, and $S^{35}$) can be used to detect an GRP94 protein. When the method of the present disclosure is performed according to the ELISA method, a particular embodiment of the present disclosure includes the steps of: (i) coating a surface of a solid substrate with a sample to be analyzed; (ii) reacting an antibody binding specifically to GRP94 as primary antibody and the sample; (iii) reacting the product in step (ii) and a secondary antibody conjugated to an enzyme; and (iv) determining the activity of the enzyme.

A suitable example of the solid substrate is a hydrocarbon polymer (e.g., polystyrene and polypropylene), glass, a metal, or a gel, and most specifically a microtiter plate.

The enzyme conjugated to the secondary antibody includes, but is not limited to, enzymes that catalyze a chromogenic reaction, a fluorescent reaction, a luminescent reaction, or an infrared reaction, and includes for examples alkaline phosphatase, β-galactosidase, horseradish peroxidase, luciferase, and cytochrome $P_{450}$. In cases where alkaline phosphatase is used as an enzyme conjugated to the secondary primary, colorimetric reaction substrates may be used such as bromo-chloro-indolyl phosphate (BCIP), nitroblue tetrazolium (NBT), naphthol-AS-B1-phosphate, and enhanced chemifluorescence (ECF); and in cases where horseradish peroxidase is used as an enzyme conjugated to the secondary primary, substrates may be used, such as chloronaphthol, aminoethyl carbazole, diaminobenzidine, D-luciferin, lucigenin (bis-N-methylacridinium nitrate), resorufin benzyl ether, luminol, 10-acetyl-3,7-dihydroxyphenoxazine (Amplex Red reagent), p-phenylenediamine-HCl and pyrocatechol (HYR), tetramethylbenzidine (TMB), 2,2'-Azine-di[3-ethylbenzthiazoline sulfonate] (ABTS), o-phenylenediamine (OPD), and naphthol/pyronine, glucose oxidase, t-NBT (nitroblue tetrazolium), and m-PMS (phenazine methosulfate).

When performed by capture-ELISA, the method according to a particular embodiment of the present disclosure includes the steps of: (i) coating a surface of a solid substrate with an antibody binding specifically to GRP94 as a capturing antibody; (ii) reacting the capturing antibody with a sample; (iii) reacting the product in step (ii) with a GRP94 detecting antibody conjugated to a label generating a signal; and (iv) measuring the signal generated from the label.

The detecting antibody has a label that generates a detectable signal. Examples of the label include, but are not limited to, chemicals (e.g., biotin), enzymes (alkaline phosphatase, β-galactosidase, horse radish peroxidase, and cytochrome $P_{450}$), radioactive substances (e.g., $C^{14}$, $I^{125}$, $P^{32}$, and $S^{35}$), fluorescent substances (e.g., fluorescein), light-emitting substances, chemiluminescent substances, and fluorescence resonance energy transfer (FRET). Various labels and labeling methods are described in Ed Harlow and David Lane, *Using Antibodies: A Laboratory Manual*, Cold Spring Harbor Laboratory Press, 1999.

In the ELISA method or capture-ELISA method, the measurement of the funeral enzyme activity or the measurement of signals may be carried out according to various methods known in the art. A signal may be easily detected using streptavidin when biotin is used as a label, and a signal may be easily detected using luciferin when luciferase is used as a label.

Examples of the sample applicable to the kit of the present disclosure include, but are not limited to, cells, tissues or tissue-derived extracts, lysate or purified materials, blood, plasma, serum, lymph, or ascites.

The antibody of the present disclosure may be used for in vivo or in vitro imaging. According to another aspect of the present disclosure, the present disclosure provides a composition for imaging, containing a conjugate in which the antibody of the present disclosure is conjugated to a label generating a detectable signal conjugated to the antibody.

The label capable of generating a detectable signal includes T1 contrast materials (e.g., Gd chelate compounds), T2 contrast materials (e.g., superparamagnetic materials (e.g., magnetite, $Fe_3O_4$, $\gamma$-$Fe_2O_3$, manganese ferrite, cobalt ferrite, and nickel ferrite)), radioactive isotopes (e.g., $^{11}$C, $^{15}$O, $^{13}$N, $P^{32}$, $S^{35}$, $^{44}$Sc, $^{45}$Ti, $^{118}$I, $^{136}$La, $^{198}$Tl, $^{200}$Tl, $^{205}$Bi, and $^{206}$Bi), fluorescent materials (fluorescein, phycoerythrin, rhodamine, lissamine, and Cy3/Cy5), chemiluminescent materials, magnetic particles, mass labels, and dense electron particles, but are not limited thereto.

Advantageous Effects of Invention

The GRP94 antibodies or antigen-binding fragments thereof according to the present disclosure are very high in specificity and affinity for GRP94 and exhibit excellent effects of inhibiting growth, invasion, and angiogenesis of colorectal cancer cells, thus finding advantageous applications as a composition for therapy of cancer, inhibition of cancer metastasis, and inhibition of angiogenesis.

BEST MODE FOR CARRYING OUT THE INVENTION

A better understanding of the present disclosure may be obtained through the following examples which are set forth to illustrate, but are not to be construed to limit, the present disclosure.

EXAMPLES

Throughout this specification, "%" used to indicate the concentration of a specific substance is (weight/weight) % for solid/solid, (weight/volume) % for solid/liquid, and (volume/volume) % for liquid/liquid.

Materials and Methods

Cell Culture

Human CRC cell lines (HCT116, HT-29, LoVo, HCT-8, and Caco-2) were purchased from the Korean Cell Line Bank (Seoul, Korea). HCT116, HT-29, LoVo, and HCT-8 cells were maintained in Roswell Park Memorial Institute (RPMI) 1640 media (Gibco, Grand Island, NY, USA) supplemented with 10% (v/v) fetal bovine serum (Gibco) and 1% (v/v) penicillin/streptomycin (Gibco). Caco-2 cells were maintained in Dulbecco's Modified Eagle Medium (DMEM) (Gibco) with the same supplements. Human umbilical vein endothelial cells (HUVECs; Lonza, Allendale, NJ, USA) were cultured in endothelial growth medium-2 (EGM-2; Lonza). All cells were maintained at 37° C. in a humidified incubator with 5% $CO_2$. Expi293 cells were cultured in Expi293 expression medium (Invitrogen, Carlsbad, CA, USA) in a humidified $CO_2$ incubator shaker (N-BIOTEK, S. Korea) at 37° C. with 8% $CO_2$.

Transfection

For antibody and rhGP94 overproduction, the expression vectors pcDNA 3.1 and pcDNA 3.4 (Invitrogen) carrying GRP94 antibody and rhGRP94, respectively, were transfected into Expi293 cells, using an ExpiFectamine transfection kit (Invitrogen) according to the manufacturer's instructions.

Enzyme-Linked Immunosorbent Assay (ELISA)

Each well of 96-well plates was coated with 0.1 μg of recombinant human GRP94 (rhGRP94), blocked with 3% (w/v) bovine serum albumin (BSA) in phosphate buffered saline (PBS) for 2 hours at 37° C., and incubated with 100 μL of GRP94 targeting IgG (20 μg/mL) for 2 hours at 37° C. The plates were washed thrice with 0.05% PBS-T, and 100 μL of a 500:1 dilution of the secondary antibody anti-human Fc Ab (Sigma-Aldrich) was added to each well. Incubation at 37° C. for 1 hour was followed by three rounds of washing with 0.05% PBS-T. Then, 100 μL of 3,3',5,5'-tetramethylbenzidine (1-step ultra TMB) substrate solution was added to each well. Finally, optical densities were measured at 450 nm using a microplate reader (Synergy H1, BioTek).

Figure 1:
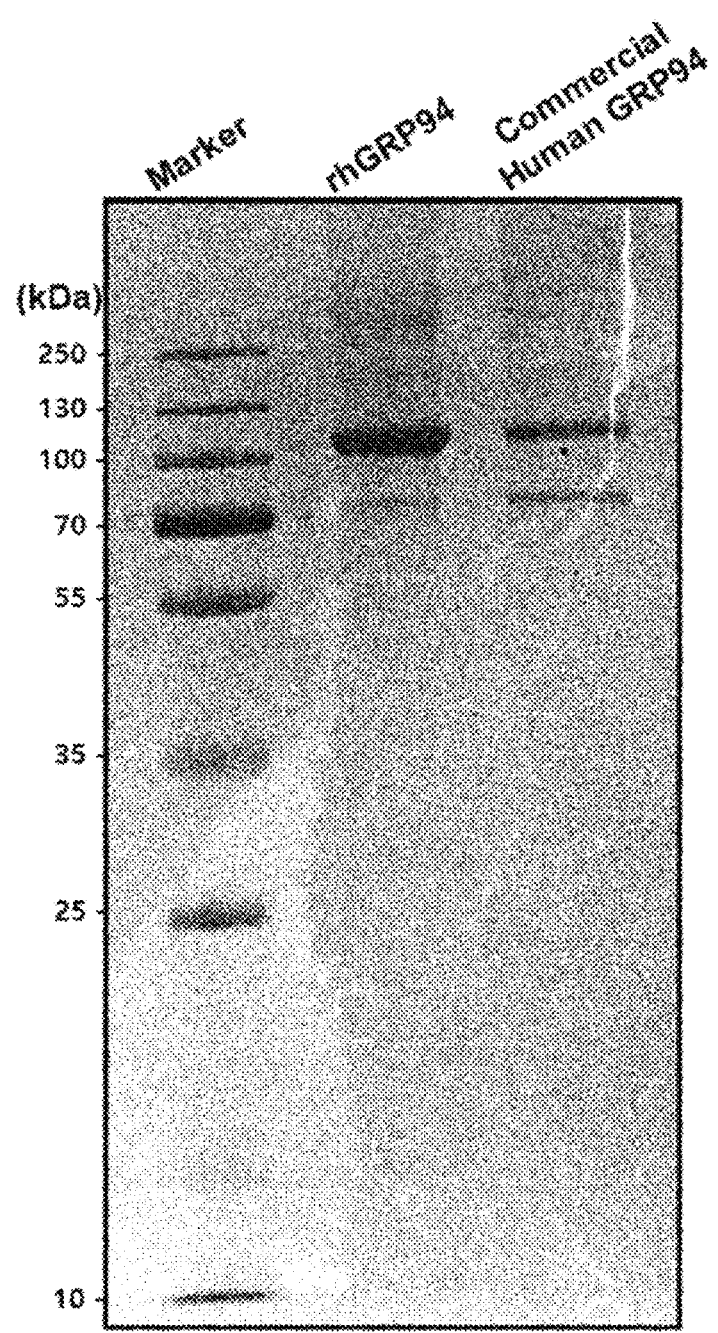
FIG. 1 is a photographic image of the recombinant human GRP94 protein produced using Expi293 cells after SDS-PAGE and Coomassie staining.

Example 1: Selection of High-Affinity Antibodies that Bind to rhGRP94 Using Phage Display Technology Prior to production of the scFv binding specifically to rhGRP94, the rhGRP94 protein was expressed in Expi293 cells and isolated by affinity chromatography using Ni-NTA sepharose. The isolated protein was predicted for purify by SDS-PAGE and Coomassie Brilliant Blue staining. As shown in FIG. 1, the purify of the rhGRP94 protein produced and isolated by the present inventors was observed to be equivalent to or higher than that of the commercially available one.

Subsequently, the human synthetic scFv library was reamplified. Through four rounds of biopanning, a scFv showing highly affinity for rhGRP94 was selected using rhGRP94-conjugated Epoxy-270 dynabead (Invitrogen).

In order to generate an IgG antibody, after the DNA sequencing of the selected scFv, each variable heavy and light chain gene of the selected scFv clone was cloned into the bicistronic mammalian expression vector pCDNA3.1 (Invitrogen). Using the Expi293 expression system (Invitrogen), the IgG antibody (GRP94 IgG) was produced and purified.

Figure 2:
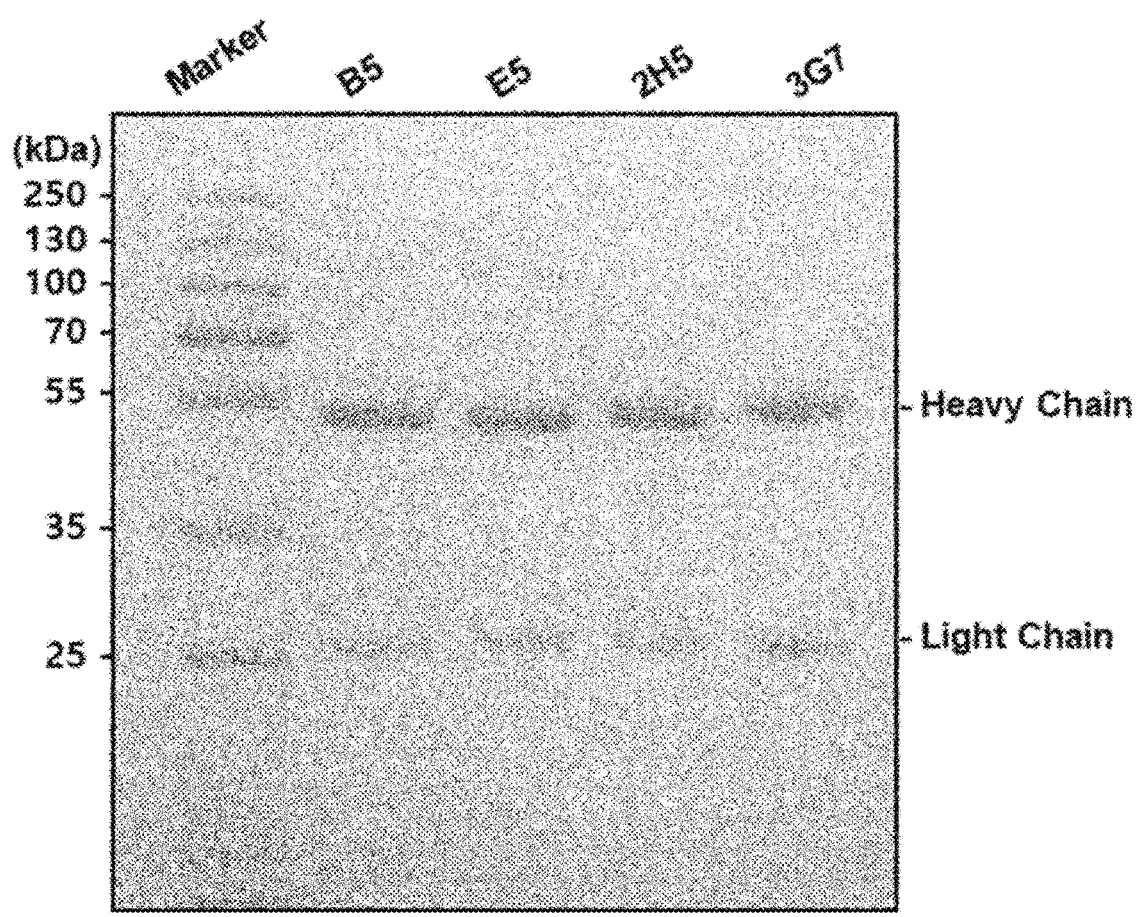
FIG. 2 is a photographic image of GRP94 IgG antibodies expressed in Expi293 cells after SDS-PAGE and Coomassie staining.
Figure 3:
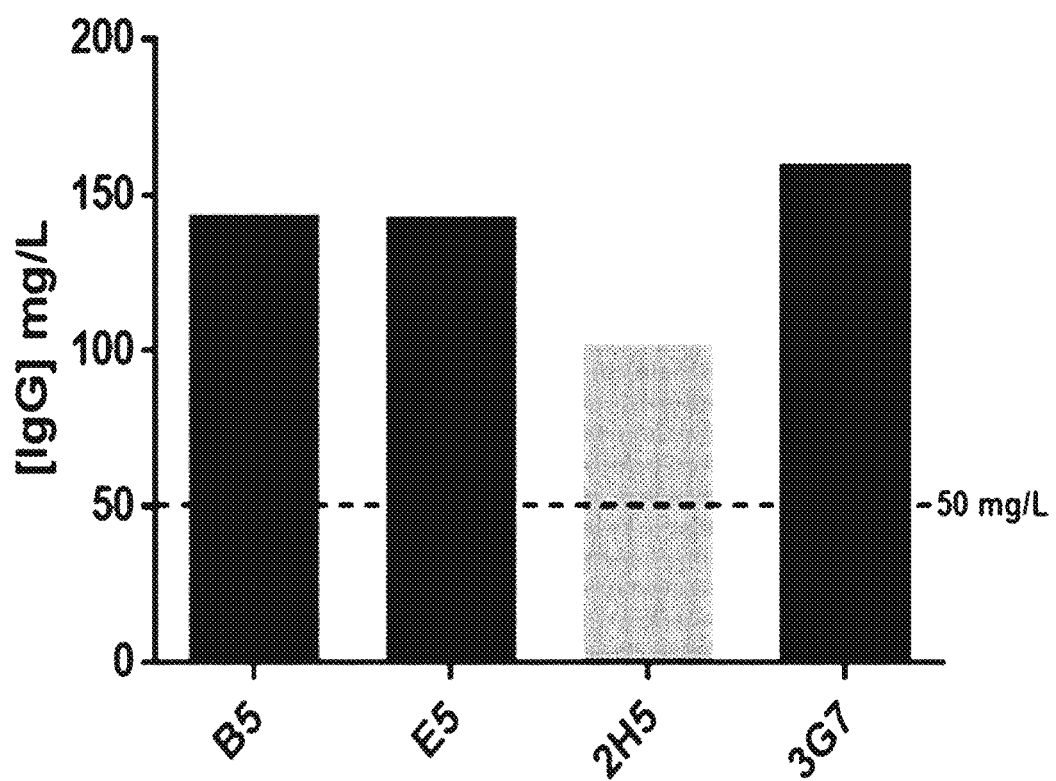
FIG. 3 is a graph showing outputs of the GRP94-specific IgGs of the present disclosure, as measured by Nano Drop after expression in Expi293 cells and purification.

The GRP94 IgG antibody expressed in Expi293 cells was isolated by affinity chromatography using protein A sepharose. The isolated antibody was predicted for purify by SDS-PAGE and Coomassie Brilliant Blue staining. In addition, the final production of antibody was confirmed using the NanoDrop. As shown in FIG. 2, the GRP94-specific IgG antibodies produced and isolated by the present inventors was observed to be high in purity. All of the antibodies (B5, E5, 2H5, and 3G7) of the present disclosure exhibited a production efficiency of 100 mg/L or higher as shown in FIG. 3.

Example 2: Measurement of Endotoxin Levels Using PTS

The produced antibodies were measured for endotoxin level, using Endosafe PTS™ composed of a spectrophotometer, a reader, and an LAL reagent cartridge. First, the produced GRP94 antibodies were loaded into the LAL reagent cartridge (Charles River) and measured for endotoxin level according to the manufacturer's instructions.

Figure 4:
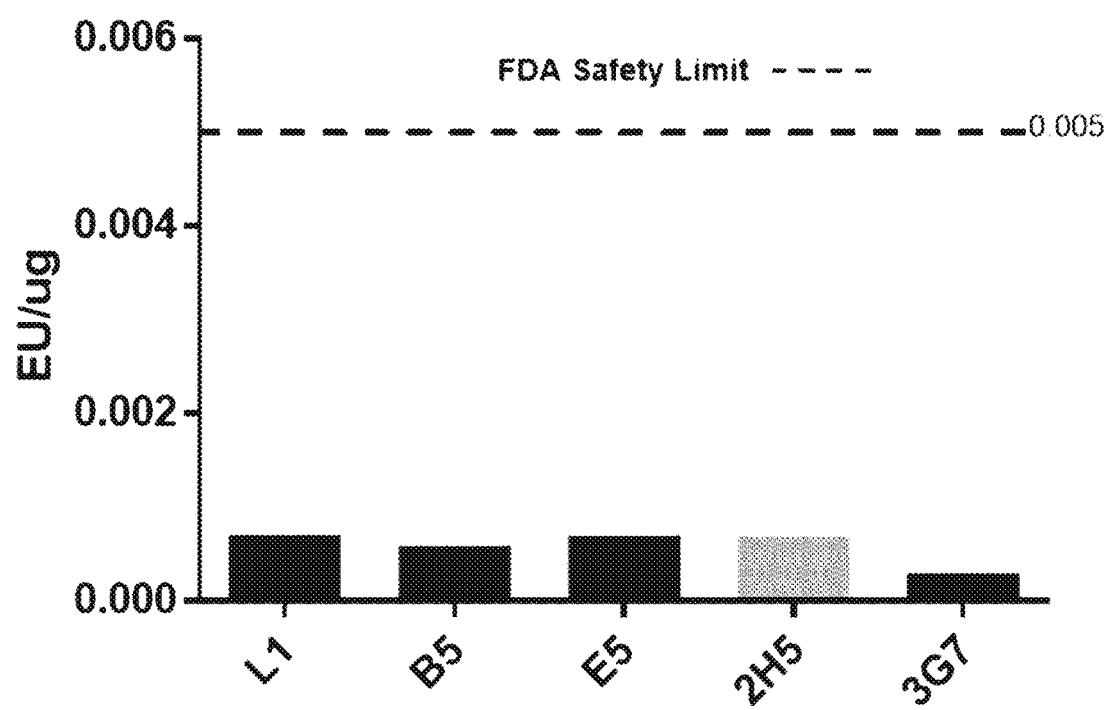
FIG. 4 is a graph showing endotoxin levels of the GRP94 antibodies of the present disclosure.

As can be seen in FIG. 4, all of the GRP94 antibodies of the present disclosure exhibited an endotoxin level of less than 0.005 EU/μg, which is the FDA safe limit.

Example 3: Protein Aggregation Index

To evaluate the production the antibodies (B5, E5, 2H5, and 3G7) of the present disclosure and the antibody aggregation after purification, each of the antibodies was added to PBS and absorbance was read at 280 nm and 340 nm using NanoDrop 2000 (Thermo Fisher Scientific). The protein aggregation index was calculated from UV absorbance according to the following equation. As a control, the GRP94 antigen that was induced by treatment with HCl to aggregate was used.

$$\text{Protein Aggregation Index} = 100 \times (Abs_{340}/[Abs_{280} - Abs_{340}]) \quad \text{Equation 1}$$

Figure 5:
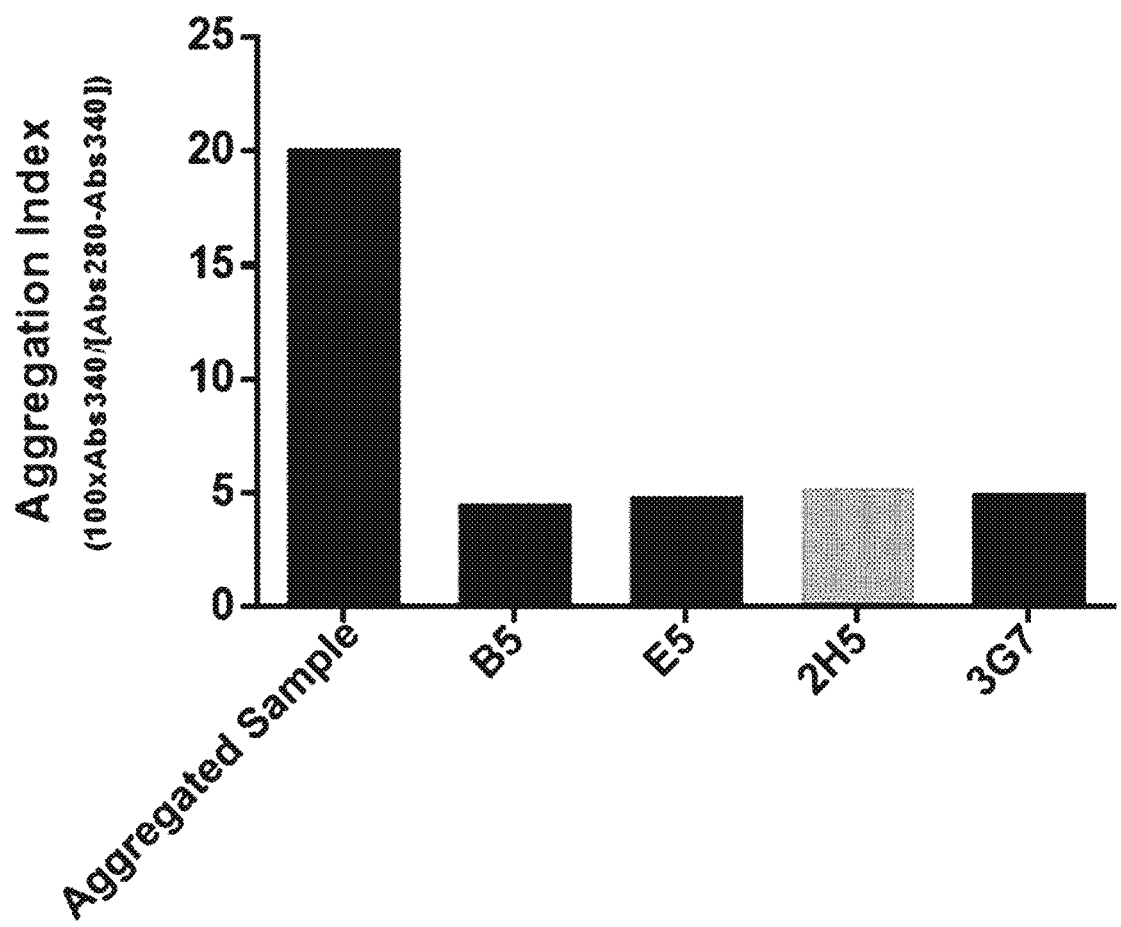
FIG. 5 is a graph showing protein aggregation indices of the GRP94 antibodies of the present disclosure.
Figure 6:
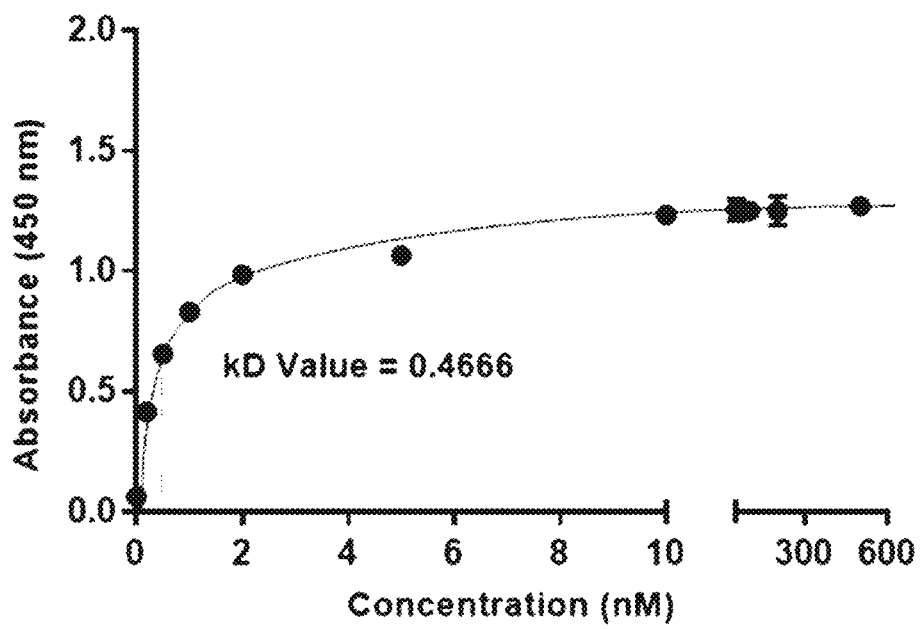
FIG. 6 and FIG. 7 are plots of equilibrium dissociation constant ($K_D$) values of the four GRP94 IgGs (B5, E5, 2H5, and 3G7) of the present disclosure.
Figure 6:
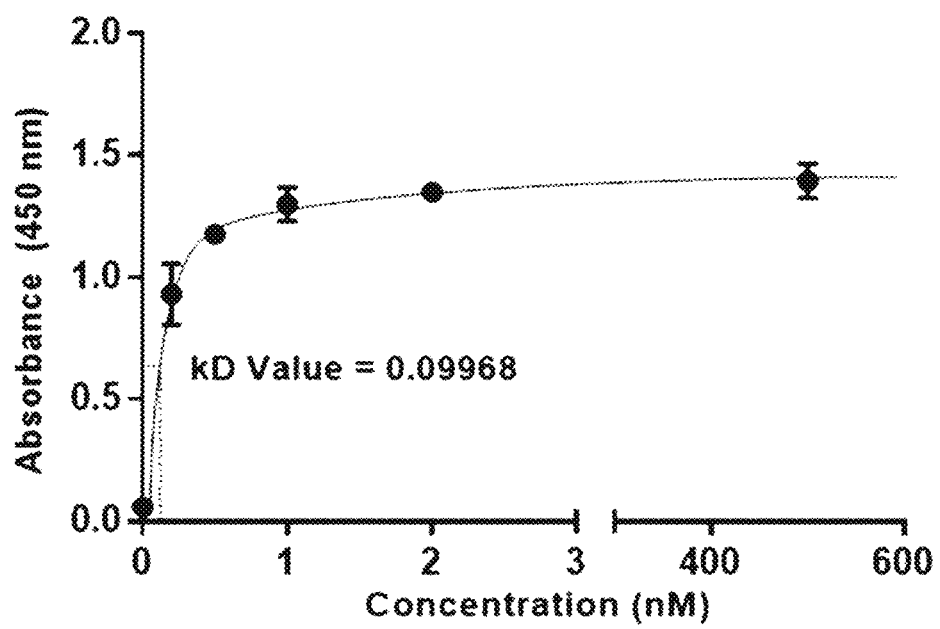
Figure 7:
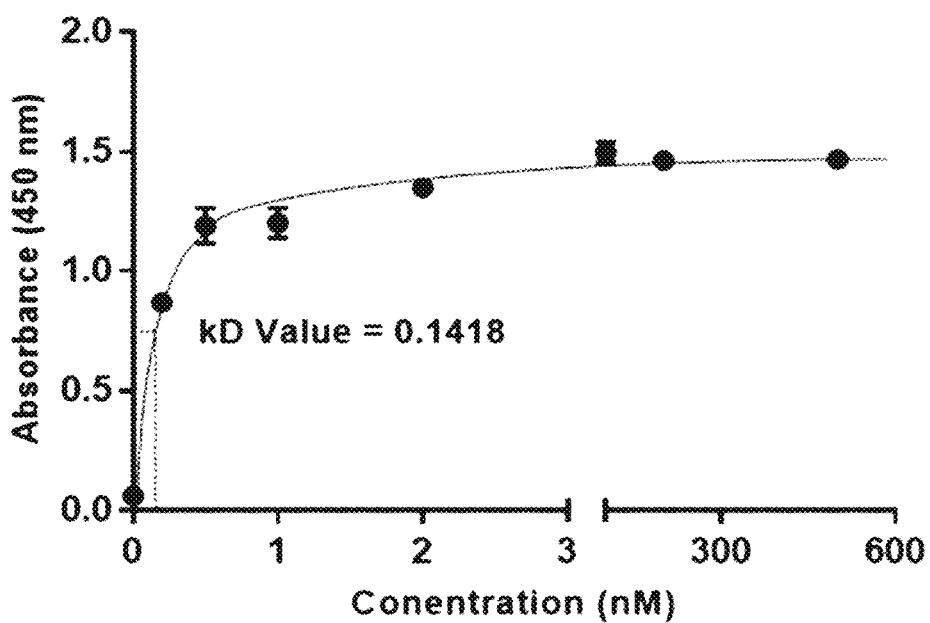
Figure 7:
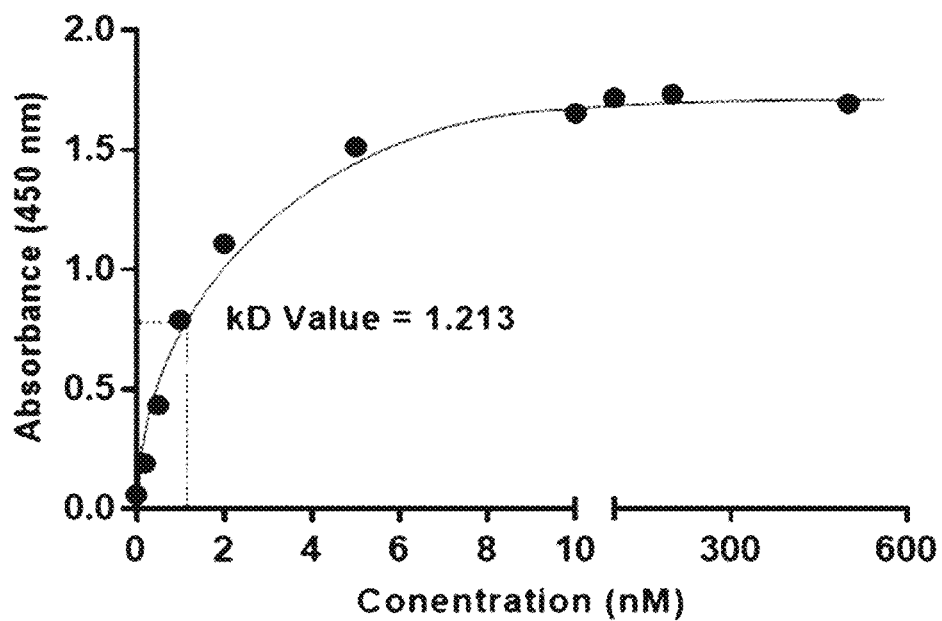

Antibody aggregation could be triggered by partial unfolding of some domains of the antibody, leading to monomer-monomer association followed by nucleation and growth. Thus, antibody aggregation continues to be a major issue in the developability thereof. As can be seen in FIG. 5, the antibodies (B5, E5, 2H5, and 3G7) of the present disclosure were low in protein aggregation index and thus were observed to be suitable for development.

Example 4: $K_D$ Value Measurement of Antibody and Antigen Interactions (ELISA)

The four GRP94 IgGs (B5, E5, 2H5, and 3G7) of the present disclosure were measured for equilibrium dissociation constant ($K_D$). In this regard, each well of 96-well plates was coated with 100 ng of rhGRP94 and blocked with 3% (w/v) bovine serum albumin (BSA) in PBS at 37° C. for 2 hours. Next, the plates were incubated with a concentration gradient of 0 nM to 500 nM of each clone for the GRP94 IgGs at 37° C. for 2 hours. The use of a secondary antibody and the measurement of optical density were conducted as described for the ELISA.

Figure 8:
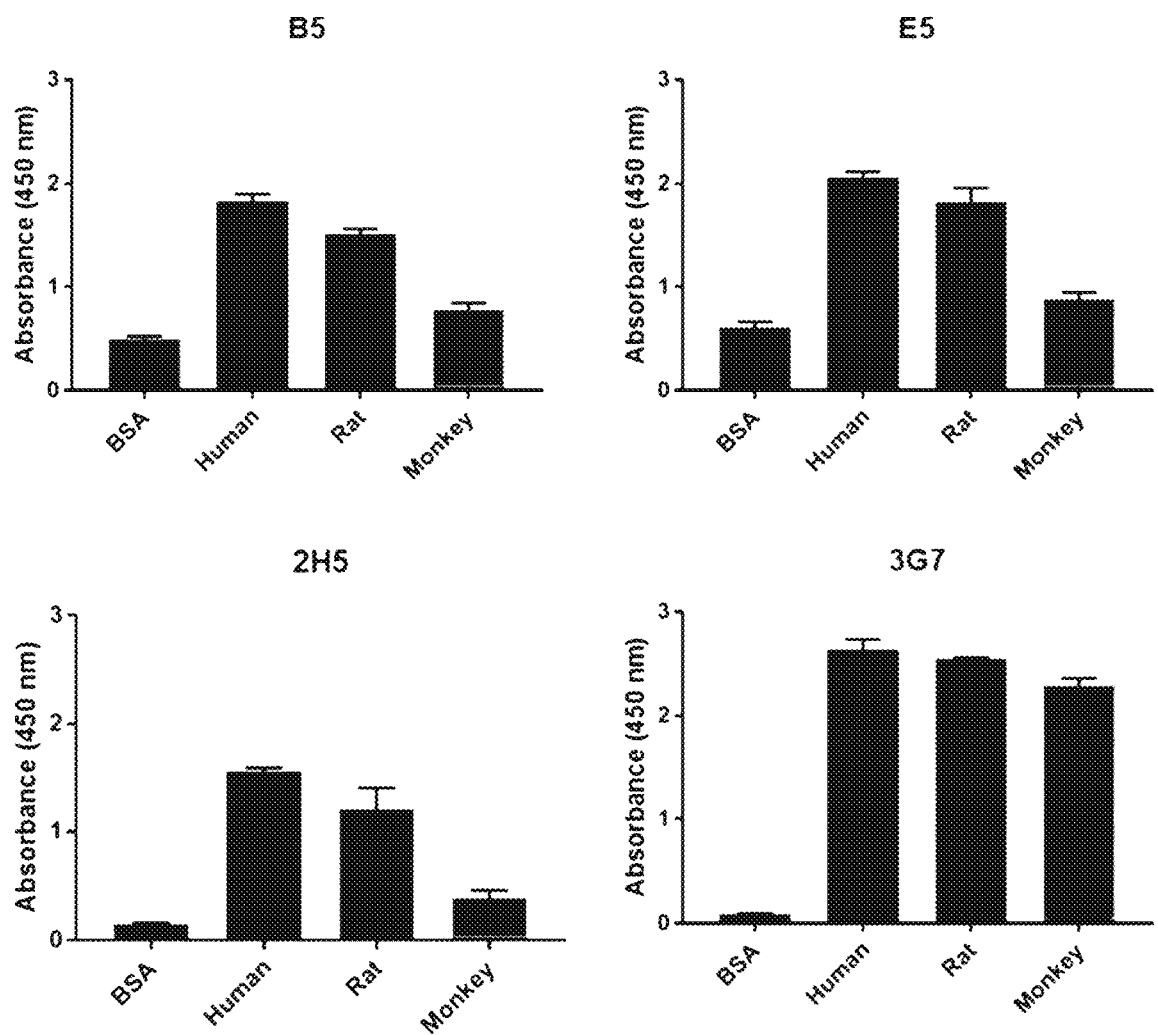
FIG. 8 shows graphs illustrating the specificity of the four GRP94 IgGs (B5, E5, 2H5, and 3G7) of the present disclosure for the antigens recombinant human GRP94, recombinant rat GRP94, and recombinant monkey GRP94.

After 96-well plates were coated with BSA, recombinant human GRP94, recombinant rat GRP94, and recombinant monkey GRP94, their binding affinity for each antibody (B5, E5, 2H5, or 3G7) was measured by ELISA. As shown in FIG. 8, the antibodies (B5, E5, 2H5, and 3G7) of the present disclosure were each observed to bind to the recombinant human, rat, and monkey GRP94 antigens, with high specificity for human and rat recombinant GRP94 antigens.

Example 5: In Vitro Tube Formation Assays

Figure 9:
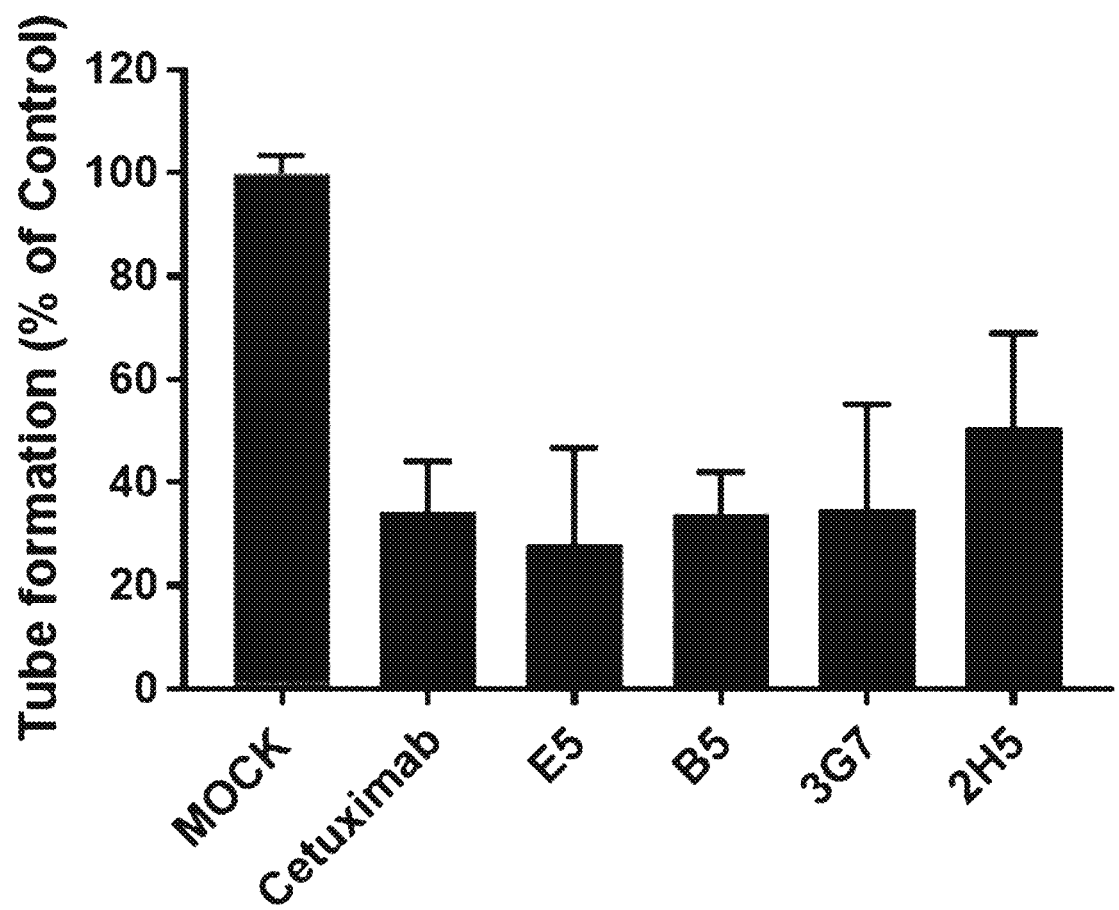
FIG. 9 and FIG. 10 are views illustrating the tube formation of the four GRP94 antibodies (B5, E5, 2H5, and 3G7) of the present disclosure, compared to cetuximab, as assayed in vitro using HUVEC cells.
Figure 10:
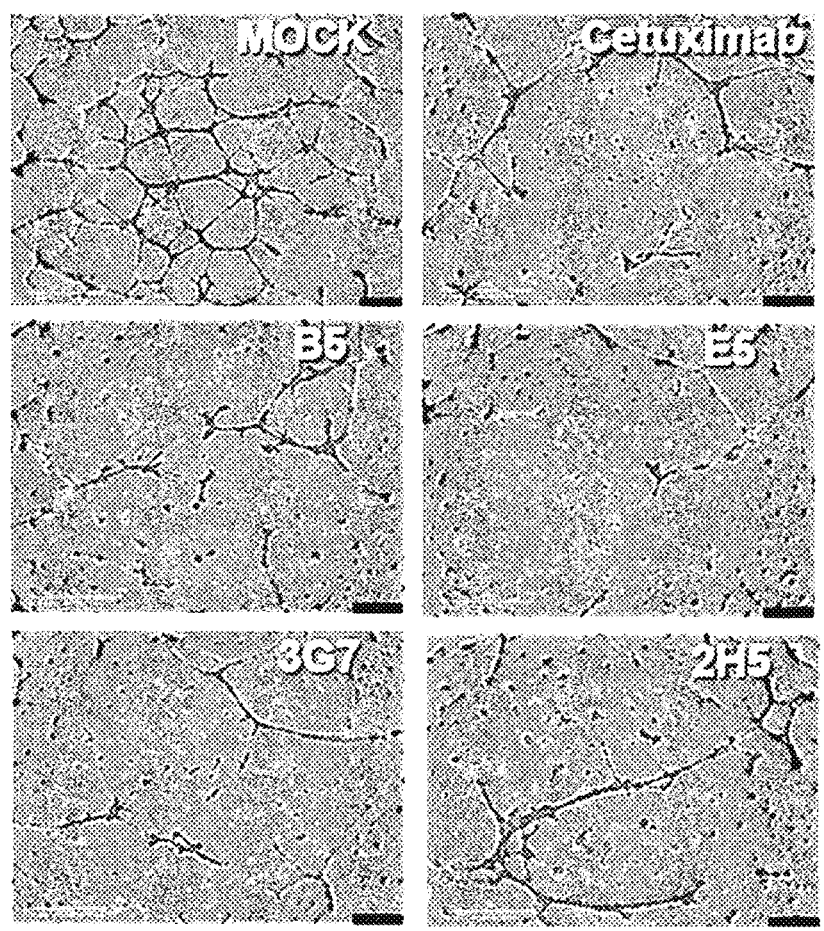
Figure 11:
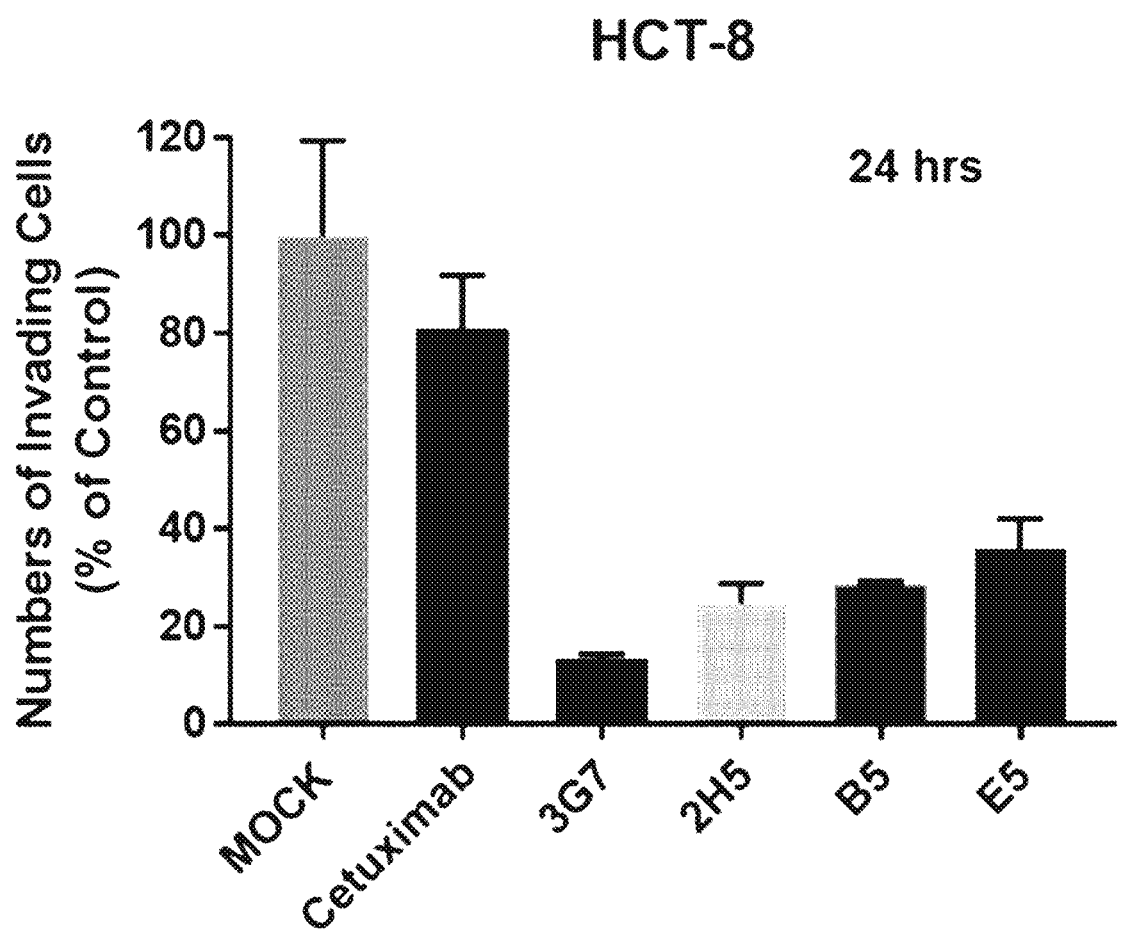
FIG. 11 and FIG. 12 are views illustrating the transwell invasion of the four GRP94 antibodies (B5, E5, 2H5, and 3G7) of the present disclosure as assayed using the colorectal cancer cell line HCT-8.
Figure 12:
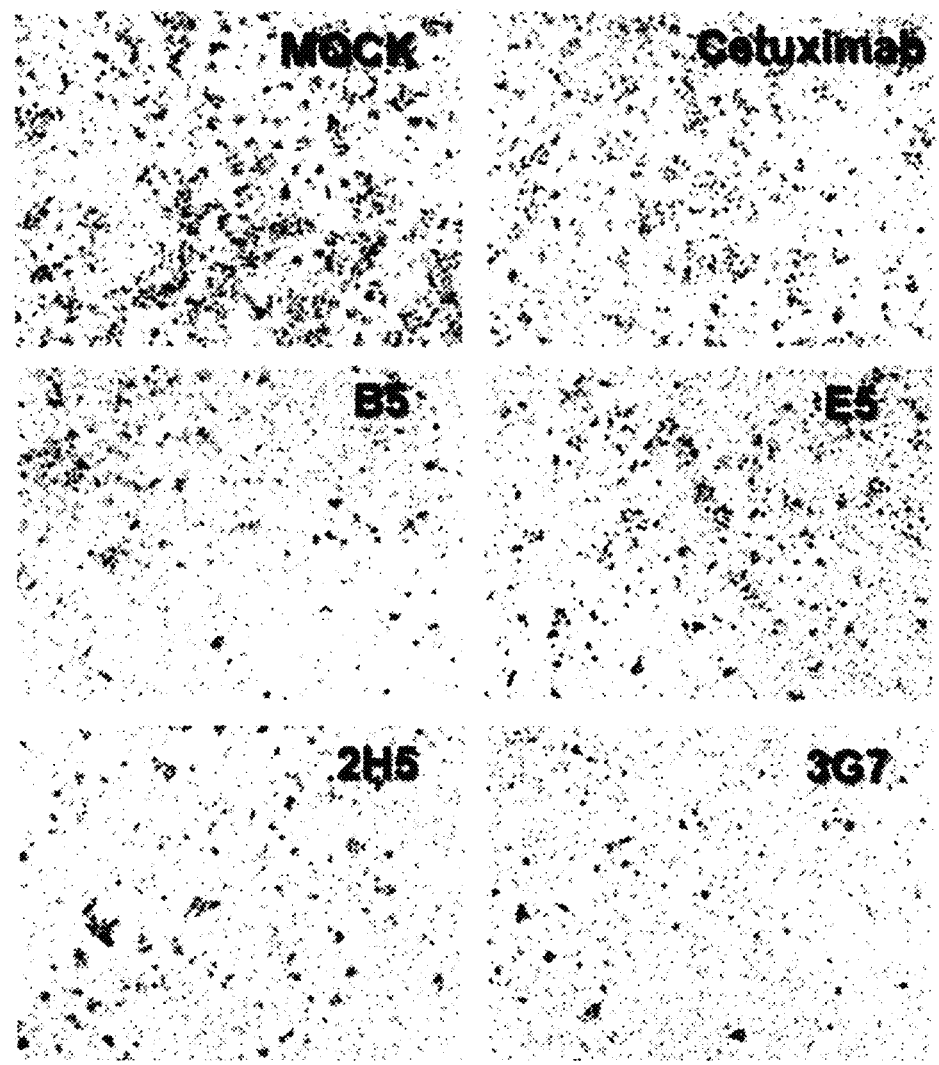
Figure 13:
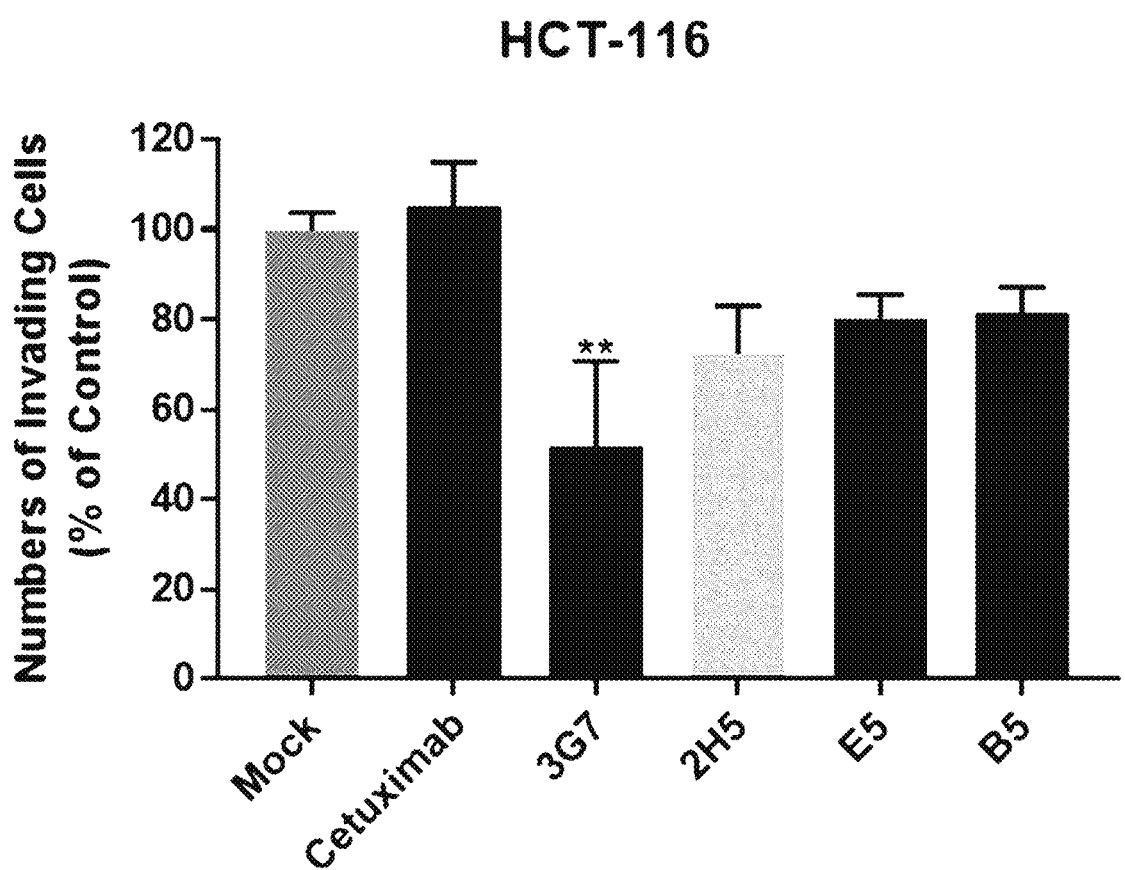
FIG. 13 and FIG. 14 are views illustrating the transwell invasion of the four GRP94 antibodies (B5, E5, 2H5, and 3G7) of the present disclosure as assayed using the colorectal cancer cell line HCT-116.
Figure 14:
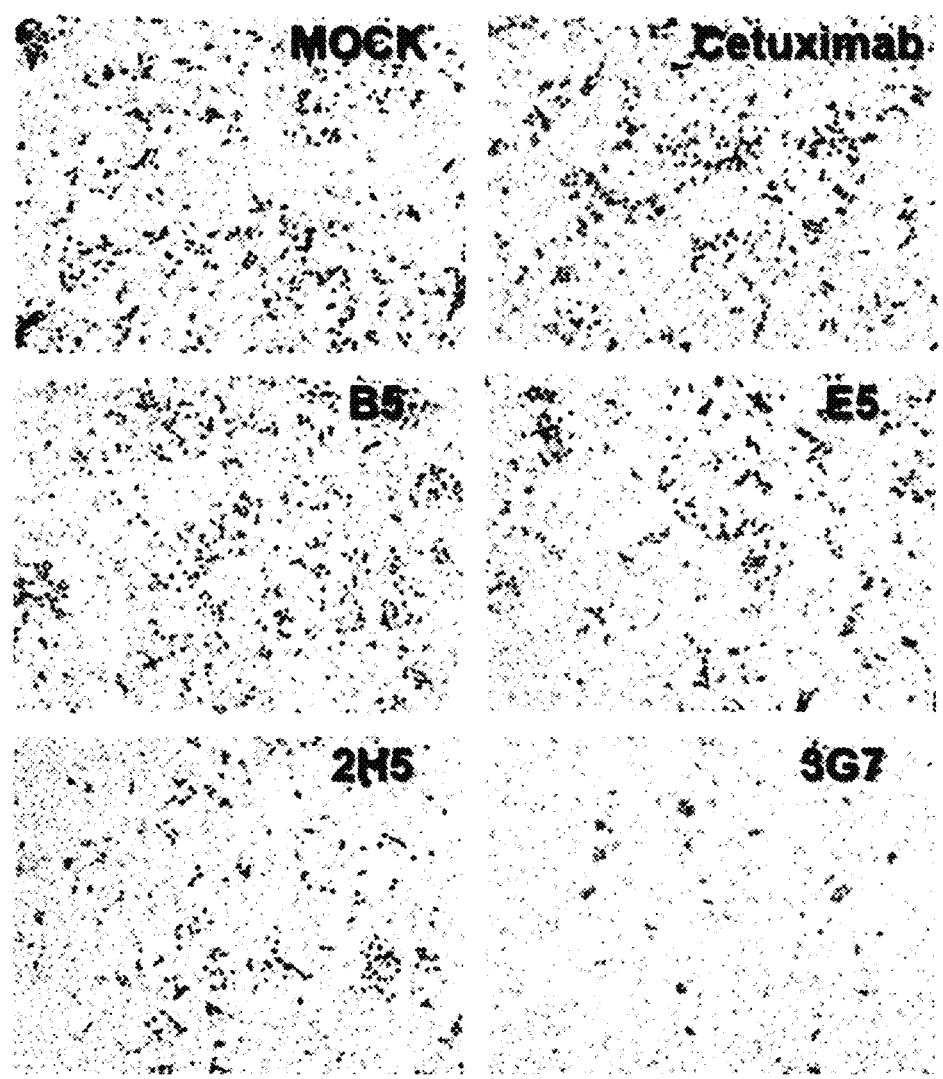
Figure 15:
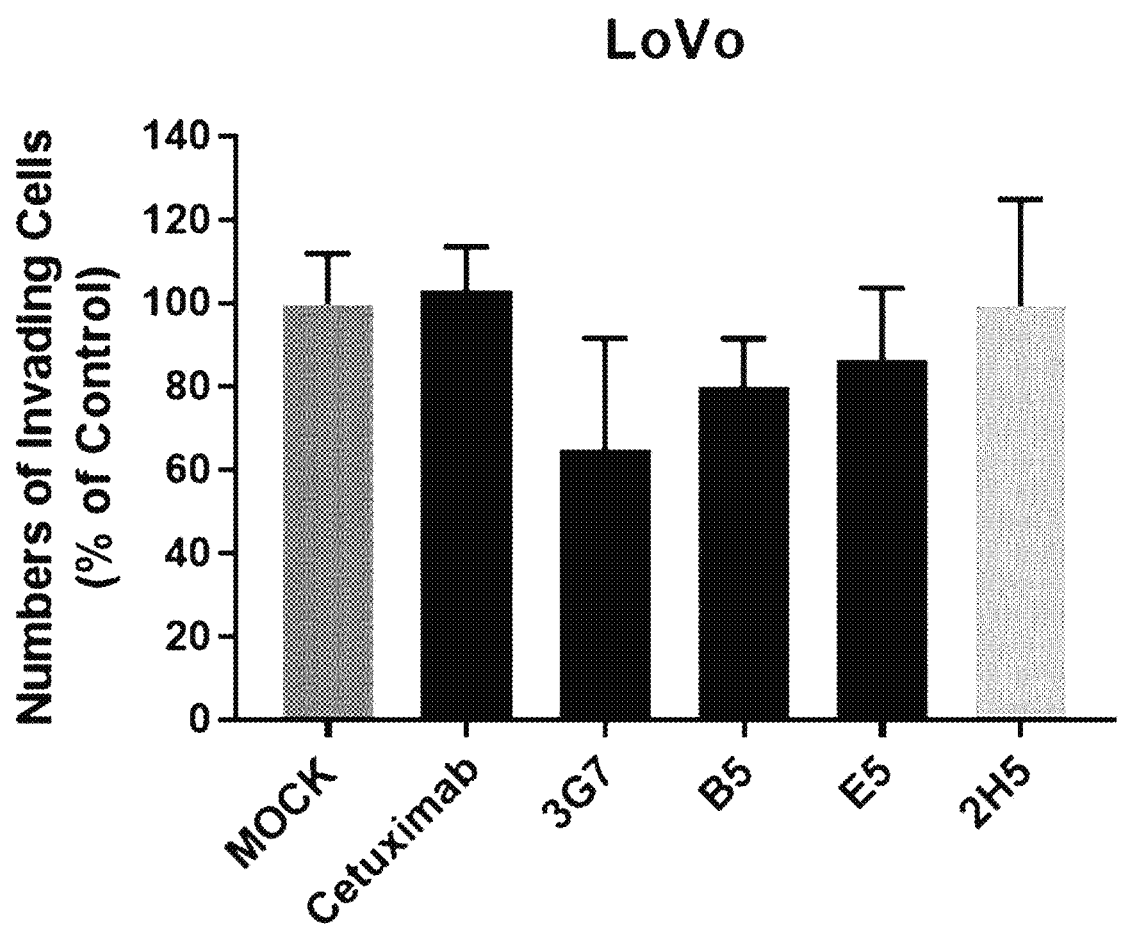
FIG. 15 and FIG. 16 are views illustrating the transwell invasion of the four GRP94 antibodies (B5, E5, 2H5, and 3G7) of the present disclosure as assayed using the colorectal cancer cell line LoVo.
Figure 16:
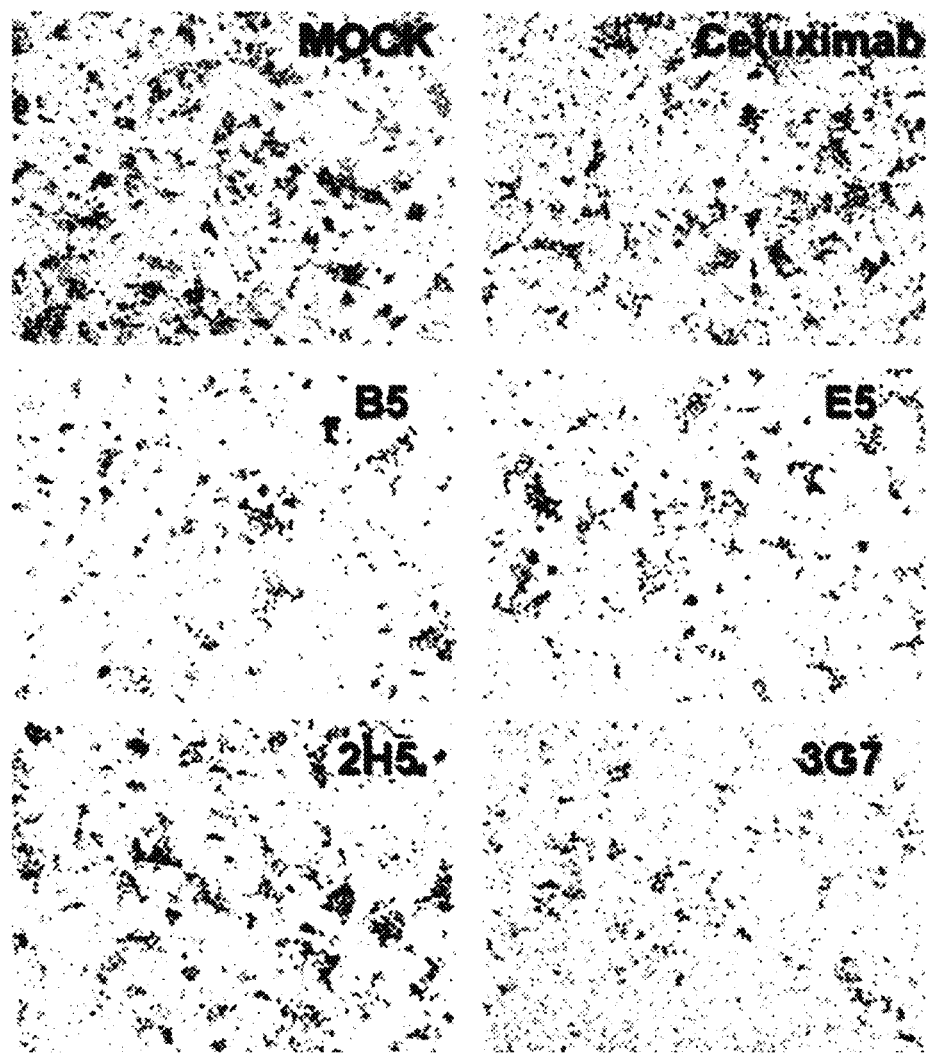
Figure 17:
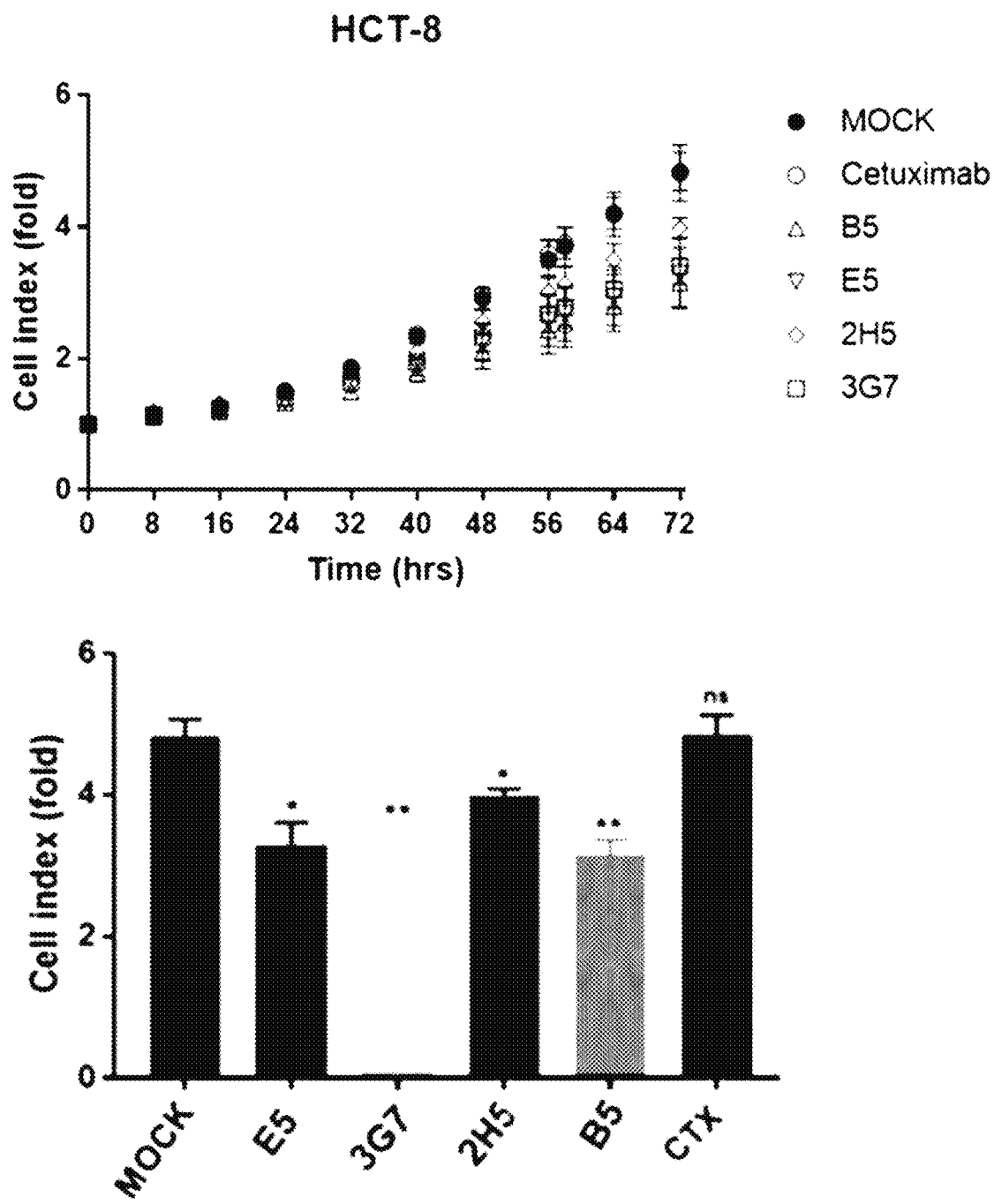
FIGS. 17 to 20 are views illustrating effects of the anti-GRP94 antibodies of the present disclosure on cell growth of the colorectal cell lines HCT8, HCT116, HT29, and LoVo.
Figure 18:
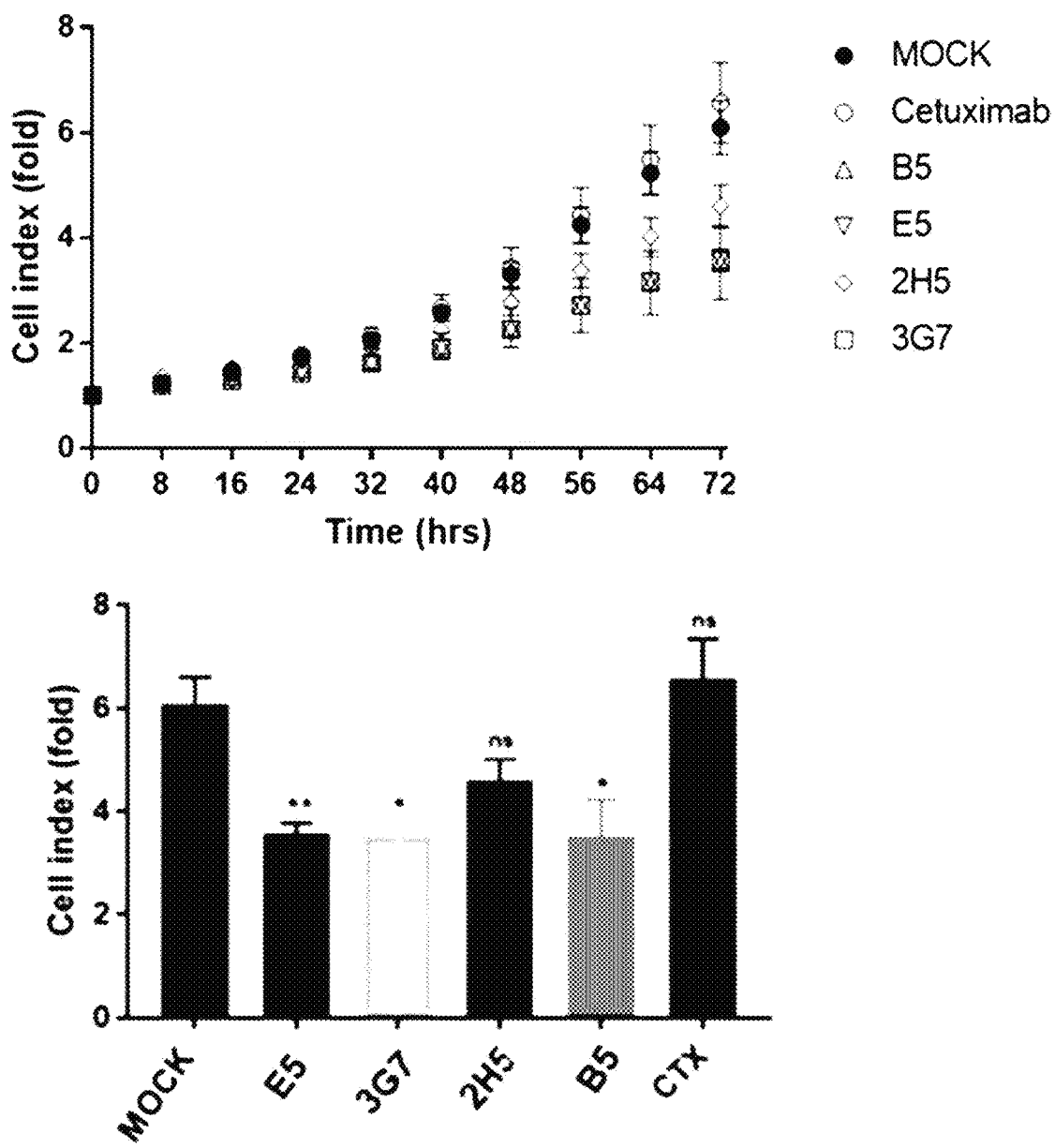
Figure 19:
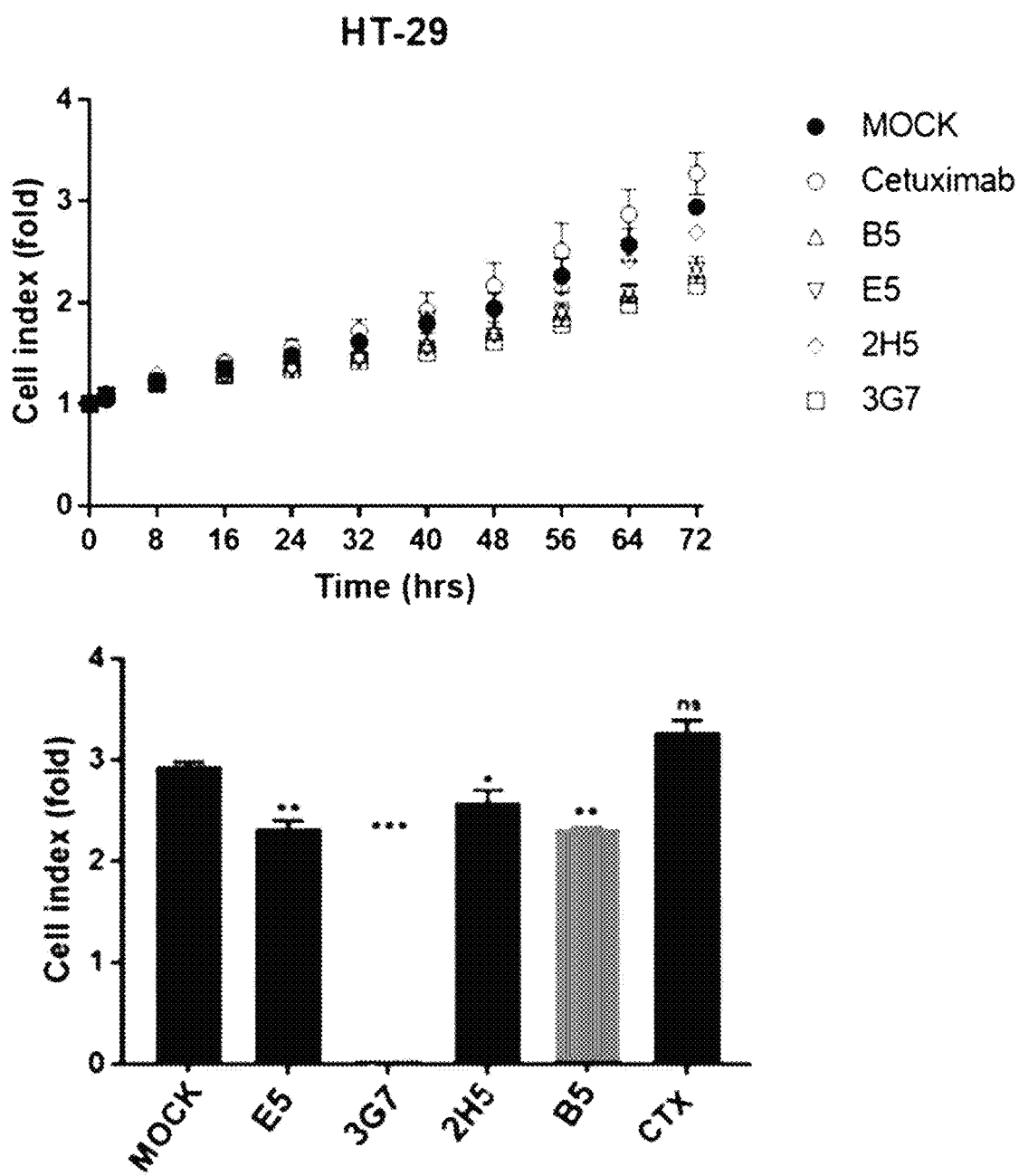
Figure 20:
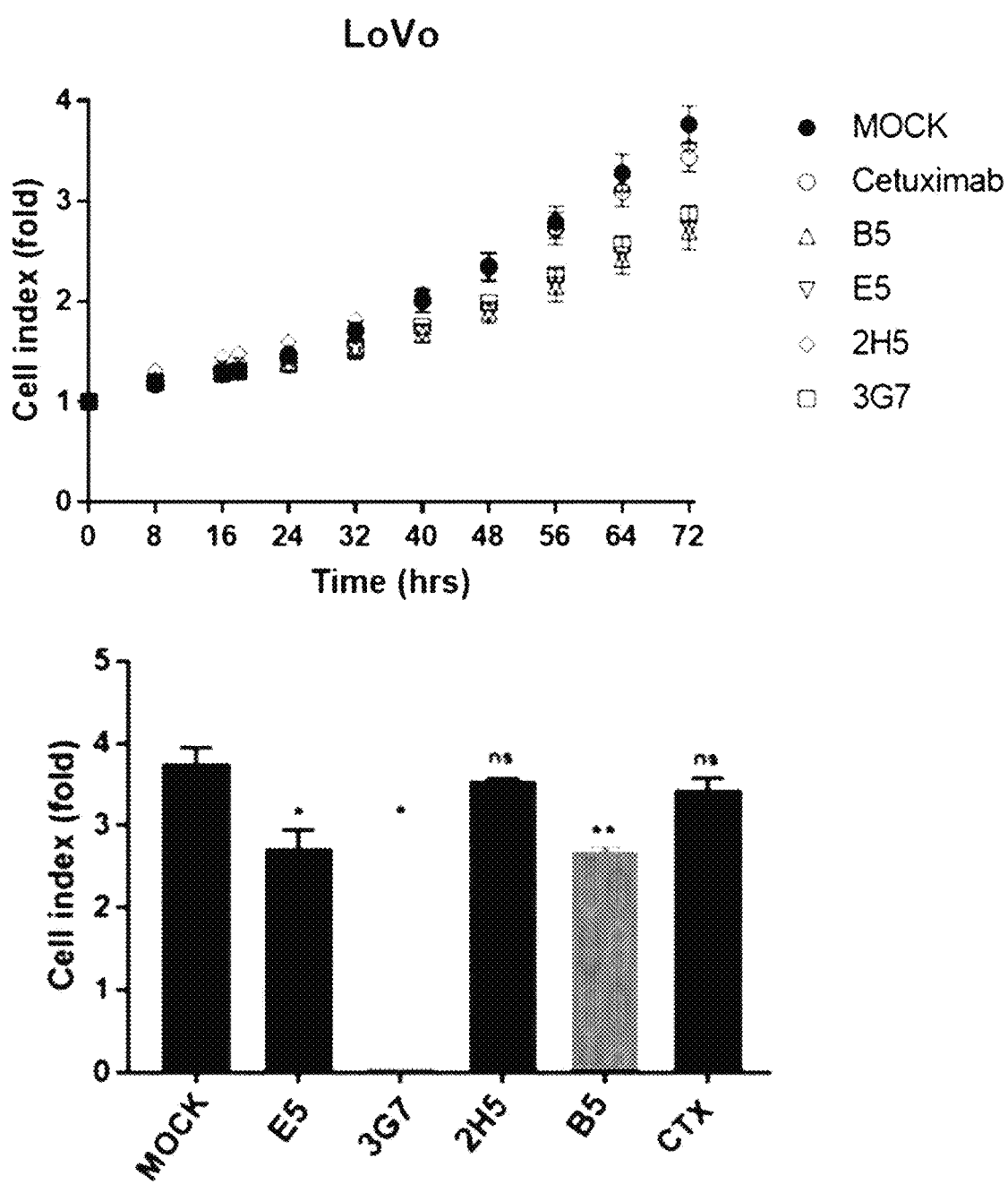

Each well of 48-well plates was coated with 150 μL of Matrigel (Corning) and incubated at 37° C. for 30 minutes. To examine the effects of the four GRP94 IgGs of the present disclosure on tube formation, HUVEC cells cultured in EGM-2 were seeded at a density of $1 \times 10^5$ cells/well into the Matrigel-coated plates and incubated in the presence/absence of anti-GRP94 IgG or with 20 μg/mL cetuximab. Images were acquired using the IncuCyte FLR live content imaging system (Essen Bioscience, Ann Arbor, MI, USA), and tube branches were counted to quantitate tube formation. The results are shown in FIGS. 9 and 10. As seen in FIG. 9 and FIG. 10, the four antibodies of the present disclosure were highly inhibitory of tube formation. Hence, the four antibodies of the present disclosure can find advantageous applications as angiogenesis inhibitors.

Example 6: Transwell Invasion Assay

Two transwell invasion chambers coated with Matrigel (0.1 mg/ml) (Corning) were used for in-vitro transwell invasion assays for HCT-8, HCT-116, or LoVo cells. First, 200 μl of serum-free medium containing $1 \times 10^5$ cells were added to each well in the upper chamber while 0.8 ml of a medium containing 10% FBS was applied to the lower chamber. After incubation at 37° C. for 24 to 48 hours, the non-invasive cells on the membrane in the upper chamber were removed with a cotton swab. The migrated or invasive cells were fixed and then stained with diff quick staining Kit (Sysmex). Cells were counted using ImageJ software, and four random fields selected in each well were photographed under an inverted microscope. Each experiment was independently performed in biplicate.

As shown in FIGS. 11 to 16, the four antibodies of the present disclosure exhibited inhibitory effects on the invasive activity of colorectal cancer cell lines such as HCT-8, HCT-116, and LoVo, with dominant superiority to cetuximab. Therefore, the four antibodies of the present disclosure can be advantageously used as cancer metastasis inhibitors.

Example 7: In Vitro CRC Proliferation Assay

The four anti-GRP94 human IgG antibodies B5, E5, 2H5, and 3G7 of the present disclosure were examined in vitro for effect on CRC cell proliferation. For use in the efficacy assay, the four cetuximab-resistant colorectal cancer cell lines HCT116, HT29, LoVo, and HCT-8 were each grown in a culture medium (HCT116, HCT8, HT29, and LoVo: RPMI1640+10% FBS+1% Penicillin-Streptomycin) at 37° C. in T-75 flask in a 5% $CO_2$ incubator until reaching about 80-90% confluency. The culture medium was removed by suction and the cells were washed with 10 mL of phosphate buffered saline (hereinafter PBS). After removal of PBS by suction, the cells were treated 2 mL of TrypLE Express Enzyme at 37° C. for 3 minutes in a 5% $CO_2$ incubator. Thereafter, the cells were added with 8 mL of the culture medium, transferred to 15-mL tube, and centrifuged at 500×g for 5 minutes. After removal of the supernatant, the cells were suspended in the culture medium. From a small portion of the cell suspension, the cells were counted using the Countess II Automated Cell Counter. Next, the cells were seeded at a final density of $5 \times 10^3$ cells/well into 96-well plates and treated with 20 μg/mL of each the four test materials anti-GRP94 human antibodies B5, E5, 2H5, and 3G7 and cetuximab (CTX). The 96-well plates were mounted on the Incucyte Zoom system. With the microscope magnification set at 4×, images were collected at intervals of 2 hours for 72 hours. From the collected images, cell growth was monitored using the IncuCyte FLR live content imaging system (Essen Bioscience, Ann Arbor, MI, USA). The results are shown in FIGS. 17 to 20.

1) The four GRP94 human antibodies (B5, E5, 2H5, and 3G7) for HCT8 cells were measured to have the following cell indices at the end point: MOCK: 4.8±0.25, B5: 3.15±0.21, E5: 3.33±0.31, 2H5: 3.98±0.09, 3G7: 3.40±0.16, and CTX: 4.84±0.28.

This application contains references to amino acid sequences and/or nucleic acid sequences which have been submitted concurrently herewith as the sequence listing text file entitled "000326usnp_SequenceListing.TXT", file size 40 kilobytes (KB), created on 8 Dec. 2022. The aforementioned sequence listing is hereby incorporated by reference in its entirety pursuant to 37 C.F.R. § 1.52(e)(5).

3) The four GRP94 human antibodies (B5, E5, 2H5, and 3G7) for HT29 cells were measured to have the following cell indices at the end point: MOCK: 2.94±0.04, B5: 2.32±0.02, E5: 2.32±0.08, 2H5: 2.69±0.02, 3G7: 2.17±0.06, and CTX: 3.27±0.12.

4) The four GRP94 human antibodies (B5, E5, 2H5, and 3G7) for LoVo cells were measured to have the following cell indices at the end point: MOCK: 3.76±0.19, B5: 2.69±0.04, E5: 2.73±0.22, 2H5: 3.54±0.03, 3G7: 2.87±0.08, and CTX: 3.43±0.14.

1) The cell growth inhibitory ability of the four test substances against HCT8 cells was observed in the order of B5>E5>3G7>2H5. All of the four test substances were statistically significant relative to the control PBS.

2) The cell growth inhibitory ability of the four test substances against HCT116 cells was observed in the order of B5>3G7>E5>2H5. The test substances E5, 3G7, and B5 were statistically significant relative to the control PBS, but with no statistical significance for 2H5 relative to the control PBS.

3) The cell growth inhibitory ability of the four test substances against HT29 cells was observed in the order of 3G7>E5>B5>2H5. A II of the test substances B5, E5, 2H5, and 3G7 were statistically significant relative to the control PBS.

4) The cell growth inhibitory ability of the four test substances against LoVo cells was observed in the order of B5>E5>3G7>2H5. The test substances B5, E5, and 3G7 were statistically significant relative to the control PBS, but with no statistical significance for 2H5 relative to the control PBS.

In conclusion, the assay of the four test substances for inhibitory activity against CTX-resistant colorectal cell proliferation revealed that the test antibodies B5, E5, and 3G7 exhibited excellent inhibitory activity against growth of the four cell lines (HCT8, HCT116, HT29, and LoVo) as measured at the end point.

Example 8: Epitope Comparison of Developed Antibodies

Figure 21A:
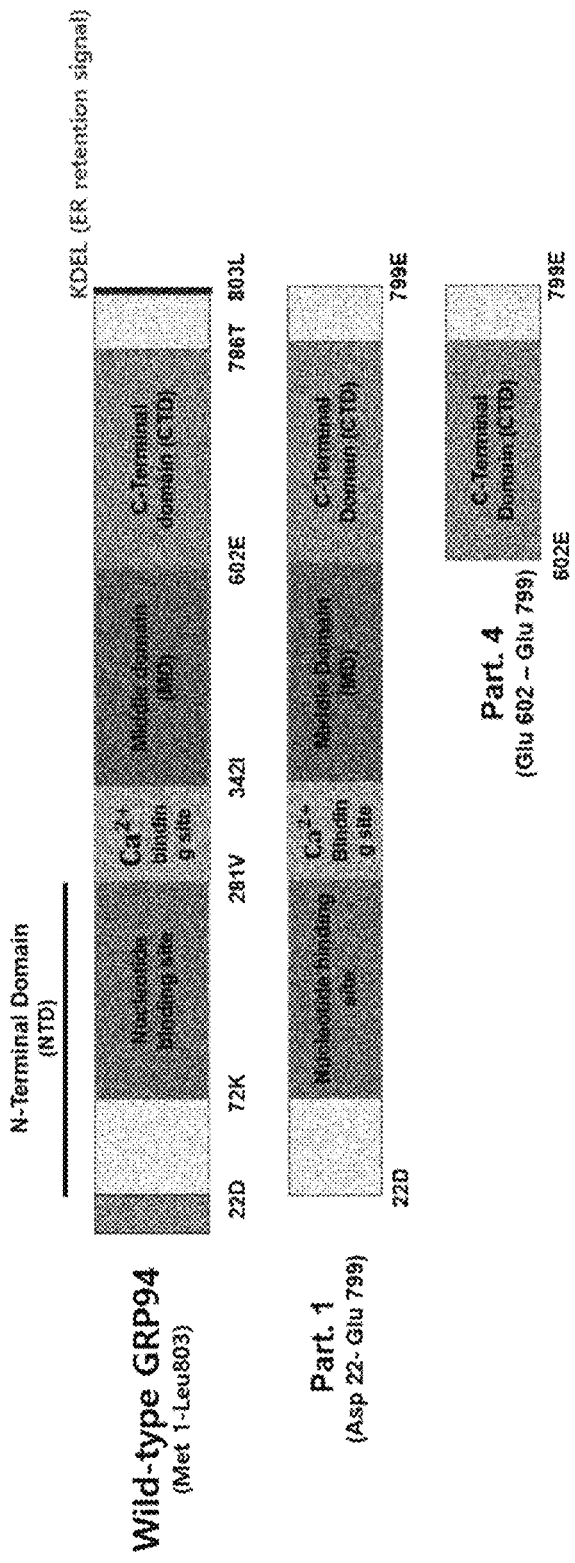
FIG. 21a is a schematic view of the structures of GRP94 proteins.

The GRP94 protein includes NTD (N-terminal domain), $Ca^{2+}$ binding domain (charger linker domain), MD (middle domain), CTD (C-terminal domain), and ER retention sequence in that order in the direction from the N-terminus to the C-terminus (see FIG. 21a).

Figure 21B:
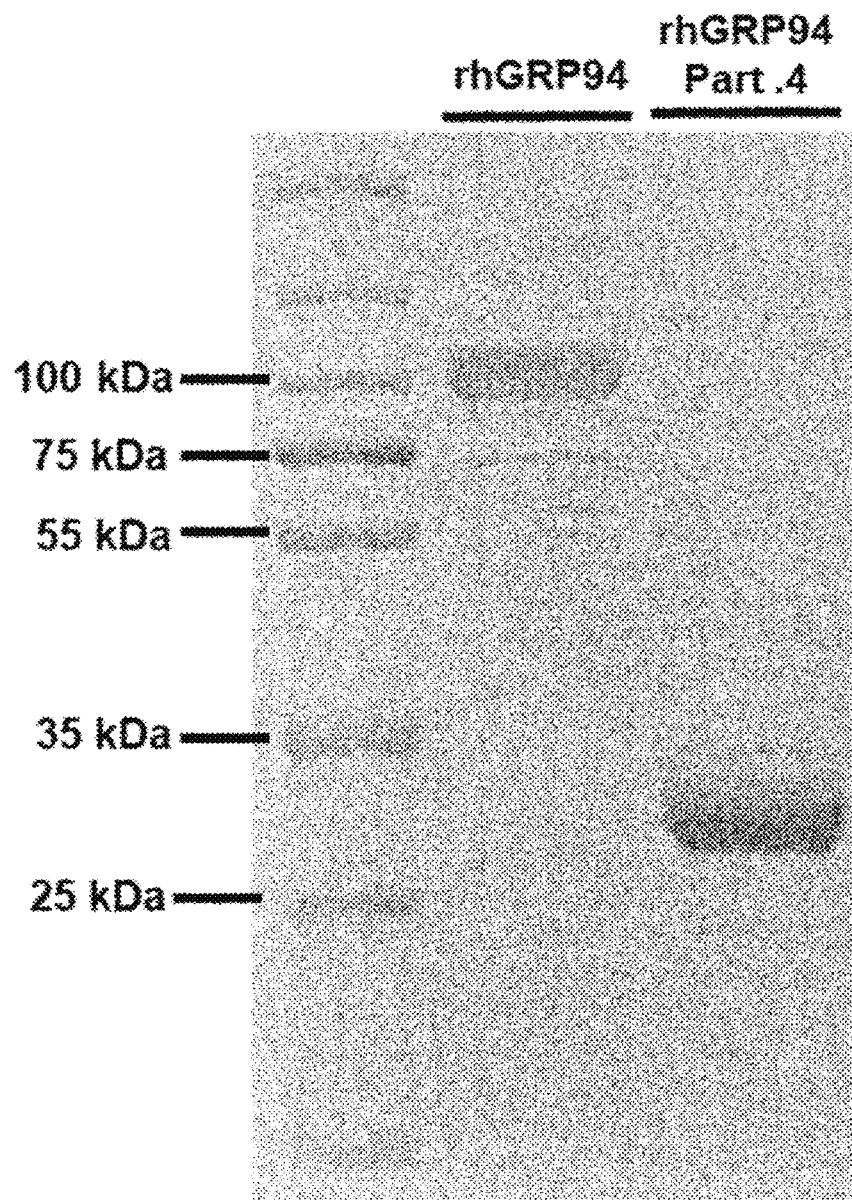
FIG. 21b is a photographic view showing rhGRP94 whole fragment (part 1) and rhGRP94 CTD fragment (part 4) after expression and purification thereof.

To determine which portion (or domain) of the GRP94 protein is bound by the developed antibodies, GRP94 fragments part. 1 and part. 4 were constructed wherein part. 1 was composed of the N-terminal domain (NTD), the $Ca^{2+}$ binding domain, the middle domain (MD), and the C-terminal domain (CTD) while part. 4 was derived from part. 1 by cutting off the NTD, the $Ca^{2+}$ binding domain, and the MD. In brief, Part. 1 (Asp 22-Glu 799) and Part. 4 (Glu 602-Glu 799) of the human GRP94 gene (Gene ID: 7184) were synthesized and subcloned into pcDNA 3.4 (Invitrogen) mammalian expression vector to finally recombinant DNAs. Using the Expi293 expression system (Invitrogen), the proteins were expressed and purified. The purified antigens part. 1 and part. 4 were analyzed for molecular weight by SDS-PAGE. The results are shown in FIG. 21b.

Next, ELISA was carried out to examine whether the four antibodies of the present disclosure bind to part 1 and part 4. First, 100 ng of each of the rhGRP94 fragment parts 1 and 4 was fixed to a high binding plate by incubation at 4° C. for 14 hours (overnight binding, 14 hrs). The same amount of BSA was used as a negative control. Then, the plate was blocked with 3% BSA, followed by incubation at 37° C. for 2 hours with 100 µL containing each of the anti-GRP94 antibodies (B5, E5, 2H5, and 3G7) of the present disclosure at a density of 1 µg/mL. After three rounds of washing with PBS-T, the plate was treated at 37° C. for 1 hour with a 5000:1 dilution of anti-Fc-HRP (Catalog #31423 Invitrogen). Color development was induced using 1-step-ultra TMB (Invitrogen) for 10 minutes and then terminated with H2SO4 (2N). Absorbance at 450 nm was read. The results are shown in FIG. 22.

Figure 22:
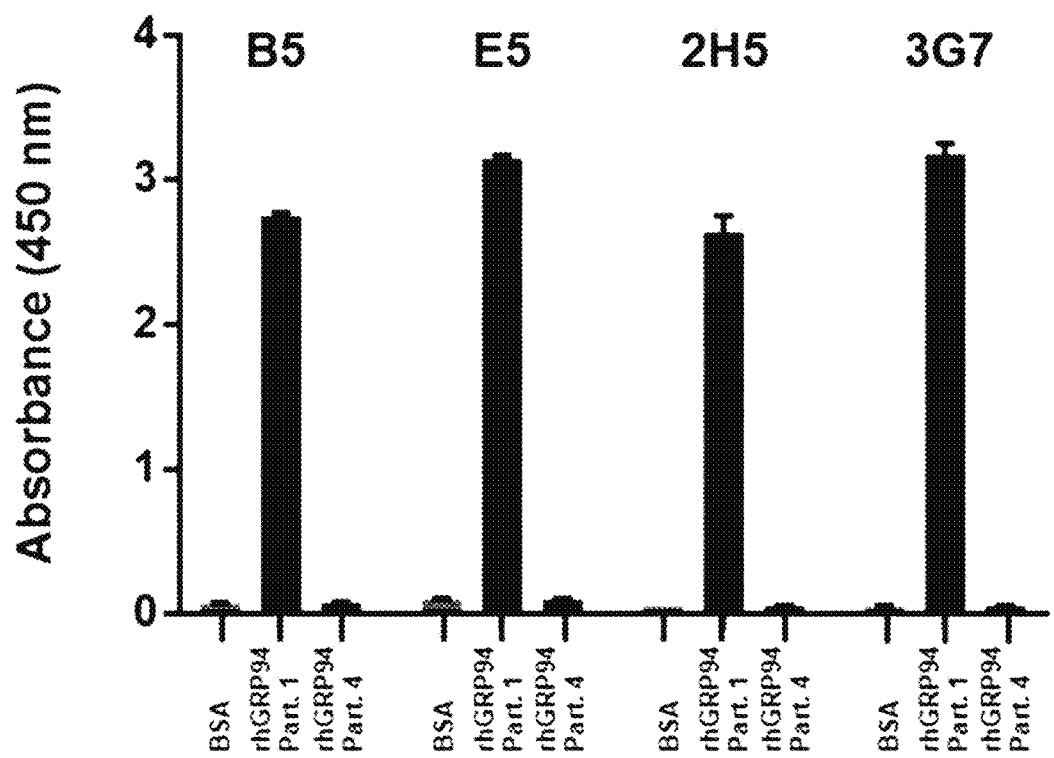
FIG. 22 is a graph showing epitope mapping results of the anti-GRP94 antibodies of the present disclosure as analyzed by ELISA.

As can be seen in FIG. 22, any of the four antibodies of the present disclosure (B5, E5, 2H5, and 3G7) did not bind to part 4 (Glu 602-Glu 799).

Example 9: In Vitro Assay of Developed Antibodies for Vascular Toxicity

In Vitro Assay for Viability of Vascular Endothelial Cell (HUVEC Viability Assay)

Examination was made to see whether the developed antibodies could cause toxicity to vascular endothelial cells. In this regard, the vascular endothelial cell line HUVEC (human umbilical vein endothelial cell) was treated with 20 µg/mL of each of the four antibodies of the present disclosure (B5, E5, 2H5, and 3G7) and 36 µg/mL of the conventional anticancer agent 5-FU (5-fluorouracil) as a control and then analyzed for viability using CCK-8 (cell counting kit-8). The results are shown in FIG. 23.

Figure 23:
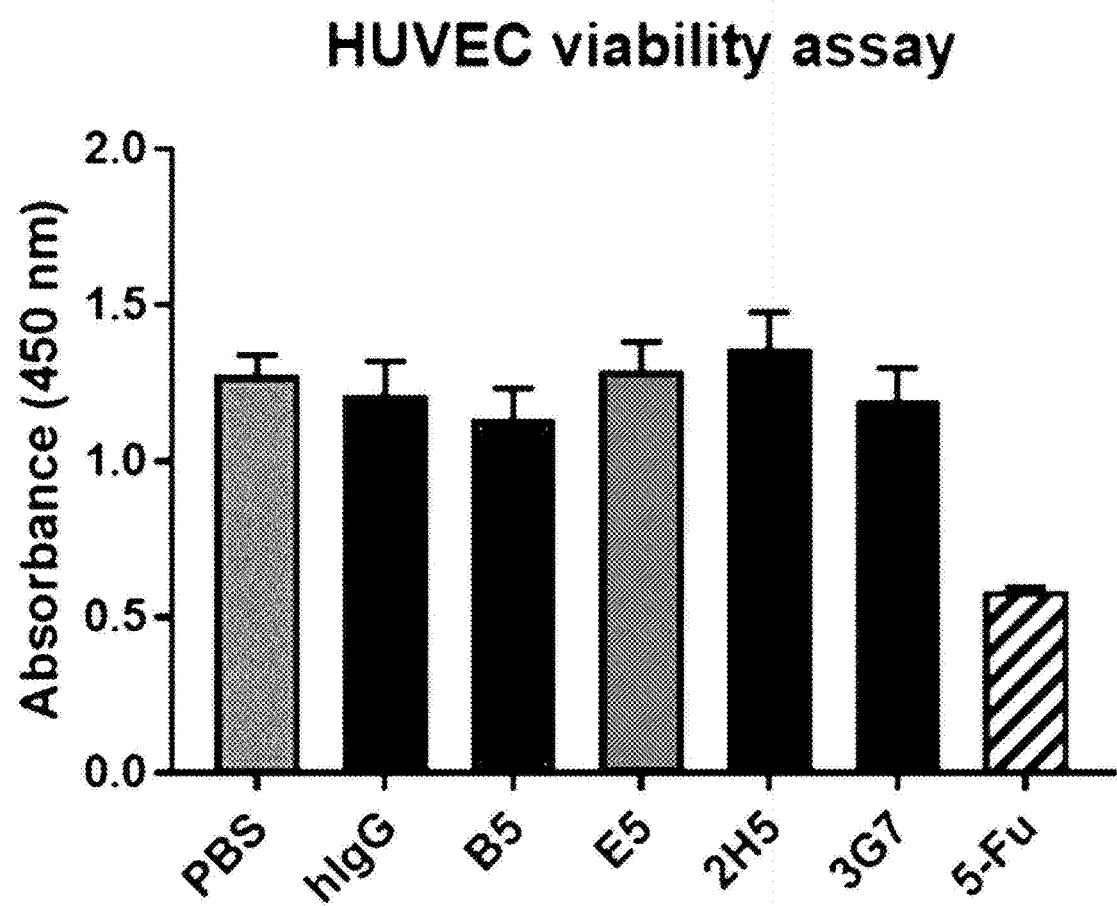
FIG. 23 is a graph showing vascular toxicity of the four antibodies of the present disclosure in terms of the viability of HUVEC cells treated with the four antibodies.

As shown in FIG. 23, all of the four antibodies of the present disclosure did not degrade the viability of HUVEC, compared to the control (5-FU). From the data, it could be understood that the four antibodies of the present disclosure are unlikely to cause toxicity to vascular endothelial cells.

Assay for Cell Adhesion Molecule Expression of Vascular Endothelial Cell

To examine whether the four antibodies of the present disclosure induce endothelial cell activation, the four antibodies were applied for 24 hours to HUVEC which was then analyzed for the expression of VCAM-1 and ICAM-1, which are representative biomarkers accounting for cell adhesion molecule expression, through FACS. As a positive control, a recombinant human TNF-alpha, which is a representative pro-inflammatory cytokine, was used. The results are shown in FIG. 24.

Figure 24:
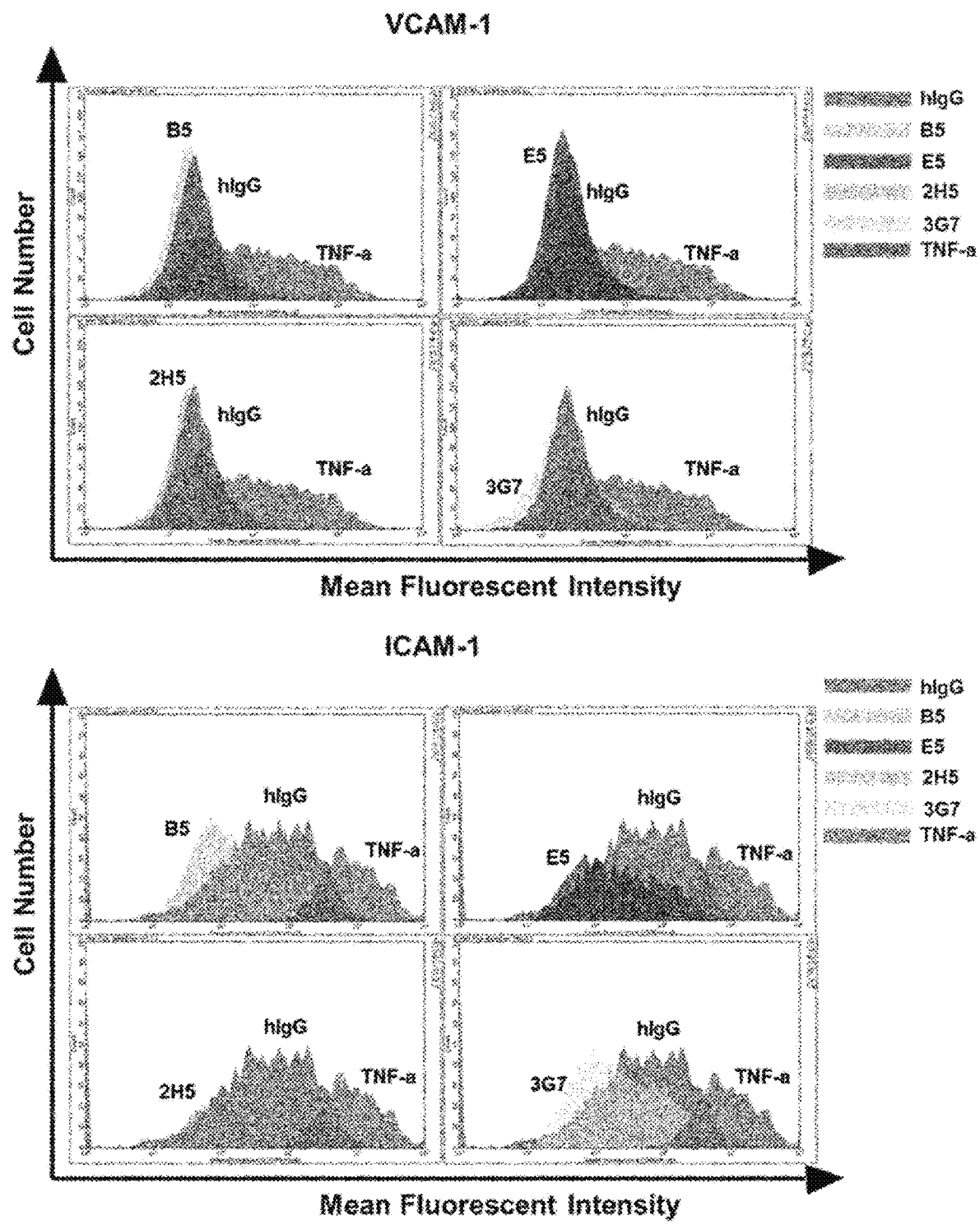
FIG. 24 shows views illustrating whether the four antibodies of the present disclosure activate vascular endothelial cells to induce the expression of the cell adhesion molecules VCAM-1 and ICAM-1.

As can be seen in FIG. 24, all of the four antibodies of the present disclosure were observed to almost little induce the expression of VCAM-1 and ICAM-1, compared to the TNF-alpha-treated positive control. Thus, the four antibodies of the present disclosure were very unlikely to induce activation of vascular endothelial cells.

Example 10: Assay for Mechanism of Action of Developed Antibodies (Grp94 Internalization)

With the assumption on the mechanism that the anti-GRP94 antibodies of the present disclosure bind to GRP94 antigen and then internalized into cells, the following experiment was carried out. Briefly, the four anti-GRP94 antibodies of the present disclosure were applied to the colorectal cell line HCT116 fixed with 4% paraformaldehyde (PFA) or unfixed cells and then analyzed for binding affinity for GRP94 on the surface of HCT116 cells by FACS. When the colorectal cell line HCT116 is fixed with PFA, its cell activity is halted so that the internalization does not proceed. Thus, the interaction between the antibodies and the GRP94 antigen exposed on the cell surface can be more explicitly detected. The results are depicted in FIG. 25.

Figure 25:
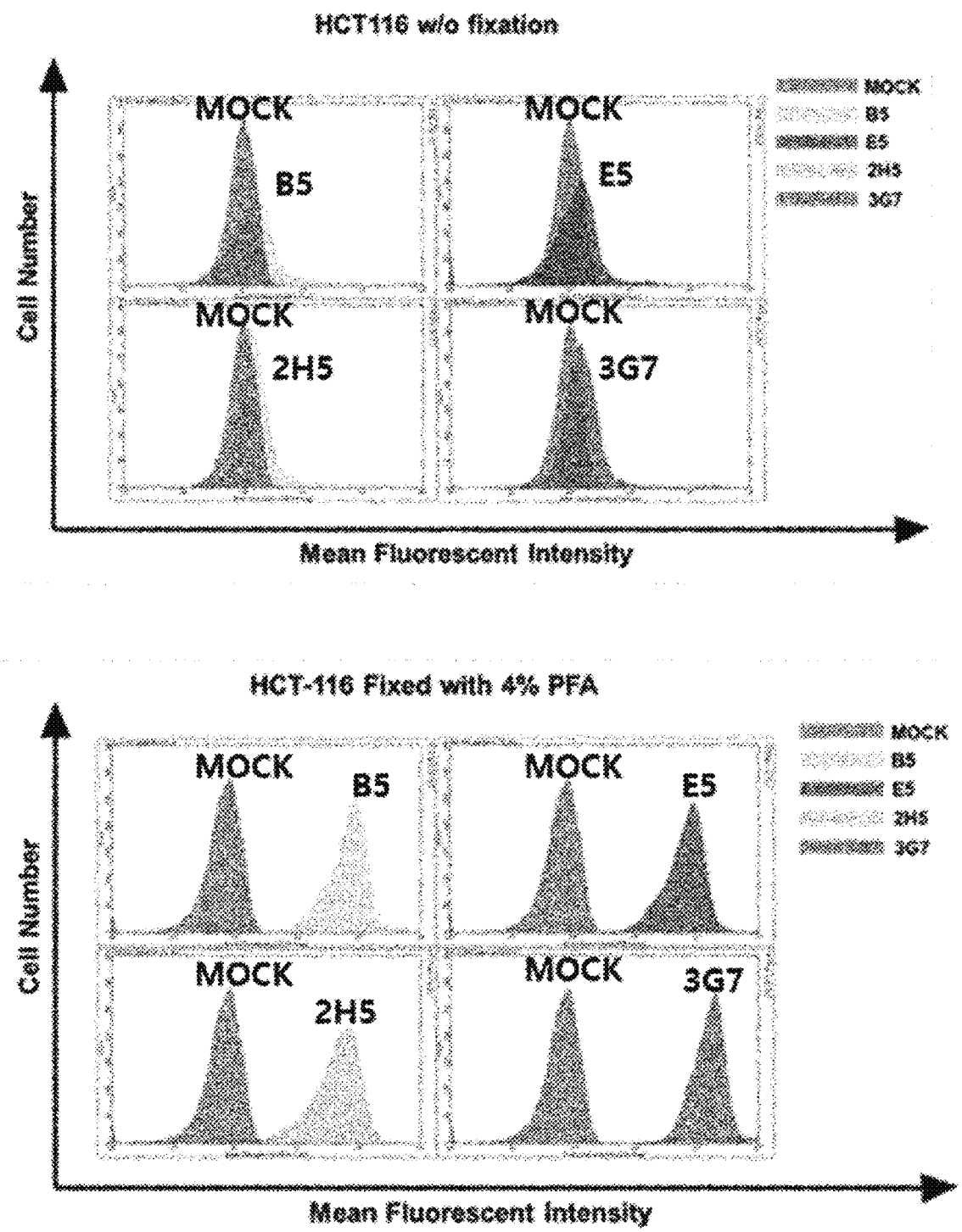
FIG. 25 shows views illustrating the mechanism of action (i.e. GRP94 internalization) of the four antibodies of the present disclosure as analyzed by examining whether the four antibodies of the present disclosure bind to cell surface GRP94 antigen depending on the fixation of the HCT116 cell line with paraformaldehyde (PFA).

As seen in FIG. 25, the binding of the four antibodies to the cell surface GRP94 was detected in the PFA-fixed cells, but not in non-fixed cells at all. This, assumption could be made of the mechanism of action wherein the four antibodies bind to cell surface GRP94 and then internalized into the cells, with the consequent down-regulation of the cell surface GRP94 level.

Example 11: In Vivo Assay for Inhibitory Activity Against Tumor Growth in Colorectal Xenograft Model Assay for Tumor Growth Inhibition by Sole Administration of Antibody For use in assaying in-vivo efficacy of the four antibodies of the present disclosure, a subcutaneous xenograft mouse model was established by injecting the metastatic colorectal cancer cell line HCT116 ($5 \times 10^6$ cells) into 6-week-old Balb/c nude mice. When the tumor size reached about 50-100 mm$^3$, PBS (negative control), hIgG (negative control), cetuximab, and the four antibodies (B5, E5, 2H5, and 3G7) were each intravenously injected at a dose of 10 mg/kg twice per week for six weeks while monitoring the efficacies. The results are depicted in FIGS. 26a to 26d.

As shown in FIGS. 26a to 26d, cetuximab was not significantly different from the controls PBS and hIgG in terms of inhibitory activity against tumor growth of colorectal cancer cell line HCT116. E5 did not exhibit inhibitory activity against tumor growth, either, compared to the controls. In contrast, noticeable tumor growth inhibition efficacies were observed in mice injected with B5, 2H5, and 3G7 antibodies. B5, 2H5, and 3G7 antibodies inhibited tumor growth by 30% ($p<0.001$), 45% ($p<0.01$), and 33% ($p<0.001$), respectively, compared to PBS (n=9, statistical analysis was made using two-way ANOVA).

Assay for Tumor Growth Inhibition by Administration of Antibody and Conventional Anticancer Agent in Combination Combined administration of the developed antibodies of the present disclosure and conventional anticancer agents was assayed for in vivo efficacy. In this regard, the 2H5 and 3G7 antibodies, which exhibited the highest efficacy as measured in the sole administration assay, and the conventional colorectal cancer chemotherapeutic agents 5-FU and cetuximab were administered in combination. Briefly, the metastatic colorectal cancer cell line HCT116 ($5 \times 10^6$ cells) was injected to 6-week-old Balb/c nude mice to establish a subcutaneous xenograft mouse model. When the tumor size reached about 50-100 mm$^3$, PBS (negative control), hIgG (negative control), 5-FU+cetuximab, 5-FU+cetuximab+2H5, or 5-FU+cetuximab+3G7 was injected twice a week for six weeks. Injection was made of 5-FU at a dose of 30 mg/kg through an intraperitoneal route and cetuximab and 2H5 and 3G7 antibodies at a dose of 10 mg/kg through intravenous route. The results are depicted in FIG. 26e.

Figure 26A:
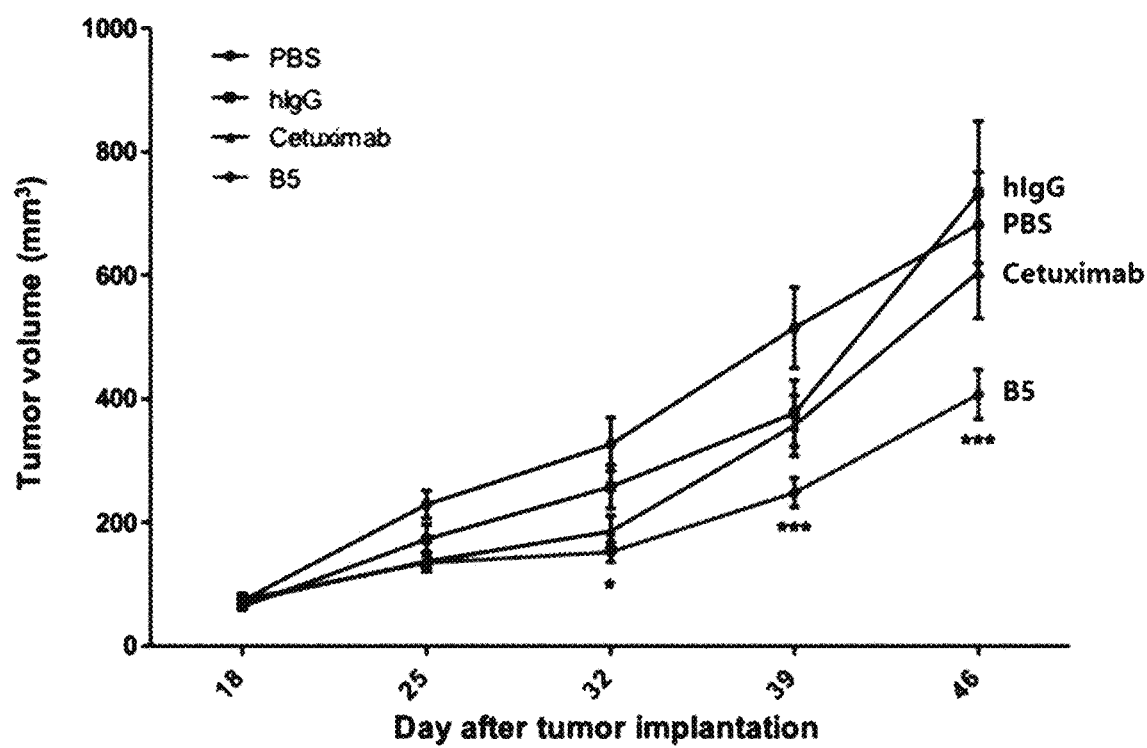
FIGS. 26a to 26d are plots illustrating in vivo efficacies of the four antibodies of the present disclosure in the colorectal cancer xenograft mouse model.
Figure 26B:
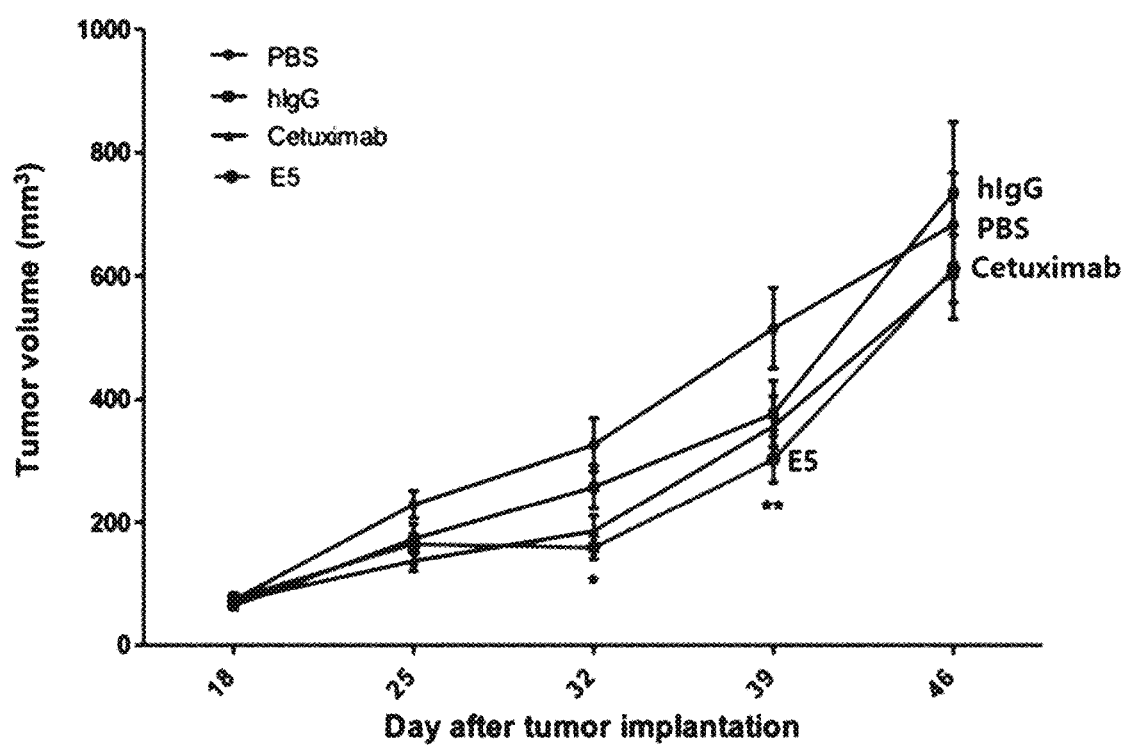
Figure 26C:
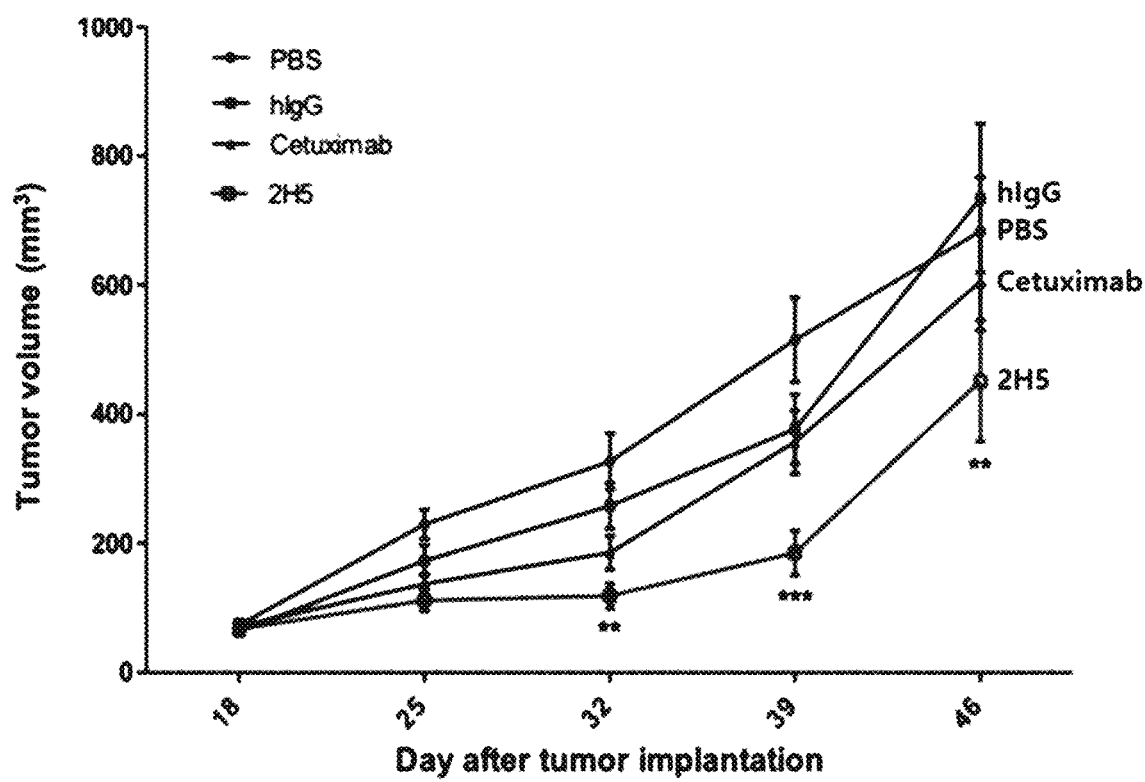
Figure 26D:
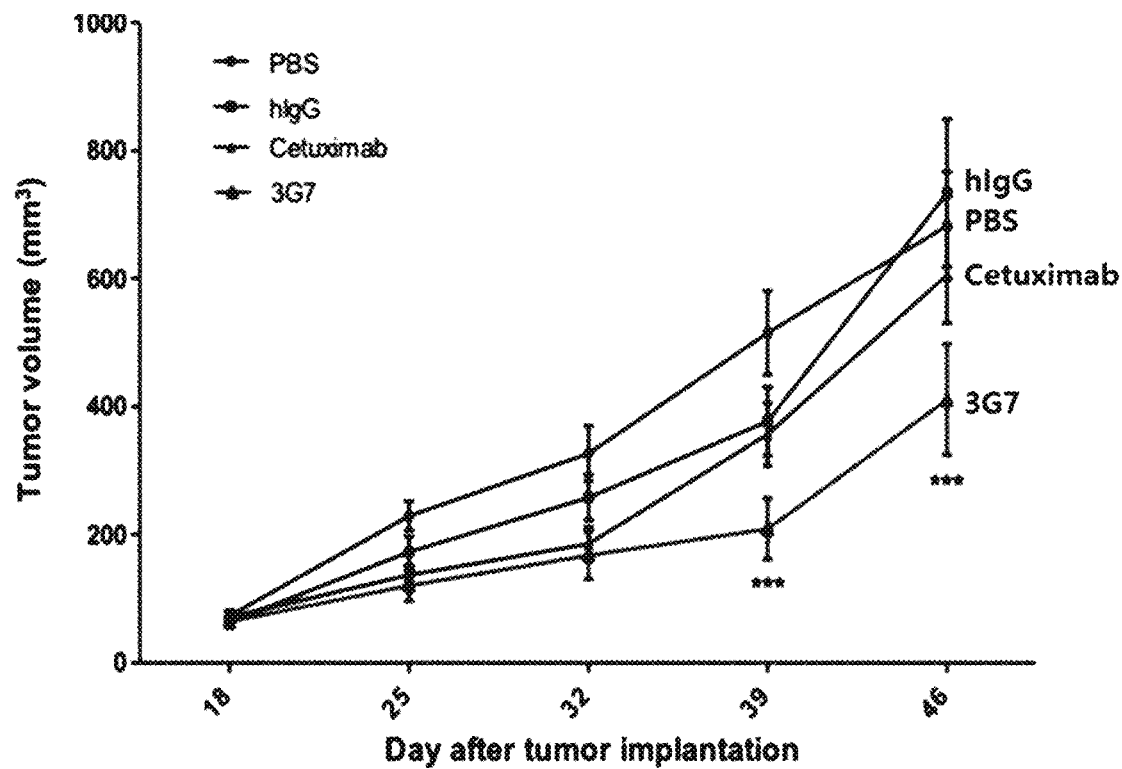
Figure 26E:
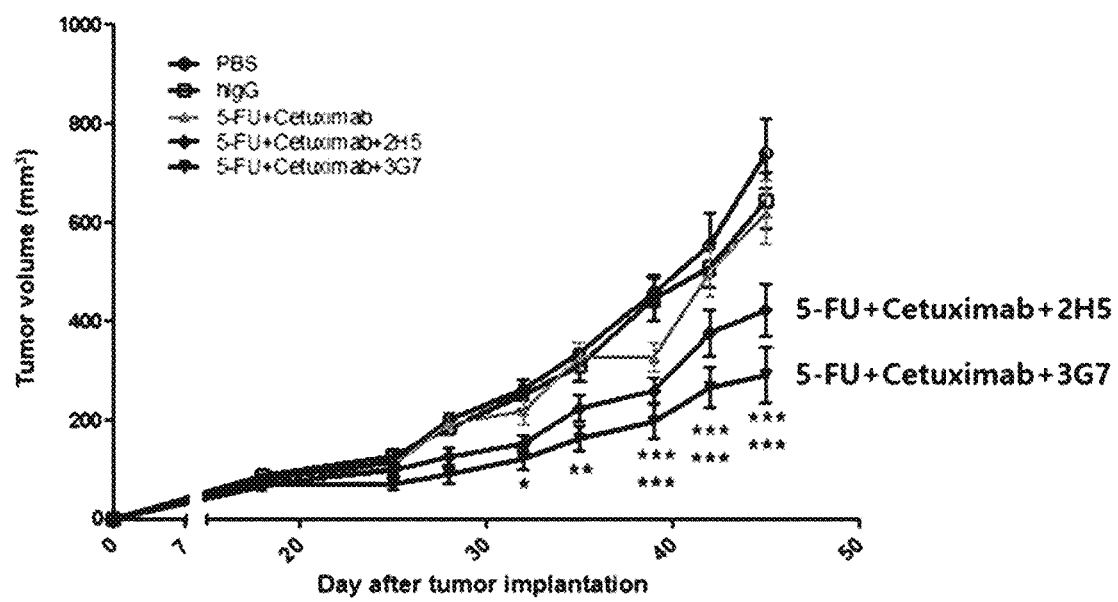
FIG. 26e is a plot illustrating the effects of the antibodies 2H5 and 3G7 of the present disclosure upon co-administration together with conventional anticancer agents (5-FU+Cetuximab).

As shown in FIG. 26e, 5-FU+cetuximab was observed to have no significant inhibitory effects on the growth of the HCT116 colorectal tumor, compared to the controls PBS and hIgG. In contrast, noticeable synergistic inhibitory effects on tumor growth were detected from treatment with 5-FU+cetuximab+2H5 and 5-FU+cetuximab+3G7. The combinations of 5-FU+cetuximab+2H5, and 5-FU+cetuximab+3G7 inhibited tumor growth by 47% ($p<0.001$) and 67% ($p<0.001$), respectively, compared to PBS (n=10, statistical analysis was made using two-way ANOVA). Particularly, 3G7 antibody exhibited very high synergistic inhibitory effects on colorectal tumor growth when administered in combination with 5-FU and cetuximab.

Example 12: In Vivo Assay for Hepatotoxicity and Nephrotoxicity in Colorectal Xenograft Model To assay the four antibodies of the present disclosure for in vivo hepatotoxicity and nephrotoxicity, the same xenograft model as in Example 11 weighed every week. After six weeks of the experiment, GOT (glutamic oxaloacetic transaminase), GPT (glutamate pyruvate transaminase), and TBIL (total bilirubin) were measured for hepatotoxicity assay while BUN (blood urea nitrogen) and CRE (creatinine) were measured for nephrotoxicity assay. The results are depicted in FIGS. 27a and 27b.

Figure 27A:
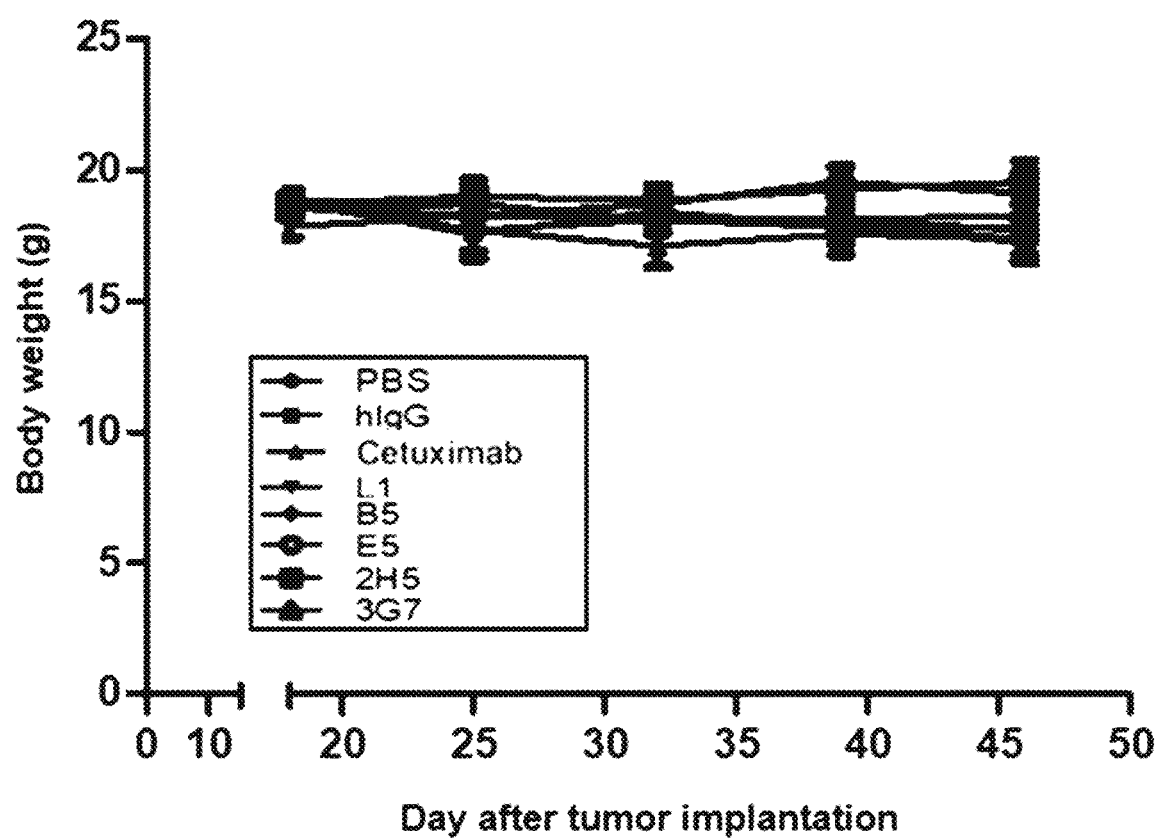
FIG. 27a is a plot of body weights in the xenograft mouse models injected with the four antibodies of the present disclosure.
Figure 27B:
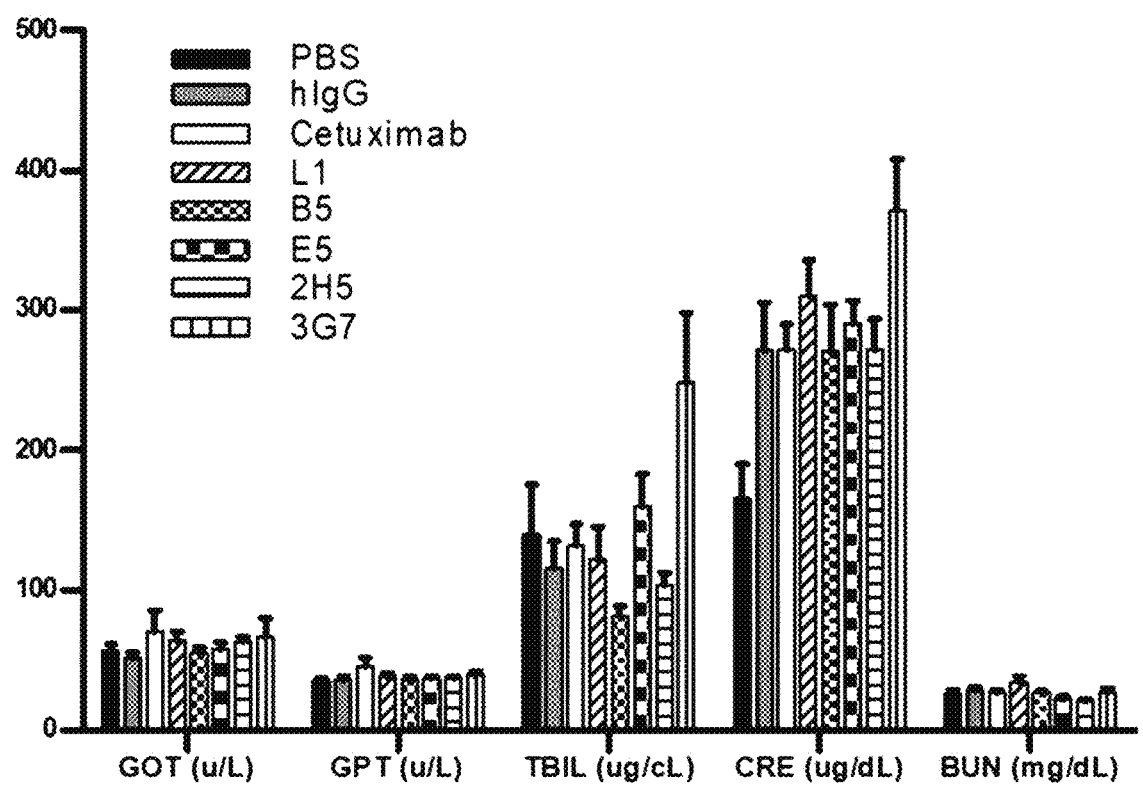
FIG. 27b is a graph illustrating in vivo toxicity upon administration of the four antibodies of the present disclosure in terms of serobiochemical indices (GOT, GPT, TBIL, BUN, and CREA) in the xenograft mouse model.

As shown in FIG. 27a, PBS, hIgG, cetuximab, and the four selected antibodies (B5, E5, 2H5, and 3G7) were all observed to cause no significant changes in body weight. In addition, as shown in FIG. 27b, no significant changes in serum levels of liver and kidney functional indices (GOT, GPT, TBIL, BUN, and CREA). From the data of the serobiochemical toxicity assay, it could be understood that the four selected antibodies (B5, E5, 2H5, and 3G7) of the present disclosure are unlikely to cause toxicity in vivo.

What is claimed is:

1. An antibody or an antigen-binding fragment thereof, wherein the antibody or the antigen-binding fragment thereof binds specifically to glucose-regulated protein 94 (GRP94) and comprises:
a heavy chain variable region comprising heavy chain CDR1 (HCDR1), HCDR2 and HCDR3;
and a light chain variable region comprising light chain CDR1 (LCDR1), LCDR2 and LCDR3;
wherein the antibody or antigen binding fragment thereof comprises any one of i) to iii):
i) HCDR1, HCDR2, and HCDR3 comprising the amino acid sequences set forth in SEQ ID NOs: 1 to 3, respectively, and LCDR1, LCDR2, and LCDR3 comprising the amino acid sequences set forth in SEQ ID NOs: 4 to 6, respectively;
ii) HCDR1, HCDR2, and HCDR3 comprising the amino acid sequences set forth in SEQ ID NOs: 9 to 11, respectively, and LCDR1, LCDR2, and LCDR3 comprising the amino acid sequences set forth in SEQ ID NOs: 12 to 14, respectively; or iii) HCDR1, HCDR2, and HCDR3 comprising the amino acid sequences set forth in SEQ ID NOs: 17 to 19, respectively, and LCDR1, LCDR2, and LCDR3 comprising the amino acid sequences set forth in SEQ ID NOs: 20 to 22, respectively.

2. The antibody or the antigen-binding fragment thereof according to claim 1, wherein the antibody or the antigen-binding fragment thereof includes any one of i) to iii):

i) a heavy chain variable region comprising the amino acid sequence set forth in SEQ ID NO: 7 and a light chain variable region comprising the amino acid sequence set forth in SEQ ID NO: 8;

ii) a heavy chain variable region comprising the amino acid sequence set forth in SEQ ID NO: 15 and a light chain variable region comprising the amino acid sequence set forth in SEQ ID NO: 16; or iii) a heavy chain variable region comprising the amino acid sequence set forth in SEQ ID NO: 23 and a light chain variable region comprising the amino acid sequence set forth in SEQ ID NO: 24.

3. The antibody or the antigen-binding fragment thereof according to claim 1, wherein the antibody or the antigen-binding fragment thereof has a dissociation constant KD of $10^{-8}$ M or less.

4. The antibody or the antigen-binding fragment thereof according to claim 1, wherein the antibody or the antigen-binding fragment thereof has an activity of inhibiting the growth of at least one tumor cell line selected from the group consisting of HCT-8, HT-29, LoVo, HCT-116, and Caco-2, in vitro and in vivo.

5. A nucleic acid molecule encoding the antibody or the antigen-binding fragment thereof according to claim 1.

6. A recombinant vector carrying the nucleic acid of claim 5.

7. A host cell comprising the recombinant vector of claim 6.

8. A pharmaceutical composition comprising: i) the antibody or the antigen-binding fragment thereof according to claim 1; and ii) a pharmaceutically acceptable carrier.

9. A kit for detecting GRP94, the kit comprising the antibody or the antigen-binding fragment thereof according to claim 1.

10. A method for treating cancer in a subject in need thereof, wherein the cancer cells express GRP94 on the cell surface, and wherein the method comprises administering the antibody or the antigen-binding fragment thereof according to claim 1 to the subject.

11. The method of claim 10, wherein the cancer is solid cancer or blood cancer.

12. The method of claim 11, wherein the solid cancer is selected from the group consisting of gastric cancer, rectal cancer, colon cancer, colorectal cancer, inflammation-related colon cancer, liver cancer, lung cancer, ovarian cancer, melanoma, pancreatic cancer, uterine cancer, testicular cancer, and breast cancer.

13. The method of claim 11, wherein the blood cancer is selected from the group consisting of acute myelogenous leukemia, acute lymphocytic leukemia, chronic myelogenous leukemia, chronic lymphocytic leukemia, acute monocytic leukemia, multiple myeloma, Hodgkin's lymphoma, and non-Hodgkin's lymphoma.

14. The method of claim 10, wherein the antibody or the antigen-binding fragment is administered with cetuximab.

* * * * *